(12) United States Patent
Nakamura et al.

(10) Patent No.: US 7,291,449 B2
(45) Date of Patent: *Nov. 6, 2007

(54) SILVER HALIDE PHOTOGRAPHIC MATERIAL AND METHINE DYE

(75) Inventors: Tetsuo Nakamura, Kanagawa (JP);
Takanori Hioki, Kanagawa (JP);
Katsuhisa Ohzeki, Kanagawa (JP);
Naoyuki Hanaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/931,309

(22) Filed: Aug. 17, 2001

(65) Prior Publication Data

US 2002/0058216 A1     May 16, 2002

Related U.S. Application Data

(63) Continuation-in-part of application No. 09/536,679, filed on Mar. 28, 2000, now abandoned.

(30) Foreign Application Priority Data

| Mar. 30, 1999 | (JP) | ................................. P.11-89424 |
| Jan. 13, 2000 | (JP) | ............................. P.2000-4868 |
| Apr. 17, 2001 | (JP) | ......................... P.2001-118281 |

(51) Int. Cl.
*G03C 1/12* (2006.01)
*G03C 1/08* (2006.01)

(52) U.S. Cl. ...................... 430/570; 430/517; 430/522; 430/577; 430/578; 430/579; 430/581; 430/582; 430/583; 430/584; 430/585; 430/586; 430/587; 430/588; 430/590; 430/591; 430/592; 430/594; 430/595

(58) Field of Classification Search ................. 430/570, 430/577, 578, 579, 581, 582, 583, 584, 585, 430/586, 587, 588, 590–595, 517, 522
See application file for complete search history.

(56) References Cited

U.S. PATENT DOCUMENTS 5,057,406 A * 10/1991 Usagawa et al. ........... 430/522
5,061,618 A * 10/1991 Parton et al. ............... 430/584
5,397,693 A    3/1995 Kawata et al. .............. 430/581
5,457,022 A * 10/1995 Hioki et al. ................. 430/612

FOREIGN PATENT DOCUMENTS

| JP | 61-277950 | * 12/1986 |
| JP | 62-204250 | * 9/1987 |
| JP | 03107140 | 5/1991 |
| JP | 2000-063690 | 2/2000 |
| SU | 321167 | 11/1972 |
| SU | 615110 | 7/1978 |

OTHER PUBLICATIONS

The Theory Of The Photographic Process, Fourth Edition, T.H. James, 1989, pp. 194-225.*

* cited by examiner

*Primary Examiner*—Thorl Chea
(74) *Attorney, Agent, or Firm*—Sughrue Mion Pllc.

(57) ABSTRACT

Disclosed is a silver halide photographic material which comprises at least one methine dye represented by the following formula (I):

$$\underset{R}{\underset{|}{Y}} \overset{Z}{\underset{N-(L^1=L^2)_p}{\diagup}} = D \quad (M)_m \qquad (I)$$

wherein Y represents a furan ring or a pyrrole ring, and Y may further be condensed with other 5- or 6-membered carbocyclic ring or heterocyclic ring, or may have a substituent; the bond between two carbon atoms in which Y is condensed may be a single bond or a double bond; Z represents an atomic group necessary to form a 5- or 6-membered nitrogen-containing heterocyclic ring, and Z may further be condensed with other 5- or 6-membered carbocyclic ring or heterocyclic ring; R represents a substituted or unsubstituted alkyl group, aryl group, or heterocyclic group; D represents a group necessary to form a methine dye; $L^1$ and $L^2$ each represents a methine group; p represents 0 or 1; M represents a counter ion; and m represents a number of 0 or higher necessary to neutralize the charge in the molecule.

10 Claims, No Drawings

SILVER HALIDE PHOTOGRAPHIC MATERIAL AND METHINE DYE

CROSS REFERENCE TO RELATED APPLICATION

This is a continuation-in-part application of U.S. patent application Ser. No. 09/536,679 filed Mar. 28, 2000 now abandoned.

FIELD OF THE INVENTION

The present invention relates to a silver halide photographic material and more particularly relates to a silver halide photographic material which is high sensitive and generates less residual colors after processing.

BACKGROUND OF THE INVENTION

Every endeavor has been made for higher sensitization and reduction of residual colors after processing of a silver halide photographic material. It is known that a sensitizing dye which is used for spectral sensitization exerts a great influence on the capabilities of a silver halide photographic material. A trace of structural difference of a sensitizing dye largely affects photographic capabilities such as sensitivity, fog, storage stability and residual colors after processing. Photographic performances are also largely influenced by the combined use of two or more kinds of sensitizing dyes but it is difficult to foresee its effect. Many engineers have hitherto synthesized various kinds of sensitizing dyes, examined the combined use of sensitizing dyes and endeavored to investigate photographic capabilities thereof, however, it is not possible to know photographic capabilities in advance yet.

For that reason, a technique of spectral sensitization capable of improving sensitivity of silver halide grains without causing adverse effects such as fog and residual colors has been required.

Also, it is known that the present durability is deteriorated by adsorbing onto the surface of silver halide grains the sensitizing dye used for the spectral sensitization. Accordingly, a sensitizing dye in which the pressure durability is not deteriorated is desired.

SUMMARY OF THE INVENTION

An object of the present invention is to provide a silver halide photographic material which is high speed and generates less residual colors after processing, and also is to provide a silver halide photographic material not deteriorating the pressure durability.

As a result of earnest investigations, the above object of the present invention has been attained by the following means. That is:

(1) A silver halide photographic material which comprises at least one methine dye represented by the following formula (I):

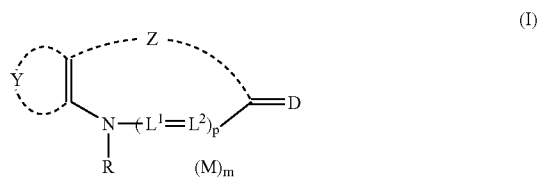

wherein Y represents an atomic group necessary to form a 5- or 6-membered unsaturated heterocyclic ring, and Y may further be condensed with other 5- or 6-membered carbocyclic ring or heterocyclic ring, or may have a substituent; Z represents an atomic group necessary to form a 5- or 6-membered nitrogen-containing heterocyclic ring, and Z may further be condensed with other 5- or 6-membered carbocyclic ring or heterocyclic ring; R represents a substituted or unsubstituted alkyl group, aryl group, or heterocyclic group; D represents a group necessary to form a methine dye; $L^1$ and $L^2$ each represents a methine group; p represents 0 or 1; M represents a counter ion; and m represents a number of 0 or higher necessary to neutralize the charge in the molecule.

(2) The silver halide photographic material as described in the above item (1), wherein the condensed ring containing Y and Z in the methine dye represented by formula (I) is selected from the following Y-1 to Y-26, provided that Y-1 to Y-26 may further be condensed with other 5- or 6-membered carbocyclic ring or heterocyclic ring, or may have a substituent:

Y-1

Y-2

Y-3

Y-4

Y-5

Y-6

Y-7

Y-8

Y-9

Y-10

-continued

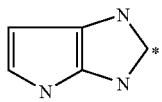 Y-11

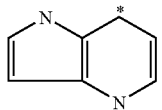 Y-12

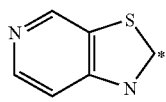 Y-13

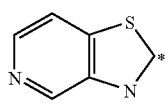 Y-14

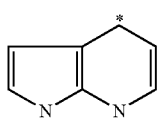 Y-15

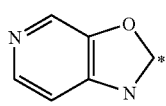 Y-16

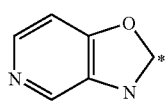 Y-17

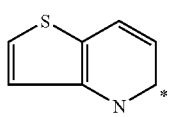 Y-18

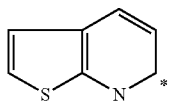 Y-19

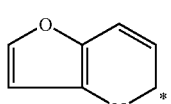 Y-20

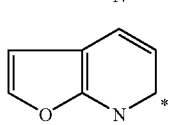 Y-21

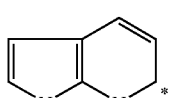 Y-22

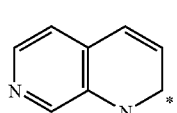 Y-23

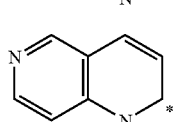 Y-24

-continued

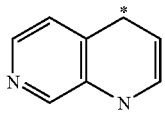 Y-25

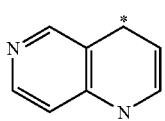 Y-26 in each structural formula, * represents a position to link to a methine chain.

(3) The silver halide photographic material as described in the above item (1), wherein the methine dye represented by formula (I) is represented by the following formula (II):

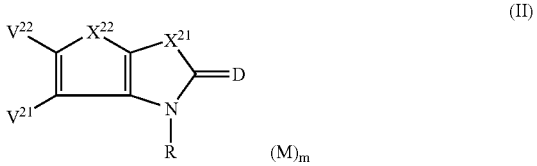

(II)

wherein $X^{21}$ and $X^{22}$ each represents an oxygen atom, a sulfur atom, or a selenium atom; $V^{21}$ and $V^{22}$ each represents a hydrogen atom or a substituent, and they may be linked to each other to form a condensed ring; and D, R, M and m each has the same meaning as in formula (I).

(4) The silver halide photographic material as described in the above item (3), wherein $V^{21}$ and $V^{22}$ in the methine dye represented by formula (II) do not represent hydrogen atoms at the same time.

(5) The silver halide photographic material as described in the above item (4), wherein in the methine dye represented by formula (II), $X^{22}$ represents a sulfur atom, R is selected from a carboxyalkyl group, a sulfoalkyl group or an alkylsulfonylcarbamoylalkyl group, and $V^{21}$ and $V^{22}$ do not represent hydrogen atoms at the same time.

(6) The silver halide photographic material as described in the above item (1), wherein the methine dye represented by formula (I) is represented by the following formula (III):

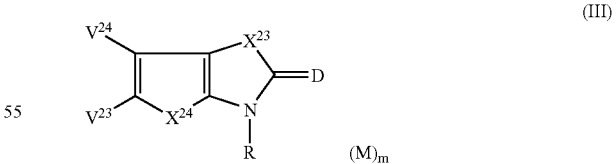

(III)

wherein $X^{23}$ and $X^{24}$ each represents an oxygen atom, a sulfur atom, or a selenium atom; $V^{23}$ and $V^{24}$ each represents a hydrogen atom or a substituent, and they may be linked to each other to form a condensed ring; and D, R, M and m each has the same meaning as in formula (I).

(7) The silver halide photographic material as described in the above item (6), wherein in the methine dye represented by formula (III), $V^{23}$ and $V^{24}$ do not represent hydrogen atoms at the same time; and when $X^{23}$ represents a sulfur atom, $V^{23}$ does not represent a phenyl group or $V^{24}$ does not represent a methyl group.

(8) The silver halide photographic material as described in the above item (7), wherein in the methine dye represented by formula (III), $X^{24}$ represents a sulfur atom; R is selected from a carboxyalkyl group, a sulfoalkyl group or an alkylsulfonylcarbamoylalkyl group; $V^{23}$ and $V^{24}$ do not represent hydrogen atoms at the same time; and when $X^{23}$ represents a sulfur atom, $V^{23}$ does not represent a phenyl group or $V^{24}$ does not represent a methyl group.

(9) The silver halide photographic material as described in the above item (1), wherein the methine dye represented by formula (I) is represented by the following formula (IV):

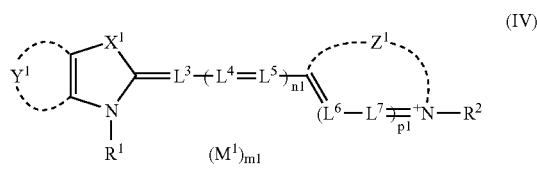

(IV)

wherein $X^1$ represents an oxygen atom, a sulfur atom, a selenium atom, a tellurium atom,

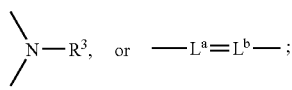

$Y^1$ represents an atomic group necessary to form a 5- or 6-membered unsaturated heterocyclic ring, and $Y^1$ may further be condensed with other 5- or 6-membered carbocyclic ring or heterocyclic ring, or may have a substituent; $Z^1$ represents an atomic group necessary to form a 5- or 6-membered nitrogen-containing heterocyclic ring, and $Z^1$ may further be condensed with other 5- or 6-membered carbocyclic ring or heterocyclic ring; $R^1$, $R^2$ and $R^3$ each represents a substituted or unsubstituted alkyl group, aryl group, or heterocyclic group; $L^a$, $L^b$, $L^3$, $L^4$, $L^5$, $L^6$ and $L^7$ each represents a methine group; $n^1$ represents an integer of 0 or higher; $p^1$ represents 0 or 1; $M^1$ represents a counter ion; and $m^1$ represents a number of 0 or higher necessary to neutralize the charge in the molecule.

(10) The silver halide photographic material as described in the above item (9), wherein in the methine dye represented by formula (IV), at least one of the atomic group constituting the heterocyclic ring $Y^1$ (exclusive of the substituents on the ring) and $X^1$ contains an oxygen atom.

(11) The silver halide photographic material as described in the above item (9), wherein the methine dye represented by formula (IV) is represented by the following formula (V):

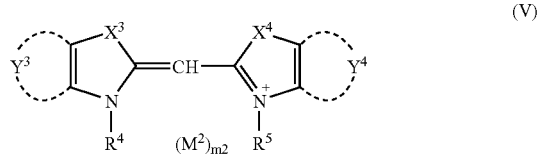

(V)

wherein $X^3$ and $X^4$ each represents an oxygen atom, a sulfur atom, or a selenium atom; $Y^3$ represents a furan ring, and $Y^3$ may further be condensed with other 5- or 6-membered carbocyclic ring or heterocyclic ring, or may have a substituent; $Y^4$ represents an atomic group necessary to form a benzene ring or a 5- or 6-membered unsaturated heterocyclic ring, and $Y^4$ may further be condensed with other 5- or 6-membered carbocyclic ring or heterocyclic ring, or may have a substituent; $R^4$ and $R^5$ each represents a substituted or unsubstituted alkyl group, aryl group, or heterocyclic group; $M^2$ represents a counter ion; and $m^2$ represents a number of 0 or higher necessary to neutralize the charge in the molecule.

(12) The silver halide photographic material as described in the above item (9), wherein the methine dye represented by formula (IV) is represented by the following formula (VI):

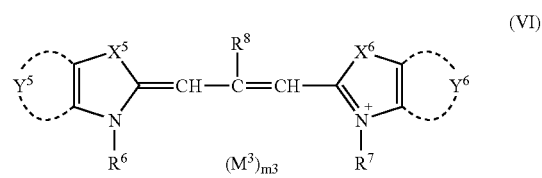

(VI)

wherein $X^5$ and $X^6$ each represents an oxygen atom, a sulfur atom, or a selenium atom but at least either one represents an oxygen atom; $Y^5$ represents an atomic group necessary to form a 5- or 6-membered unsaturated heterocyclic ring, and $Y^5$ may further be condensed with other 5- or 6-membered carbocyclic ring or heterocyclic ring, or may have a substituent; $Y^6$ represents an atomic group necessary to form a benzene ring or a 5- or 6-membered unsaturated heterocyclic ring, and $Y^6$ may further be condensed with other 5- or 6-membered carbocyclic ring or heterocyclic ring, or may have a substituent; $R^6$, $R^7$ and $R^8$ each represents a substituted or unsubstituted alkyl group, aryl group, or heterocyclic group; $M^3$ represents a counter ion; and $m^3$ represents a number of 0 or higher necessary to neutralize the charge in the molecule.

(13) A methine dye represented by the following formula (VII):

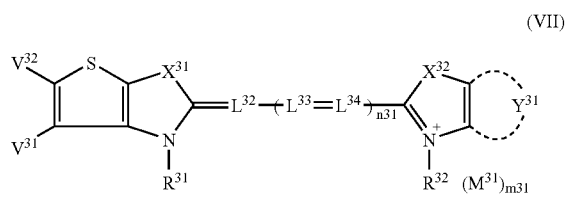

(VII)

wherein $X^{31}$ and $X^{32}$ each represents an oxygen atom, a sulfur atom, or a selenium atom; $V^{31}$ and $V^{32}$ each represents a hydrogen atom or a substituent but they do not represent hydrogen atoms at the same time; $Y^{31}$ represents an atomic group necessary to form a benzene ring or a 5- or 6-membered unsaturated heterocyclic ring, and $Y^{31}$ may further be condensed with other 5- or 6-membered carbocyclic ring or heterocyclic ring, or may have a substituent; $R^{31}$ and $R^{32}$ each is selected from a carboxyalkyl group, a sulfoalkyl group or an alkylsulfonylcarbamoylalkyl group; $L^{32}$, $L^{33}$ and $L^{34}$ each represents a methine group; $n^{31}$ represents an integer of 0 or higher; $M^{31}$ represents a counter ion; and $m^{31}$ represents a number of 0 or higher necessary to neutralize the charge in the molecule.

(14) The methine dye as described in the above item (13), wherein in the methine dye represented by formula (VII), $X^{31}$ represents a sulfur atom; $V^{31}$ represents a hydrogen atom; and $V^{32}$ represents a chlorine atom or a bromine atom.

(15) A methine dye represented by the following formula (VIII):

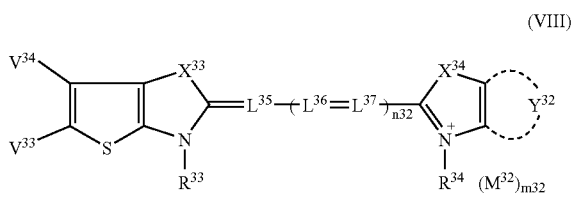

wherein $X^{33}$ and $X^{34}$ each represents an oxygen atom, a sulfur atom, or a selenium atom; $V^{33}$ and $V^{34}$ each represents a hydrogen atom or a substituent but they do not represent hydrogen atoms at the same time; $Y^{32}$ represents an atomic group necessary to form a benzene ring or a 5- or 6-membered unsaturated heterocyclic ring, and $Y^{32}$ may further be condensed with other 5- or 6-membered carbocyclic ring or heterocyclic ring, or may have a substituent; $R^{33}$ and $R^{34}$ each is selected from a carboxyalkyl group, a sulfoalkyl group or an alkylsulfonylcarbamoylalkyl group; $L^{35}$ $L^{36}$ and $L^{37}$ each represents a methine group; $n^{32}$ represents an integer of 0 or higher; $M^{32}$ represents a counter ion; and $m^{32}$ represents a number of 0 or higher necessary to neutralize the charge in the molecule.

(16) The methine dye as described in the above item (15), wherein in the methine dye represented by formula (VIII), $X^{33}$ represents a sulfur atom; $v^{34}$ represents a hydrogen atom; and $V^{33}$ represents a chlorine atom or a bromine atom.

(17) The silver halide photographic material as described in the above item (1) which contains at least one methine dye represented by formula (VII) or (VIII).

(18) The silver halide photographic material as described in the above item (1), wherein in the methine dye represented by formula (I), Y represents a furan ring or a pyrrole ring which may be condensed with other 5- or 6-membered carbocyclic or heterocyclic ring or may have a substituent.

(19) The silver halide photographic material as described in the above item (18), wherein the methine dye represented by formula (I) is represented by the following formula (XX):

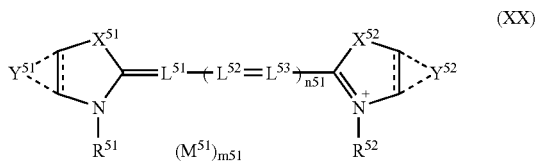

wherein $Y^{51}$ represents a furan ring or a pyrrole ring which may be condensed with other 5- or 6-membered carbocyclic or heterocyclic ring or may have a substituent, and two carbon atoms to which $Y^{51}$ is condensed may be bonded by a single bond or a double bond; $X^{51}$ and $X^{52}$ each represents an oxygen atom, a sulfur atom, a selenium atom, a tellurium atom, a nitrogen atom, or a carbon atom; $Y^{52}$ represents an atomic group necessary to form a benzene ring or a 5- or 6-membered unsaturated heterocyclic ring, which may further be condensed with other 5- or 6-membered carbocyclic or heterocyclic ring or may have a substituent, and two carbon atoms to which $Y^{52}$ is condensed may be bonded by a single bond or a double bond; $R^{51}$ and $R^{52}$ each represents a substituted or unsubstituted alkyl group, a substituted or unsubstituted aryl group, or a substituted or unsubstituted heterocyclic group; $L^{51}$, $L^{52}$ and $L^{53}$ each represents a methine group; $n^{51}$ represents 0, 1, 2, 3 or 4; $M^{51}$ represents a counter ion; and m51 represents a number of 0 or higher necessary to neutralize the charge in the molecule.

(20) The silver halide photographic material as described in the above item (1), wherein in the methine dye represented by formula (I), Y represents a thiophene ring, which maybe condensed with other 5- or 6-membered carbocyclic or heterocyclic ring or may have a substituent but is substituted with at least one substituent.

(21) The silver halide photographic material as described in the above item (20), wherein in the methine dye represented by formula (I), Y represents a thiophene ring which may be condensed with other 5- or 6-membered carbocyclic or heterocyclic ring or may have a substituent but is substituted with at least one halogen atom.

(22) The silver halide photographic material as described in the above item (21), wherein the methine dye represented by formula (I) is represented by the following formula (XXX):

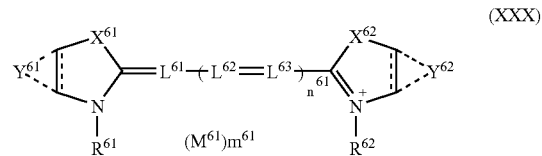

wherein $Y^{61}$ represents a thiophene ring which may be condensed with other 5- or 6-membered carbocyclic or heterocyclic ring or may have a substituent but is substituted with at least one halogen atom, and two carbon atoms to which $Y^{61}$ is condensed may be bonded by a single bond or a double bond; $X^{61}$ and $X^{62}$ each represents an oxygen atom, a sulfur atom, a selenium atom, a tellurium atom, a nitrogen atom, or a carbon atom; $Y^{62}$ represents an atomic group necessary to form a benzene ring or a 5- or 6-membered unsaturated heterocyclic ring, which may be condensed with other 5- or 6-membered carbocyclic or heterocyclic ring or may have a substituent, and two carbon atoms to which $Y^{62}$ is condensed may be bonded by a single bond or a double bond; $R^{61}$ and $R^{62}$ each represents a substituted or unsubstituted alkyl group, a substituted or unsubstituted aryl group, or a substituted or unsubstituted heterocyclic group; $L^{61}$, $L^{62}$ and $L^{63}$ each represents a methine group; $n^{61}$ represents 0 or 1; $M^{61}$ represents a counter ion; and $m^{61}$ represents a number of 0 or higher necessary to neutralize the charge in the molecule.

(23) The silver halide photographic material as described in the above item (22), wherein in the methine dye represented by formula (XXX), $n^{61}$ represents 1.

(24) The silver halide photographic material as described in the above item (22), wherein in the methine dye represented by formula (XXX), at least either $R^{61}$ or $R^{62}$ represents an alkyl group substituted with an acid radical.

(25) The silver halide photographic material as described in the above item (24), wherein in the methine dye represented by formula (XXX), both $R^{61}$ and $R^{62}$ represent an alkyl group substituted with an acid radical.

(26) The silver halide photographic material as described in the above item (25), wherein in the methine dye represented by formula (XXX), at least either $R^{61}$ or $R^{62}$ represents an alkyl group substituted with an acid radical other than a sulfo group.

(27) The silver halide photographic material as described in the above item (26), wherein in the methine dye represented by formula (XXX), at least either $R^{61}$ or $R^{62}$ represents an alkyl group substituted with a carboxyl group, a —CONHSO$_2$— group, an —SO$_2$NHCO— group, a —CONHCO— group, or an —SO$_2$NHSO$_2$— group.

(28) The silver halide photographic material as described in the above item (25) or (26), wherein in the methine dye represented by formula (XXX), one of $R^{61}$ and $R^{62}$ represents an alkyl group substituted with an acid radical other than a sulfo group, and the other represents an alkyl group substituted with a sulfo group.

(29) The silver halide photographic material as described in the above item (28), wherein in the methine dye represented by formula (XXX), either $R^{61}$ or $R^{62}$ represents an alkyl group substituted with a carboxyl group, a —CONHSO$_2$— group, an —SO$_2$NHCO— group, a —CONHCO— group, or an —SO$_2$NHSO$_2$— group, and the other represents an alkyl group substituted with a sulfo group.

(30) The silver halide photographic material as described in the above item (22), wherein the methine dye represented by formula (XXX) is represented by the following formula (XXXI) or (XXXII):

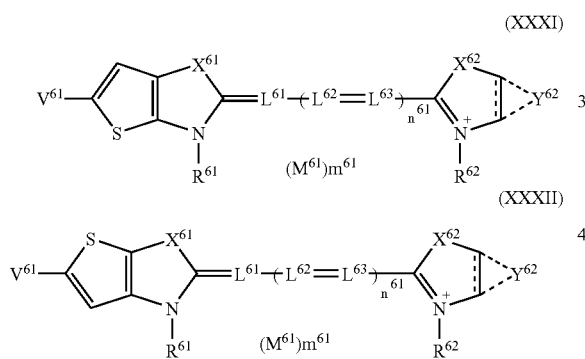

wherein $L^{61}$, $L^{62}$ and $L^{63}$ each represents a methine group; $V^{61}$ represents a halogen atom; $X^{61}$, $X^{62}$, $Y^{62}$, $R^{61}$, $R^{62}$, $L^{61}$, $L^{62}$, $L^{63}$, $n^{61}$, $M^{61}$ and $m^{61}$ each has the same meaning as defined in formula (XXX) in the above item (22).

(31) The silver halide photographic material as described in the above item (30), wherein the methine dye represented by formula (XXXI) or (XXXII) is represented by the following formula (XXXIa) or (XXXIIa):

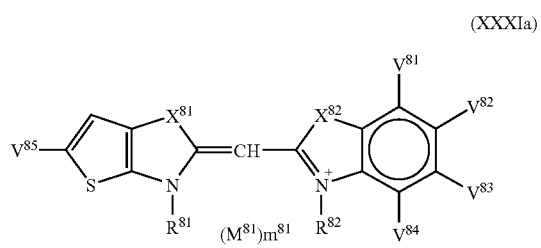

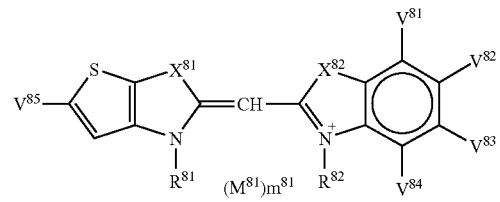

wherein $V^{85}$ represents a halogen atom; $X^{81}$ and $X^{82}$ each represents an oxygen atom or a sulfur atom; $R^{81}$ and $R^{82}$ each represents an alkyl group substituted with an acid radical; $V^{81}$, $V^{82}$, $V^{83}$ and $V^{84}$ each represents a hydrogen atom or a substituent; $M^{81}$ represents a counter ion; and $M^{81}$ represents a number of 0 or higher necessary to neutralize the charge in the molecule.

(32) The silver halide photographic material as described in the above item (31), wherein in the methine dye represented by formula (XXXIa) or (XXXIIa), at least either $R^{81}$, or $R^{82}$, represents an alkyl group substituted with a carboxyl group or an alkanesulfonylcarbamoyl group, and the other represents an alkyl group substituted with a sulfo group.

(33) The silver halide photographic material as described in the above item (30), wherein the methine dye represented by formula (XXXI) or (XXXII) is represented by the following formula (XXXIb) or (XXXIIb):

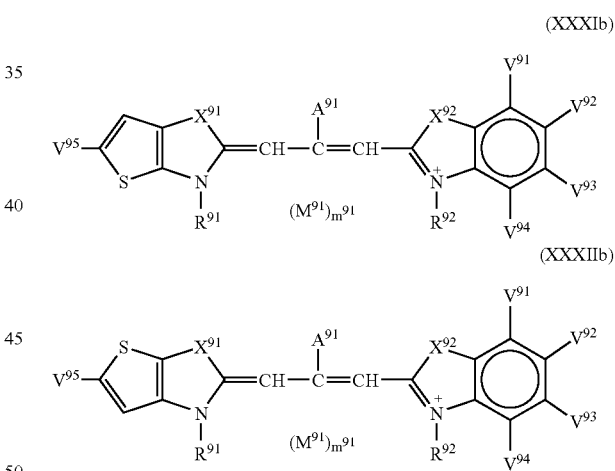

wherein $V^{95}$ represents a halogen atom; $X^{91}$ and $X^{92}$ each represents an oxygen atom or a sulfur atom; $R^{91}$ and $R^{92}$ each represents a substituted or unsubstituted alkyl group, a substituted or unsubstituted aryl group, or a substituted or unsubstituted heterocyclic group; A represents a methyl group, an ethyl group or a propyl group; $V^{91}$, $V^{92}$, $V^{93}$ and $V^{94}$ each represents a hydrogen atom or a substituent; $M^{91}$ represents a counter ion; and $m^{91}$ represents a number of 0 or higher necessary to neutralize the charge in the molecule.

(34) The silver halide photographic material as described in any of the above items (1) to (33), which contains the dye forming J association described in any of the above items (1) to (33).

(35) A methine dye described in any of the above items (18) to (34).

DETAILED DESCRIPTION OF THE INVENTION

The present invention will be described in detail below.

In the first place, the methine dye represented by formula (I) according to the present invention will be described in detail below.

Examples of the 5-membered unsaturated heterocyclic rings formed by Y include a pyrrole ring, a pyrazole ring, an imidazole ring, a triazole ring, a furan ring, an oxazole ring, an isooxazole ring, a thiophene ring, a thiazole ring, an isothiazole ring, a thiadiazole ring, a selenophene ring, a selenazole ring, an isoselenazole ring, a tellurophene ring, a tellurazole ring, and an isotellurazole ring, and examples of the 6-membered unsaturated heterocyclic rings formed by Y include a pyridine ring, a pyridazine ring, a pyrimidine ring, a pyrazine ring, a pyran ring, and a thiopyran ring. Y may further be condensed with other 5- or 6-membered carbocyclic ring or heterocyclic ring to form, e.g., an indole ring, a benzofuran ring, a benzothiophene ring, or a thienothiophene ring. The preferred 5- or 6-membered unsaturated heterocyclic rings formed by Y are a pyrrole ring, a furan ring, a thiophene ring, and a pyridine ring, and particularly preferred is a pyrrole ring, a thiophene ring or a furan ring. Also, the bond between two carbon atoms in which Y is condensed may be a sigle bond or a double bond. Particularly, a double bond is preferred.

The 5- or 6-membered nitrogen-containing heterocyclic ring represented by Z may be condensed with a carbocyclic ring such as a benzene ring, a cyclohexene ring, or a naphthalene ring, or a heterocyclic ring such as a pyrazine ring or a thiophene ring. Z preferably represents an oxazole ring, a thiazole ring, a selenazole ring, an imidazole ring, a 2-pyridine ring, or a 4-pyridine ring. Z more preferably represents an oxazole ring, a thiazole ring, an imidazole ring, or a pyridine ring, still more preferably represents an oxazole ring or a thiazole ring, and particularly preferably a thiazole ring.

The alkyl group represented by R may be substituted or unsubstituted, for example, an unsubstituted alkyl group having from 1 to 18, preferably from 1 to 7, and particularly preferably from 1 to 4,carbon atoms (e.g., methyl, ethyl, propyl, isopropyl, butyl, isobutyl, hexyl, octyl, dodecyl, octadecyl), and a substituted alkyl group having from 1 to 18, preferably from 1 to 7, and particularly preferably from 1 to 4, carbon atoms [examples of the substituents include, e.g., an aryl group having from 6 to 12 carbon atoms (e.g., phenyl, p-chlorophenyl, p-tolyl), an unsaturated hydrocarbon group having from 2 to 6 carbon atoms (e.g., vinyl) , a carboxyl group, a sulfo group, a sulfato group, a cyano group, a halogen atom (e. g. , fluorine, chlorine, bromine, iodine), a hydroxyl group, a mercapto group, an alkoxyl group having from 1 to 7 carbon atoms (e.g., methoxy, ethoxy, 2-methoxyethoxy, benzyloxy), an aryloxy group having from 6 to 12 carbon atoms (e.g., phenoxy, 1-naphthoxy), an alkylthio group having from 1 to 7 carbon atoms (e.g., methylthio), an arylthio group having from 6 to 12 carbon atoms (e.g., phenylthio, 1-naphthylthio), an acyl group having from 1 to 7 carbon atoms (e.g., acetyl, benzoyl), an alkoxycarbonyl group having from 2 to 8 carbon atoms (e.g., ethoxycarbonyl, benzyloxycarbonyl) an aryloxycarbonyl group having from 7 to 13 carbon atoms (e.g., phenoxycarbonyl), an acyloxy group having from 1 to 8 carbon atoms (e.g., acetyloxy), a carbamoyl group (e.g., morpholinocarbonyl), a sulfamoyl group (e.g., N,N-dimethylsulfamoyl), a heterocyclic group (e.g., tetrahydrofuryl), an alkylsulfonylcarbamoyl group (e.g., methanesulfonylcarbamoyl), an acylcarbamoyl group (e.g., acetylcarbamoyl), an acylsulfamoyl group (e.g., acetylsulfamoyl), and an alkylsulfonylsulfamoyl group (e.g., methanesulfonylsulfamoyl) can be exemplified.

The aryl group represented by R may be substituted or unsubstituted, for example, an unsubstituted aryl group having from 6 to 20, preferably from 6 to 15, and more preferably from 6 to 10, carbon atoms (e.g., phenyl, 1-naphthyl), and a substituted aryl group having from 6 to 26, preferably from 6 to 21, and more preferably from 6 to 16, carbon atoms [examples of the substituents include each substituent described above in the substituted alkyl group (an aryl group, an unsaturated hydrocarbon group, a carboxyl group, a sulfo group, a sulfato group, a cyano group, a halogen atom (e.g., fluorine, chlorine, bromine, iodine) a hydroxyl group, a mercapto group, an alkoxyl group, an aryloxy group, an alkylthio group, an arylthio group, an acyl group, an alkoxycarbonyl group, an aryloxycarbonyl group, an acyloxy group, a carbamoyl group, a sulfamoyl group, a heterocyclic group, an alkylsulfonylcarbamoyl group, an acylcarbamoyl group, an acylsulfamoyl group, an alkylsulfonyl sulfamoyl group), and an alkyl group (which may be substituted)] can be exemplified, and preferred is a phenyl group.

The heterocyclic group represented by R may be substituted or unsubstituted, for example, an unsubstituted heterocyclic group having from 1 to 20, preferably from 1 to 15, and more preferably from 1 to 10, carbon atoms (e.g., pyrrole, furan, thiophene), and a substituted azole group having from 1 to 26, preferably 1 to 21, and more preferably 1 to 16, carbon atoms [examples of the substituents include each substituent described above in the substituted alkyl group (an aryl group, an unsaturated hydrocarbon group, a carboxyl group, a sulfo group, a sulfato group, a cyano group, a halogen atom (e.g., fluorine, chlorine, bromine, iodine), a hydroxyl group, a mercapto group, an alkoxyl group, anaryloxy group, an alkylthio group, an arylthio group, an acyl group, an alkoxycarbonyl group, an aryloxycarbonyl group, an acyloxy group, a carbamoyl group, a sulfamoyl group, a heterocyclic group, an alkylsulfonylcarbamoyl group, an acylcarbamoyl group, an acylsulfamoyl group, an alkylsulfonylsulfamoyl group), and an alkyl group (which may be substituted)] can be exemplified.

R preferably represents an alkyl group substituted with a group having an acid radical or a dissociable proton (specifically, a carboxyl group, a sulfo group, a phosphoric acid group, a boric acid group, an alkylsulfonylcarbamoyl group (e.g., methanesulfonylcarbonyl), an acylcarbamoyl group (e.g., acetylcarbamoyl), an acylsulfamoyl group (e.g., acetylsulfamoyl), or an alkylsulfonylsulfamoyl group (e.g., methanesulfonylsulfamoyl)), and more preferably represents a carboxymethyl group, a 2-sulfoethyl group, a 3-sulfopropyl group, a 3-sulfobutyl group, a 4-sulfobutyl group, or a methanesulfonylcarbamoylmethyl group.

The methine group represented by $L^1$ or $L^2$ may have a substituent, and examples of the substituents include each substituent described above in the substituted alkyl group represented by R (an aryl group, an unsaturated hydrocarbon group, a carboxyl group, a sulfo group, a sulfato group, a cyano group, a halogen atom (e.g., fluorine, chlorine, bromine, iodine), a hydroxyl group, a mercapto group, an alkoxyl group, an aryloxy group, an alkylthio group, an arylthio group, an acyl group, an alkoxycarbonyl group, an aryloxycarbonyl group, an acyloxy group, a carbamoyl group, a sulfamoyl group, a heterocyclic group, an alkylsulfonylcarbamoyl group, etc.), and an alkyl group (which may be substituted).

p preferably represents 0.

D represents a group necessary to form a methine dye, and every methine dye can be formed by D. Preferred examples of methine dyes include a cyanine dye, a merocyanine dye, a rhodacyanine dye, a trinuclear merocyanine dye, a holopolar dye, a hemicyanine dye, a styryl dye, etc. These dyes are described in detail in F. M. Harmer, *Heterocyclic Compounds—Cyanine Dyes and Related Compounds*, John Wiley & Sons, New York, London (1964), D. M. Sturmer, *Heterocyclic Compounds—Special Topics in Heterocyclic Chemistry*, Chap. 18, Clause 14, pp. 482 to 515.

Formulae (XI), (XII) and (XIII) disclosed in U.S. Pat. No. 5,340,694, columns 21 and 22 are preferred as general formulae of the cyanine, merocyanine and rhodacyanine dyes, respectively. However, the numbers of n12, n15, n17 and n18 are not limited, and they may be an integer of 0 or more (preferably 4 or less)

Further, when a cyanine dye is formed by D in formula (I), it can be represented by the following resonance formula:

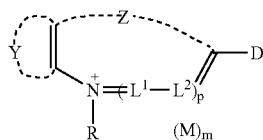

When M is required for neutralizing the ion charge, M is included in the formula for showing the presence of cation or anion. It is depended on the substituent whether a dye is cation or anion, or the dye has a net ion charge or not.

Examples of the cation include inorganic ions such as a hydrogen ion, alkali metal ions (e.g., Na, K, and Li ions) and alkaline earth metal ions (e.g., Ca ion), organic ions such as ammonium ions (e.g., ammonium, tetraalkyl ammonium, pyridinium and ethylpyridinium ions). Examples of the anion may be either of inorganic and organic ions, and include halide ions (fluoride, chloride, bromide and iodide ions), substituted arylsulfonic acid ions (e.g., p-toluen sulfonic acid ion, p-chlorobenzene sulfonic acid ion), aryldisulfonic acid ions (e.g., 1,3-benzene sulfonic acid ion, 2,6-naphthalenedisulfonic acid ion), alkyl sulfonic acid ions (e.g., methyl sulfuric acid ion), a sufonic acid ion, a thiocyanic acid ion, a perchloric acid ion, a tetrafluoroboric acid ion, a picric acid ion, an acetic acid ion, a trifluoromethane sulfonic acid ion.

Examples of the preferred cation include a sodium ion, a potassium ion, a triethylammonium ion, a tetraehtylammonium ion, a pyridinium ion, an ethylpyridinium ion and a methylpyridinium ion. Examples of the preferred anion include a perchloric acid, a iodide ion, a bromide ion, and a substituted arylsulfonic acid ion (e.g., p-toluen sulfonic acid ion).

m represents a number of 0 or more (preferably 0 to 4) necessary for balancing the charge in the molecule. When the inner salt is formed, the number is 0.

The methine dye represented by formula (I) is more preferably represented by the following formula (IX), (X), (XI) or (XII):

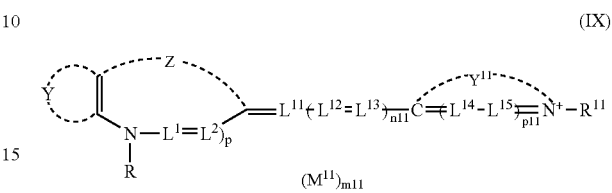

wherein Y, R, Z, $L^1$, $L^2$ and p each has the same meaning as in formula (I); $L^{11}$, $L^{12}$, $L^{13}$, $L^{14}$ and $L^{15}$ each represents a methine group; $p^{11}$ represents 0 or 1; $n^{11}$ represents 0, 1, 2 or 3; $Y^{11}$ represents an atomic group necessary to form a 5- or 6-membered nitrogen-containing heterocyclic ring, and $Y^{11}$ may further be condensed with other carbocyclic ring or heterocyclic ring; $M^{11}$ represents a counter ion; $m^{11}$ represents a number of from 0 to 4 necessary to neutralize the charge in the molecule; and $R^{11}$ represents a substituted or unsubstituted alkyl group, aryl group, or heterocyclic group;

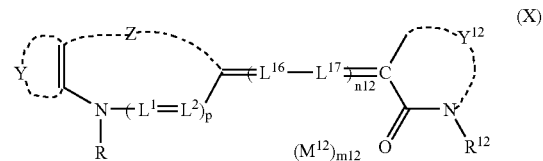

wherein Y, R, Z, $L^1$, $L^2$ and p each has the same meaning as in formula (I); $L^{16}$ and $L^{17}$ each represents a methine group; $n^{12}$ represents 0, 1, 2 or 3; $Y^{12}$ represents an atomic group necessary to form a 5- or 6-membered nitrogen-containing heterocyclic ring; $M^{12}$ represents a counter ion; $m^{12}$ represents a number of from 0 to 4 necessary to neutralize the charge in the molecule; and $R^{12}$ represents a substituted or unsubstituted alkyl group, aryl group, or heterocyclic group;

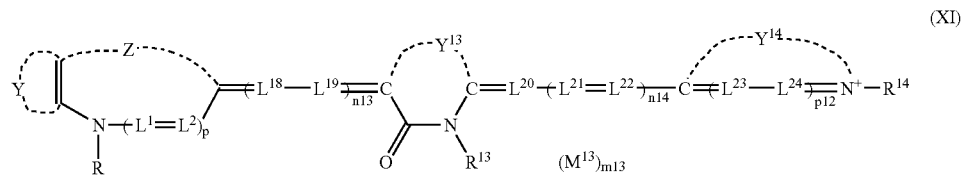

wherein Y, R, Z, $L^1$, $L^2$ and p each has the same meaning as in formula (I); $L^{18}$, $L^{19}$, $L^{20}$, $L^{21}$, $L^{22}$, $L^{23}$ and $L^{24}$ each represents a methine group; $p^{12}$ represents 0 or 1; $n^{13}$ and $n^{14}$ each represents 0, 1, 2 or 3; $Y^{13}$ and $Y^{14}$ each represents an atomic group necessary to form a 5- or 6-membered nitrogen-containing heterocyclic ring, provided that y¹⁴ may further be condensed with other carbocyclic ring or heterocyclic ring; M¹³ represents a counter ion; m¹³ represents a number of from 0 to 4 necessary to neutralize the charge in the molecule; and R¹³ and R¹⁴ each represents a substituted or unsubstituted alkyl group, aryl group, or heterocyclic group;

done, 1,2,3,4-tetrahydroquinoline-2,4-dione, 3-oxo-2,3-dihydrobenzo[d]thiophene-1,1-dioxide, and 3-dicyanomethylene-2,3-dihydrobenzo[d]thiophene-1,1-dioxide.

$Y^{12}$ preferably represents hydantoin, 2- or 4-thiohydantoin, 2-oxazolin-5-one, 2-thiooxazoline-2,4-dione, thiazolidine-2,4-dione, rhodanine, thiazolidine-2,4-dithione, barbi-

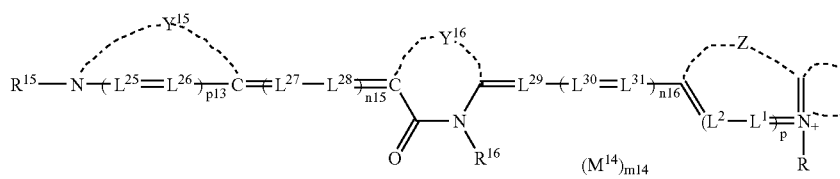

(XII)

wherein Y, R, Z, $L^1$, $L^2$ and p each has the same meaning as in formula (I); $L^{25}$, $L^{26}$, $L^{27}$, $L^{28}$, $L^{29}$, $L^{30}$ and $L^{31}$ each represents a methine group; $p^{13}$ represents 0 or 1; $n^{15}$ and $n^1$ each represents 0, 1, 2 or 3; $y^{15}$ and $Y^{16}$ each represents an atomic group necessary to form a 5- or 6-membered nitrogen-containing heterocyclic ring, provided that $Y^{15}$ may further be condensed with other carbocyclic ring or heterocyclic ring; $M^{14}$ represents a counter ion; $m^{14}$ represents a number of from 0 to 4 necessary to neutralize the charge in the molecule; and $R^{15}$ and $R^{16}$ each represents a substituted or unsubstituted alkyl group, aryl group, or heterocyclic group.

The 5- or 6-membered nitrogen-containing heterocyclic ring represented by $Y^{11}$, $Y^{14}$ or $y^{15}$ in formula (IX), (XI) or (XII) may further be condensed with other 5- or 6-membered carbocyclic ring or heterocyclic ring. As the carbocyclic ring, a benzene ring and a naphthalene ring, and as the heterocyclic ring, a pyrazine ring and a thiophene ring can be exemplified. Specifically, the heterocyclic rings exemplified as the examples of $Z^1$ described later are preferably used.

$Y^{12}$ represents an atomic group necessary to form an acidic nucleus and any form of an acidic nucleus of general merocyanine dyes can be used. An acidic nucleus used in the present invention is defined, for example, by T. H. James, *The Theory of the Photographic Process*, 4th Ed., p. 198, Macmillan (1977). Specifically, those disclosed in U.S. Pat. Nos. 3,567,719, 3,575,869, 3,804,634, 3,837,862, 4,002,480, 4,925,777 and JP-A-3-167546 (the term "JP-A" as used herein means an "unexamined published Japanese patent application")can be exemplified.

When an acidic nucleus forms a 5- or 6-membered nitrogen-containing heterocyclic ring comprising carbon, nitrogen and chalcogen (typically, oxygen, sulfur, selenium, tellurium) atoms, the following nuclei can be exemplified: 2-pyrazolin-5-one, pyrazolidine-3,5-dione, imidazolin-5-one, hydantoin, 2- or 4-thiohydantoin, 2-iminooxazolidin-4-one, 2-oxazolin-5-one, 2-thiooxazoline-2,4-dione, isooxazolin-5-one, 2-thiazolin-4-one, thiazolidin-4-one, thiazolidine-2,4-dione, rhodanine, thiazolidine-2,4-dithione, isorhodanine, indane-1,3-dione, thiophen-3-one, thiophen-3-one-1,1-dioxide, indolin-2-one, indolin-3-one, 2-oxoindazolinium, 3-oxo-indazolinium, 5,7-dioxo-6,7-dihydrothiazolo[3,2-a]pyrimidine, cyclohexane-1,3-dione, 3,4-dihydroisoquinolin-4-one, 1,3-dioxane-4,6-dione, barbituric acid, 2-thiobarbituric acid, chroman-2,4-dione, indazolin-2-one, pyrido[1,2-a]pyrimidine-1,3-dione, pyrazolo[1,5-b]quinazolone, pyrazolo[1,5-a]benzimidazole, pyrazolopyrituric acid, and 2-thiobarbituric acid, more preferably hydantoin, 2- or 4-thiohydantoin, 2-oxazolin-5-one, rhodanine, barbituric acid, and 2-thiobarbituric acid, and particularly preferably 2- or 4-thiohydantoin, 2-oxazolin-5-one and rhodanine.

The 5- or 6-membered nitrogen-containing heterocyclic ring formed by $Y^{13}$ or $Y^{16}$ is a heterocyclic ring obtained by eliminating an oxo group or a thioxo group from the heterocyclic ring formed by $Y^{12}$, preferably eliminating an oxo group or a thioxo group from hydantoin, 2- or 4-thiohydantoin, 2-oxazolin-5-one, 2-thiooxazoline-2,4-dione, thiazolidine-2,4-dione, rhodanine, thiazolidine-2,4-dithione, barbituric acid, or 2-thiobarbituric acid, more preferably eliminating an oxo group or a thioxo group from hydantoin, 2- or 4-thiohydantoin, 2-oxazolin-5-one, rhodanine, barbituric acid, or 2-thiobarbituric acid, and particularly preferably eliminating an oxo group or a thioxo group from 2- or 4-thiohydantoin, 2-oxazolin-5-one, or rhodanine.

$R^{11}$, $R^{12}$, $R^{13}$, $R^{14}$, $R^{15}$ and $R^{16}$ each represents a substituted or unsubstituted alkyl group, aryl group, or heterocyclic group, and examples of the substituents described above in R in the methine dye represented by formula (I) are preferred.

$L^{11}$, $L^{12}$, $L^{13}$, $L^{14}$, $L^{15}$, $L^{16}$, $L^{17}$, $L^{18}$, $L^{19}$, $L^{20}$, $L^{21}$, $L^{22}$, $L^{23}$, $L^{24}$, $L^{25}$, $L^{26}$, $L^{27}$, $L^{28}$, $L^{29}$, $L^{30}$ and $L^{31}$ each represents a methine group, and each methine group may have a substituent, and examples of the substituents include each substituent described above in the substituted alkyl group represented by R in the methine dye represented by formula (I) (an aryl group, an unsaturated hydrocarbon group, a carboxyl group, a sulfo group, a sulfato group, a cyano group, a halogen atom (e.g., fluorine, chlorine, bromine, iodine), a hydroxyl group, a mercapto group, an alkoxyl group, an aryloxy group, an alkylthio group, an arylthio group, an acyl group, an alkoxycarbonyl group, an aryloxycarbonyl group, an acyloxy group, a carbamoyl group, a sulfamoyl group, a heterocyclic group, an alkylsulfonylcarbamoyl group, an acylcarbamoyl group, an acylsulfamoyl group, an alkylsulfonylsulfamoyl group, etc.), and an alkyl group (which may be substituted).

Any of $L^{11}$ to $L^{31}$ may form a ring together with other methine group, or may form a ring with $Y^{11}$, $Y^{12}$, $Y^{13}$, $Y^{14}$, $Y^{15}$ or $Y^{16}$.

$n^{11}$, $n^{12}$, $n^{13}$ and $n^{15}$ preferably represents 0, 1 or 2, more preferably 0 or 1, and particularly preferably 1. $n^{14}$ and $n^{16}$ preferably represents 0 or 1, more preferably 0. When $n^{11}$, $n^{12}$, $n^{13}$, $n^{14}$, $n^{15}$ and $n^{16}$ each represents 2 or more, a methine group is repeated but it is not necessary to be the same group.

$p^{11}$, $p^{12}$ and $p^{13}$ each represents 0 or 1, preferably 0.

$M^{11}$, $M^{12}$, $M^{13}$, $M^{14}$, $m^{11}$, $m^{12}$, $m^{13}$ and $m^{14}$ each has the same meaning and the same content, as M and m in the methine dye represented by formula (I).

The condensed ring containing Y and Z in the methine dye represented by formula (I) is preferably selected from Y-1 to Y-26, provided that Y-1 to Y-26 may further be condensed with other 5- or 6-membered carbocylic ring or heterocyclic ring, or may have a substituent. Of Y-1 to Y-26, Y-1 to Y-9 are particularly preferred.

The methine dye represented by formula (I) is more preferably represented by formula (II) or (III).

In formula (II), $X^{21}$ and $X^{22}$ each represents an oxygen atom, a sulfur atom, or a selenium atom, preferably an oxygen atom or a sulfur atom, and particularly preferably $X^{21}$ and $X^{22}$ both represent sulfur atoms.

As the substituents represented by $V^{21}$ and $V^{22}$, each substituent described above in the substituted alkyl group represented by R (an aryl group, an unsaturated hydrocarbon group, a carboxyl group, a sulfo group, a sulfato group, a cyano group, a halogen atom (e.g., fluorine, chlorine, bromine, iodine), a hydroxyl group, a mercapto group, an alkoxyl group, an aryloxy group, an alkylthio group, an arylthio group, an acyl group, an alkoxycarbonyl group, an aryloxycarbonyl group, an acyloxy group, a carbamoyl group, a sulfamoyl group, a heterocyclic group, an alkylsulfonylcarbamoyl group, an acylcarbamoyl group, an acylsulfamoyl group, an alkylsulfonylsulfamoyl group, etc.), and an alkyl group (which may be substituted) can be exemplified.

$V^{21}$ and $V^{22}$ may be linked to form a condensed ring, e.g., a benzene ring, a cyclohexene ring, a naphthalene ring, or a thiophene ring, but it is preferred not to form the condensed ring.

As the substituents represented by $V^{21}$ and $V^{22}$, a hydrogen atom, a halogen atom (e.g., fluorine, chlorine, bromine, iodine), a cyano group, a methyl group, a methoxy group, and a methylthio group are preferred, but it is preferred that $V^{21}$ and $V^{22}$ do not represent hydrogen atoms at the same time. $V^{21}$ more preferably represents a hydrogen atom. $V^{22}$ more preferably represents a chlorine atom, a bromine atom, an iodine atom, or a cyano group, particularly preferably represents a chlorine atom or a bromine atom, and most preferably a bromine atom.

The substituent represented by R is preferably a carboxyalkyl group, a sulfoalkyl group or an alkylsulfonyl-carbamoylalkyl group, and particularly preferably a carboxymethyl group, a 2-sulfoethyl group, a 3-sulfopropyl group, a 3-sulfobutyl group, a 4-sulfobutyl group or a methanesulfonylcarbamoylmethyl group.

In formula (III), $X^{23}$ and $X^{24}$ each represents an oxygen atom, a sulfur atom, or a selenium atom, preferably an oxygen atom or a sulfur atom, and particularly preferably $X^{23}$ and $X^{24}$ both represent sulfur atoms.

As the substituents represented by $V^{23}$ and $V^{24}$, each substituent described above in the substituted alkyl group represented by R (an aryl group, an unsaturated hydrocarbon group, a carboxyl group, a sulfo group, a sulfato group, a cyano group, a halogen atom (e.g., fluorine, chlorine, bromine, iodine), a hydroxyl group, a mercapto group, an alkoxyl group, an aryloxy group, an alkylthio group, an arylthio group, an acyl group, an alkoxycarbonyl group, an aryloxycarbonyl group, an acyloxy group, a carbamoyl group, a sulfamoyl group, a heterocyclic group, an alkylsulfonylcarbamoyl group, an acylcarbamoyl group, an acylsulfamoyl group, an alkylsulfonylsulfamoyl group, etc.), and an alkyl group (which may be substituted) can be exemplified.

$V^{23}$ and $V^{24}$ may be linked to form a condensed ring further, e.g., a benzene ring, a cyclohexene ring, a naphthalene ring, or a thiophene ring, but it is preferred not to form the condensed ring.

As the substituents represented by $V^{23}$ and $V^{24}$, a hydrogen atom, a halogen atom (e.g., fluorine, chlorine, bromine, iodine), a cyano group, a methyl group, a methoxy group, and a methylthio group are preferred, but it is preferred that $V^{23}$ and $V^{24}$ do not represent hydrogen atoms at the same time. When $X^{23}$ represents a sulfur atom, $V^{23}$ is preferably not a phenyl group and $V^{24}$ is preferably not a methyl group. $V^{24}$ more preferably represents a hydrogen atom. $V^{23}$ more preferably represents a chlorine atom, a bromine atom, an iodine atom, or a cyano group, particularly preferably represents a chlorine atom or a bromine atom, and most preferably a bromine atom.

The substituent represented by R is preferably a carboxyalkyl group, a sulfoalkyl group or an alkylsulfonyl-carbamoylalkyl group, and particularly preferably a carboxymethyl group, a 2-sulfoethyl group, a 3-sulfopropyl group, a 3-sulfobutyl group, a 4-sulfobutyl group or a methanesulfonylcarbamoylmethyl group.

The methine dye represented by formula (II) is particularly preferably represented by formula (VII), and the methine dye represented by formula (III) is particularly preferably represented by formula (VIII).

In formula (VII), $X^{31}$ and $X^{32}$ each represents an oxygen atom, a sulfur atom, or a selenium atom, preferably represents an oxygen atom or a sulfur atom. $X^{31}$ particularly preferably represents a sulfur atom.

$V^{31}$ and $V^{32}$ each represents a hydrogen atom or a substituent but they do not represent hydrogen atoms at the same time. As the substituents represented by $V^{31}$ and $V^{32}$, each substituent described above in the substituted alkyl group represented by R (an aryl group, an unsaturated hydrocarbon group, a carboxyl group, a sulfo group, a sulfato group, a cyano group, a halogen atom (e.g., fluorine, chlorine, bromine, iodine), a hydroxyl group, a mercapto group, an alkoxyl group, an aryloxy group, an alkylthio group, an arylthio group, an acyl group, an alkoxycarbonyl group, an aryloxycarbonyl group, an acyloxy group, a carbamoyl group, a sulfamoyl group, a heterocyclic group, an alkylsulfonylcarbamoyl group, an acylcarbamoyl group, an acylsulfamoyl group, an alkylsulfonylsulfamoyl group, etc.), and an alkyl group (which may be substituted) can be exemplified.

As the substituents represented by $V^{31}$ and $V^{32}$, a hydrogen atom, a halogen atom (e.g., fluorine, chlorine, bromine, iodine), a cyano group, a methyl group, a methoxy group, and a methylthio group are preferred. $V^{31}$ more preferably represents a hydrogen atom. $V^{32}$ more preferably represents a chlorine atom, a bromine atom, an iodine atom, or a cyano group, particularly preferably represents a chlorine atom or a bromine atom, and most preferably a bromine atom.

$Y^{31}$ represents an atomic group necessary to form a benzene ring or a 5- or 6-membered unsaturated heterocyclic ring. As the 5- or 6-membered unsaturated heterocyclic ring formed by $Y^{31}$, each heterocyclic ring described above in Y of the methine dye represented by formula (I) can be exemplified. $y^{31}$ may further form a condensed ring with other 5- or 6-membered carbocyclic ring or heterocyclic ring, but it is preferred not to form the condensed ring. The ring formed by $Y^{31}$ is preferably a benzene ring, a pyrrole ring, a furan ring, a thiophene ring, or a pyridine ring, and particularly preferably a benzene ring, a furan ring or a thiophene ring.

$R^{31}$ and $R^{32}$ each is selected from a carboxyalkyl group, a sulfoalkyl group or an alkylsulfonylcarbamoylalkyl group, and each particularly preferably represents a carboxymethyl group, a 2-sulfoethyl group, a 3-sulfopropyl group, a 3-sulfobutyl group, a 4-sulfobutyl group, or a methanesulfonylcarbamoylmethyl group.

$n^{31}$ preferably represents 0 or 1.

The methine group represented by $L^{32}$, $L^{33}$ and $L^{34}$ may be substituted or unsubstituted, and examples of the substituents include each substituent described above in the substituted alkyl group represented by R in the methine dye represented by formula (I) (an aryl group, an unsaturated hydrocarbon group, a carboxyl group, a sulfo group, a sulfato group, a cyano group, a halogen atom (e.g., fluorine, chlorine, bromine, iodine), a hydroxyl group, a mercapto group, an alkoxyl group, an aryloxy group, an alkylthio group, an arylthio group, an acyl group, an alkoxycarbonyl group, an aryloxycarbonyl group, an acyloxy group, a carbamoyl group, a sulfamoyl group, a heterocyclic group, an alkylsulfonylcarbamoyl group, an acylcarbamoyl group, an acylsulfamoyl group, an alkylsulfonylsulfamoyl group, etc.), and an alkyl group (which may be substituted). $L^{32}$ preferably represents an unsubstituted methine group. When $n^{31}$ represents 1, $L^{34}$ preferably represents an unsubstituted methine group. The substituents of $L^{33}$ include an unsubstituted alkyl group, in particular, a methyl group or an ethyl group is preferred.

Examples of $M^{31}$ include the same ions as described in M in the methine dye represented by formula (I). Preferred cations include sodium, potassium, triethylammonium, pyridinium and N-ethylpyridinium ions, and preferred anions include bromide, iodide, p-toluenesulfonate and perchlorate ions.

$m^{31}$ represents a number of 0 or higher necessary to neutralize the charge in the molecule, and when an inner salt is formed, $m^{31}$ represents 0. $m^{31}$ preferably represents 0, 1, 2 or 3.

When the methine dye represented by formula (VII) is used as a blue-sensitive dye, a preferred combination is a combination in which $X^{31}$ represents a sulfur atom, $X^{32}$ represents an oxygen atom or a sulfur atom, $Y^{31}$ represents a benzene ring, $V^{32}$ represents a chlorine atom, a bromine atom, an iodine atom, or a cyano group, $V^{31}$ represents a hydrogen atom, $R^{31}$ and $R^{32}$ each represents a carboxymethyl group, a 2-sulfoethyl group, a 3-sulfopropyl group, a 3-sulfobutyl group, a 4-sulfobutyl group, or a methanesulfonylcarbamoylmethyl group, $n^{31}$ represents 0, $L^{32}$ represents an unsubstituted methine group, $M^{31}$ represents an inorganic or organic cation, and $m^{31}$ represents 0 or 1. A combination in which $V^{32}$ represents a chlorine atom or a bromine atom, either $R^{31}$ or $R^{32}$ represents a 3-sulfopropyl group or a 4-sulfobutyl group, and the other represents a carboxymethyl group or a methanesulfonylcarbamoylmethyl group is particularly preferred.

When the methine dye represented by formula (VII) is used as a green-sensitive dye or a red-sensitive dye, a preferred combination is a combination in which $X^{31}$ represents a sulfur atom, $X^{32}$ represents an oxygen atom or a sulfur atom, $Y^{31}$ represents a benzene ring, $V^{32}$ represents a chlorine atom, a bromine atom, an iodine atom, or a cyano group, $V^{31}$ represents a hydrogen atom, $R^{31}$ and $R^{32}$ each represents a carboxymethyl group, a 2-sulfoethyl group, a 3-sulfopropyl group, a 3-sulfobutyl group, a 4-sulfobutyl group, or a methanesulfonylcarbamoylmethyl group, $n^{31}$ represents 1, $L^{32}$ and $L^{34}$ each represents an unsubstituted methine group, $L^{33}$ represents a methine group substituted with a methyl group or an ethyl group, $M^{31}$ represents an inorganic or organic cation, and $m^{31}$ represents 0 or 1. A combination in which $V^{32}$ represents a chlorine atom or a bromine atom, either $R^{31}$ or $R^{32}$ represents a 3-sulfopropyl group or a 4-sulfobutyl group, and the other represents a carboxymethyl group or a methanesulfonylcarbamoylmethyl group is particularly preferred.

In formula (VIII), $X^{33}$ and $X^{34}$ each represents an oxygen atom, a sulfur atom, or a selenium atom, preferably an oxygen atom or a sulfur atom. $X^{33}$ particularly preferably represents a sulfur atom.

$V^{33}$ and $V^{34}$ each represents a hydrogen atom or a substituent but they do not represent hydrogen atoms at the same time. As the substituents represented by $V^{33}$ and $V^{34}$, each substituent described above in the substituted alkyl group represented by R (an aryl group, an unsaturated hydrocarbon group, a carboxyl group, a sulfo group, a sulfato group, a cyano group, a halogen atom (e.g., fluorine, chlorine, bromine, iodine), a hydroxyl group, a mercapto group, an alkoxyl group, an aryloxy group, an alkylthio group, an arylthio group, an acyl group, an alkoxycarbonyl group, an aryloxycarbonyl group, an acyloxy group, a carbamoyl group, a sulfamoyl group, a heterocyclic group, an alkylsulfonylcarbamoyl group, an acylcarbamoyl group, an acylsulfamoyl group, an alkylsulfonylsulfamoyl group, etc.), and an alkyl group (which may be substituted) can be exemplified.

As the substituents represented by $V^{33}$ and $V^{34}$, a hydrogen atom, ahalogen atom (e.g., fluorine, chlorine, bromine, iodine), a cyano group, a methyl group, a methoxy group, and a methylthio group are preferred. $V^{34}$ more preferably represents a hydrogen atom. $V^{33}$ more preferably represents a chlorine atom, a bromine atom, an iodine atom, or a cyano group, particularly preferably represents a chlorine atom or a bromine atom, and most preferably a bromine atom.

$Y^{32}$ represents an atomic group necessary to form a benzene ring or a 5- or 6-membered unsaturated heterocyclic ring. As the 5- or 6-membered unsaturated heterocyclic ring formed by $Y^{32}$, each heterocyclic ring described above in Y of the methine dye represented by formula (I) can be exemplified. $Y^{32}$ may further form a condensed ring with other 5- or 6-membered carbocyclic ring or heterocyclic ring, but it is preferred not to form the condensed ring. The ring formed by $Y^{32}$ is preferably a benzene ring, a pyrrole ring, a furan ring, a thiophene ring, or a pyridine ring, and particularly preferably a benzene ring, a furan ring or a thiophene ring.

$R^{33}$ and $R^{34}$ each is selected from a carboxyalkyl group, a sulfoalkyl group or an alkylsulfonylcarbamoylalkyl group, and each particularly preferably represents a carboxymethyl group, a 2-sulfoethyl group, a 3-sulfopropyl group, a 3-sulfobutyl group, a 4-sulfobutyl group, or a methanesulfonylcarbamoylmethyl group.

$n^{32}$ preferably represents 0 or 1.

The methine group represented by $L^{35}$, $L^{36}$ and $L^{37}$ may be substituted or unsubstituted, and examples of the substituents include each substituent described above in the substituted alkyl group represented by R in the methine dye represented by formula (I) (an aryl group, an unsaturated hydrocarbon group, a carboxyl group, a sulfo group, a sulfato group, a cyano group, a halogen atom (e.g., fluorine, chlorine, bromine, iodine), a hydroxyl group, a mercapto group, an alkoxyl group, an aryloxy group, an alkylthio group, an arylthio group, an acyl group, an alkoxycarbonyl group, an aryloxycarbonyl group, an acyloxy group, a carbamoyl group, a sulfamoyl group, a heterocyclic group, an alkylsulfonylcarbamoyl group, an acylcarbamoyl group, an acylsulfamoyl group, an alkylsulfonylsulfamoyl group, etc.), and an alkyl group (which may be substituted). $L^{35}$ preferably represents an unsubstituted methine group. When $n^{32}$ represents 1, $L^{37}$ preferably represents an unsubstituted methine group. The substituents of $L^{36}$ include an unsubstituted alkyl group, in particular, a methyl group or an ethyl group is preferred.

Examples of $M^{33}$ include the same ions as described in M in the methine dye represented by formula (I). Preferred cations include sodium, potassium, triethylammonium, pyridinium and N-ethylpyridinium ions, and preferred anions include bromide, iodide, p-toluenesulfonate and perchlorate ions.

$m^{33}$ represents a number of 0 or higher necessary to neutralize the charge in the molecule, and when an inner salt is formed, $m^{33}$ represents 0. $m^{33}$ preferably represents 0, 1, 2 or 3, more preferably 0 or 1.

When the methine dye represented by formula (VIII) is used as a blue-sensitive dye, a preferred combination is a combination in which $X^{33}$ represents a sulfur atom, $X^{34}$ represents an oxygen atom or a sulfur atom, $Y^{33}$ represents a benzene ring, $V^{33}$ represents a chlorine atom, a bromine atom, an iodine atom, or a cyano group, $V^{34}$ represents a hydrogen atom, $R^{33}$ and $R^{34}$ each represents a carboxymethyl group, a 2-sulfoethyl group, a 3-sulfopropyl group, a 3-sulfobutyl group, a 4-sulfobutyl group, or a methanesulfonylcarbamoylmethyl group, $n^{32}$ represents 0, $L^{35}$ represents an unsubstituted methine group, $M^{32}$ represents an inorganic or organic cation, and $m^{32}$ represents 0 or 1. A combination in which $V^{33}$ represents a chlorine atom or a bromine atom, either $R^{33}$ or $R^{34}$ represents a 3-sulfopropyl group or a 4-sulfobutyl group, and the other represents a carboxymethyl group or a methanesulfonylcarbamoylmethyl group is particularly preferred.

When the methine dye represented by formula (VIII) is used as a green-sensitive dye or a red-sensitive dye, a preferred combination is a combination in which $X^{33}$ represents a sulfur atom, $X^{34}$ represents an oxygen atom or a sulfur atom, $Y^{33}$ represents a benzene ring, $V^{33}$ represents a chlorine atom, abromine atom, an iodine atom, or a cyano group, $V^{34}$ represents a hydrogen atom, $R^{33}$ and $R^{34}$ each represents a carboxymethyl group, a 2-sulfoethyl group, a 3-sulfopropyl group, a 3-sulfobutyl group, a 4-sulfobutyl group, or a methanesulfonylcarbamoylmethyl group, $n^{32}$ represents 1, $L^{35}$ and $L^{36}$ each represents an unsubstituted methine group, $L^{36}$ represents a methine group substituted with a methyl group or an ethyl group, $M^{33}$ represents an inorganic or organic cation, and $m^{33}$ represents 0 or 1. A combination in which $V^{33}$ represents a chlorine atom or a bromine atom, either $R^{33}$ or $R^{34}$ represents a 3-sulfopropyl group or a 4-sulfobutyl group, and the other represents a carboxymethyl group or a methanesulfonylcarbamoylmethyl group is particularly preferred.

The methine dye represented by formula (I) is further preferably represented by formula (IV).

In formula (IV), $X^1$ represents an oxygen atom, a sulfur atom, a selenium atom, a tellurium atom,

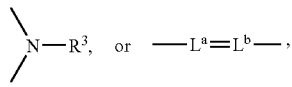

preferably an oxygen atom, a sulfur atom, a selenium atom, and particularly preferably an oxygen atom or a sulfur atom.

As the 5- or 6-membered unsaturated heterocyclic ring formed by $Y^1$, each heterocyclic ring described above in Y of the methine dye represented by formula (I) can be exemplified. $Y^1$ may further form a condensed ring with other 5- or 6-membered carbocyclic ring or heterocyclic ring, but it is preferred not to form the condensed ring. The ring formed by $Y^1$ is preferably a pyrrole ring, a furan ring, a thiophene ring, or a pyridine ring, and particularly preferably a pyrrole ring, a furan ring or a thiophene ring.

The 5- or 6-membered nitrogen-containing heterocyclic ring formed by $Z^1$ may be condensed with a carbocyclic ring such as a benzene ring, a cyclohexene ring, or a naphthalene ring, or a heterocyclic ring such as a pyrazine ring, a pyrrole ring, a furan ring or a thiophene ring.

Preferred examples of the rings represented by $Z^1$ include a thiazoline ring, a thiazole ring, a benzothiazole ring, an oxazoline ring, an oxazole ring, abenzoxazole ring, a selenazoline ring, a selenazole ring, a benzoselenazole ring, a 3,3-dialkylindolenine ring (e.g., 3,3-dimethylindolenine), an imidazoline ring, an imidazole ring, a benzimidazole ring, a 2-pyridine ring, a 4-pyridine ring, a 2-quinoline ring, a 4-quinoline ring, a 1-isoquinoline ring, a 3-isoquinoline ring, an imidazo[4,5-b]quinoxaline ring, an oxadiazole ring, a thiadiazole ring, a tetrazole ring, and a pyrimidine ring.

Of these, more preferred are a benzoxazole ring, a benzothiazole ring, a benzimidazole ring and a quinoline ring, still more preferred are a benzoxazole ring and a benzothiazole ring, and particularly preferred is a benzothiazole ring. These rings may be substituted with each substituent described above in the substituted alkyl group represented by R.

As the alkyl group, aryl group, and heterocyclic group represented by $R^1$, $R^2$ and $R^3$, each group described above in R in the methine dye represented by formula (I) can be exemplified. $R^1$ and $R^2$ each preferably represents an alkyl group substituted with a group having an acid radical or a dissociable proton (specifically, a carboxyl group, a sulfo group, a phosphoric acid group, a boric acid group, an alkylsulfonylcarbamoyl group (e.g., methanesulfonylcarbonyl), an acylcarbamoyl group (e.g., acetylcarbamoyl), an acylsulfamoyl group (e.g., acetylsulfamoyl), or an alkylsulfonylsulfamoyl group (e.g., methanesulfonylsulfamoyl)), and more preferably represents a 2-sulfoethyl group, a 3-sulfopropyl group, a 3-sulfobutyl group, or a 4-sulfobutyl group.

$R^3$ preferably represents an unsubstituted alkyl group, particularly preferably a methyl group or an ethyl group.

Each methine group represented by $L^a$, $L^b$, $L^3$, $L^4$, $L^5$, $L^6$ and $L^7$ may be substituted or unsubstituted, and examples of the substituents include each substituent described above in the substituted alkyl group represented by R in the methine dye represented by formula (I) (an aryl group, an unsaturated hydrocarbon group, a carboxyl group, a sulfo group, a sulfato group, a cyano group, a halogen atom (e.g., fluorine, chlorine, bromine, iodine), a hydroxy group, a mercapto group, an alkoxyl group, an aryloxy group, an alkylthio group, an arylthio group, an acyl group, an alkoxycarbonyl group, an aryloxycarbonyl group, an acyloxy group, a carbamoyl group, a sulfamoyl group, a heterocyclic group, an alkylsulfonylcarbamoyl group, an acylcarbamoyl group, an acylsulfamoyl group, an alkylsulfonylsulfamoyl group, etc.), and an alkyl group (which may be substituted).

$L^a$ and $L^b$ each preferably represents an unsubstituted methine group.

$n^1$ represents an integer of 0 or higher, preferably 0, 1, 2, 3 or 4, more preferably 0, 1 or 2, and still more preferably 0 or 1.

$p^1$ represents 0 or 1, preferably 0.

Examples of $M^1$ include the same ions as described in M in the methine dye represented by formula (I). Preferred cations include sodium, potassium, triethylammonium, pyridinium and N-ethylpyridinium ions, and preferred anions include bromide, iodide, p-toluenesulfonate and perchlorate ions.

$m^1$ represents a number of 0 or higher necessary to neutralize the charge in the molecule, and when an inner salt is formed, ml represents 0. $m^1$ preferably represents 0, 1, 2 or 3.

As another form of the methine dye represented by formula (IV), it is preferred that at least one of the atomic group constituting the heterocyclic ring $Y^1$ (exclusive of the substituents on the ring) and $X^1$ contains an oxygen atom. In this case, the $X^1$ moiety may form an oxazole ring, or the $Y^1$ moiety may form a furan ring, an oxazole ring, an isooxazole ring, or a pyran ring. Preferred is the case in which the $X^1$ moiety forms an oxazole ring or the case in which the $Y^1$ moiety form a furan ring.

When the methine dye represented by formula (IV) is used as a blue-sensitive dye, the methine dye is more preferably represented by formula (V).

In formula (V), $X^3$ and $X^4$ each represents an oxygen atom, a sulfur atom, or a selenium atom, preferably an oxygen atom or a sulfur atom.

As the 5- or 6-membered unsaturated heterocyclic ring formed by $Y^4$, each heterocyclic ring described above in Y of the methine dye represented by formula (I) can be exemplified. $Y^4$ may further form a condensed ring with other 5- or 6-membered carbocyclic ring or heterocyclic ring, but it is preferred not to form the condensed ring. The ring formed by $Y^4$ is preferably a pyrrole ring, a furan ring, a thiophene ring, or a pyridine ring, and particularly preferably, pyrrole ring, a furan ring or a thiophene ring. $Y^4$ may form a benzene ring or a naphthalene ring, preferably a benzene ring.

As the alkyl group, aryl group, and heterocyclic group represented by $R^4$ and $R^5$, each group described above in R in the methine dye represented by formula (I) can be exemplified. $R^4$ and $R^5$ each preferably represents an alkyl group substituted with a group having an acid radical or a dissociable proton (specifically, a carboxyl group, a sulfo group, a phosphoric acid group, a boric acid group, an alkylsulfonylcarbamoyl group (e.g., methanesulfonylcarbonyl), an acylcarbamoyl group (e.g., acetylcarbamoyl), an acylsulfamoyl group (e.g., acetylsulfamoyl), or an alkylsulfonylsulfamoyl group (e.g., methanesulfonylsulfamoyl)), and more preferably represents a carboxymethyl group, a 2-sulfoethyl group, a 3-sulfopropyl group, a 3-sulfobutyl group, a 4-sulfobutyl group, or a methanesulfonylcarbamoylmethyl group.

Examples of $M^2$ include the same ions as described in M in the methine dye representedby formula (I). Preferred cations include sodium, potassium, triethylammonium, pyridinium and N-ethylpyridinium ions, and preferred anions include bromide, iodide, p-toluenesulfonate and perchlorate ions.

$m^2$ represents a number of 0 or higher necessary to neutralize the charge in the molecule, and when an inner salt is formed, $m^2$ represents 0. $m^2$ preferably represents 0, 1 or 2.

A preferred combination in formula (V) is a combination in which $X^3$ and $X^4$ each represents an oxygen atom or a sulfur atom, $Y^3$ represents a furan ring, $Y^4$ represents a furan ring, a thiophene ring or a benzene ring, $R^4$ and $R^5$ each represents a sulfoalkyl group, a carboxyalkyl group, or a methanesulfonylcarbamoylalkyl group, $M^2$ represents an inorganic or organic cation, and m represents 0 or 1, more preferably $X^3$ and $X^4$ each represents a sulfur atom, and $R^4$ and $R^5$ each represents a carboxymethyl group, a 2-sulfoethyl group, a 3-sulfopropyl group, a 3-sulfobutyl group, a 4-sulfobutyl group, or a methanesulfonylcarbamoylmethyl group. A combination in which either $R^4$ or $R^5$ represents a 3-sulfopropyl group or a 4-sulfobutyl group, and the other represents a carboxymethyl group or a methanesulfonylcarbamoylmethyl group is particularly preferred.

When the methine dye represented by formula (IV) is used as a green-sensitive dye or a red-sensitive dye, the methine dye is more preferably represented by formula (VI).

In formula (VI), $X^5$ and $X^6$ each represents an oxygen atom, a sulfur atom, or a selenium atom, and preferably at least one represents an oxygen atom and the other represents an oxygen atom or a sulfur atom.

As the 5- or 6-membered unsaturated heterocyclic ring formed by $Y^5$ or $Y^6$, each heterocyclic ring described above in Y of the methine dye represented by formula (I) can be exemplified. $Y^5$ or $Y^6$ may further form a condensed ring with other 5- or 6-membered carbocyclic ring or heterocyclic ring, but it is preferred not to form the condensed ring. The ring formed by $Y^5$ or $Y^6$ is preferably a pyrrole ring, a furan ring, a thiophene ring, or a pyridine ring, and particularly preferably a pyrrole ring, a furan ring or a thiophene ring. $Y^6$ may form a benzene ring or a naphthalene ring, preferably a benzene ring.

As the alkyl group, aryl group, and heterocyclic group represented by $R^6$, $R^7$ and $R^8$, each group described above in R in the methine dye represented by formula (I) can be exemplified. $R^6$ and $R^7$ each preferably represents an alkyl group substituted with a group having an acid radical or a dissociable proton (specifically, a carboxyl group, a sulfo group, a phosphoric acid group, a boric acid group, an alkylsulfonylcarbamoyl group (e.g., methanesulfonylcarbonyl), an acylcarbamoyl group (e.g., acetylcarbamoyl), an acylsulfamoyl group (e.g., acetylsulfamoyl), or an alkylsulfonylsulfamoyl group (e.g., methanesulfonylsulfamoyl)), and particularly preferably represents a carboxymethyl group, a 2-sulfoethyl group, a 3-sulfopropyl group, a 3-sulfobutyl group, a 4-sulfobutyl group, or a methanesulfonylcarbamoylmethyl group.

$R^8$ preferably represents an unsubstituted alkyl group, in particular, a methyl group or an ethyl group.

Examples of $M^3$ include the same ions as described in M in the methine dye represented by formula (I). Preferred cations include sodium, potassium, triethylammonium, pyridinium and N-ethylpyridinium ions, and preferred anions include bromide, iodide, p-toluenesulfonate and perchlorate ions.

$m^3$ represents a number of 0 or higher necessary to neutralize the charge in the molecule, and when an inner salt is formed, $m^3$ represents 0. $m^3$ preferably represents 0, 1 or 2.

A preferred combination in formula (VI) is a combination in which either of $X^5$ or $X^6$ represents an oxygen atom and the other represents a sulfur atom, $Y^5$ represents a furan ring or a thiophene ring, Y represents a furan ring, a thiophene ring or a benzene ring, $R^6$ and $R^7$ each represents a sulfoalkyl group, a carboxyalkyl group, or a methanesulfonylcarbamoylalkyl group, $R^8$ represents a methyl group or an ethyl group, $M^3$ represents an inorganic or organic cation, and $m^3$ represents 1, particularly preferably $Y^5$ represents a thiophene ring, $Y^6$ represents a benzene ring, and $R^6$ and $R^7$ each represents a carboxymethyl group, a 2-sulfoethyl group, a 3-sulfopropyl group, a 3-sulfobutyl group, a 4-sulfobutyl group, or a methanesulfonylcarbamoylmethyl group. A combination in which either $R^6$ or $R^7$ represents a 3-sulfopropyl group or a 4-sulfobutyl group, and the other represents a carboxymethyl group or a methanesulfonylcarbamoylmethyl group is particularly preferred.

In the methine dye represented by formula (I), Y preferably represents a furan ring or a pyrrole ring, which may be condensed with other 5- or 6-membered carbocyclic or heterocyclic ring or may have a substituent.

When Y represents a thiophene ring, the thiophene ring may further be condensed with other 5- or 6-membered carbocyclic or heterocyclic ring or may have a substituent, and the case where the thiophene ring is substituted with at least one substituent is preferred. As the preferred substituents, an alkyl group (e.g., methyl, trifluoromethyl), an aryl group (e.g., phenyl), an aromatic heterocyclic group (e.g., 1-pyrrolyl), an alkoxyl group (e.g., methoxy), an alkylthio group (e.g., methylthio), a cyano group, an acyl group (e.g., acetyl), an alkoxycarbonyl group (e.g., methoxycarbonyl), and a halogen atom (e.g., fluorine, chlorine, bromine, iodine) can be exemplified, the more preferred substituents are an aromatic heterocyclic group (e.g., 1-pyrrolyl), an alkoxyl group (e.g., methoxy), an alkylthio group (e.g., methylthio), a cyano group, an acyl group (e.g., acetyl), an alkoxycarbonyl group (e.g., methoxycarbonyl), and a halogen atom (e.g., fluorine, chlorine, bromine, iodine), the further preferred are a methoxy group, a cyano group, an acetyl group, a methoxycarbonyl group, and a halogen atom, the still more preferred are a cyano group and a halogen atom, the still further preferred is a halogen atom, the particularly preferred are a fluorine atom, a chlorine atom and a bromine atom, and the most preferred is a chlorine atom.

D represents a group necessary to form a methine dye, preferably a group to form a cyanine dye, and more preferably to form a dye represented by the above formula (IX).

Here, the preferred structures as Y which represents a furan ring or a pyrrole ring are shown below together with the rings including Z:

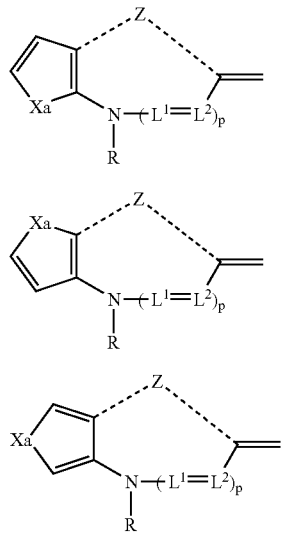

wherein Xa represents an oxygen atom or a nitrogen atom (N-Rw) The furan ring or pyrrole ring moiety may further be substituted, or may be condensed with a ring. The preferred is the case where the furan ring or pyrrole ring moiety is substituted with a monovalent substituent. In the case of (1a) and (1b), the case where only one monovalent substituent substitutes on the carbon atom contiguous to Xa is preferred. In the case of (1c), the case where one monovalent substituent substitutes on at least either one carbon atom contiguous to Xa is preferred. As the preferred substituents, an alkyl group (e.g., methyl), an aryl group (e.g., phenyl), an aromatic heterocyclic group (e.g., 1-pyrrolyl), an alkoxyl group (e.g., methoxy), an alkylthio group (e.g., methylthio), a cyano group, an acyl group (e.g., acetyl), an alkoxycarbonyl group (e.g., methoxycarbonyl), and a halogen atom (e.g., fluorine, chlorine, bromine, iodine) are exemplified, the more preferred substituents are a methyl group, a methoxy group, a cyano group and a halogen atom, the still more preferred is a halogen atom, the particularly preferred are a fluorine atom, a chlorine atom and a bromine atom, and the most preferred is a chlorine atom.

Rw represents a hydrogen atom or a monovalent substituent, preferably a hydrogen atom, a substituted alkyl group or an unsubstituted alkyl group. The substituents of the substituted alkyl group are preferably substituents having higher hydrophilicity than an iodine atom, more preferably substituents having the same or higher hydrophilicity than a chlorine atom, and particularly preferably substituents having the same or higher hydrophilicity than a fluorine atom. Rw more preferably represents a hydrogen atom or an unsubstituted alkyl group, and particularly preferably a hydrogen atom or a methyl group.

Of (1a), (1b) and (1c), (1a) and (1b) are preferred.

The preferred structures as Y which represents a thiophene ring are shown below together with the rings including Z:

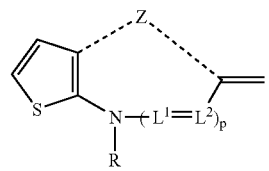

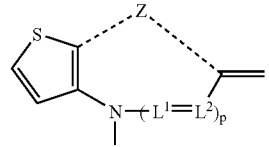

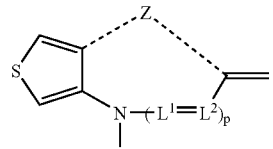

In these formulae, the thiophene ring moiety may further be substituted, provided that the thiophene ring moiety is substituted with at least one substituent. In the case of (2a) and (2b), the case where only one monovalent substituent substitutes on the carbon atom contiguous to the S atom is preferred. In the case of (2c), the case where one monovalent substituent substitutes on at least either one carbon atom contiguous to the S atom is preferred. As the preferred substituents, an aromatic heterocyclic group (e.g., 1-pyrrolyl), an alkoxyl group (e.g., methoxy), an alkylthio group (e.g., methylthio), a cyano group, an acyl group (e.g., acetyl), an alkoxycarbonyl group (e.g., methoxycarbonyl), and a halogen atom (e.g., fluorine, chlorine, bromine, iodine) can be exemplified, the more preferred substituents are a methoxy group, a cyano group, an acetyl group, a methoxycarbonyl group and a halogen atom, the still more preferred are a cyano group and a halogen atom, the still further preferred is a halogen atom, the particularly preferred are a fluorine atom, a chlorine atom and a bromine atom, and the most preferred is a chlorine atom.

Of (2a), (2b) and (2c), (2a) and (2b) are preferred.

As described above, it is preferred that a cyanine dye represented by formula (IX) is formed by D, and at this time, the case where at least one of R and $R^{11}$ represents an alkyl group substituted with an acid radical is preferred, and the case where both R and $R^{11}$ represent an alkyl group substituted with an acid radical is more preferred.

An acid racial is described below. An acid racial is a group having a dissociable proton.

Specifically, e.g., a sulfo group, a carboxyl group, a sulfato group, a —CONHSO$_2$— group (sulfonylcarbamoyl), a —CONHCO— group (carbonylcarbamoyl), an —SO$_2$NHSO$_2$— group (sulfonylsulfamoyl), a sulfonamido group, a sulfamoyl group, a phosphato group, a phosphono group, a phoronic acid group, and a phenolic hydroxyl group which dissociable protons by their pKa and the ambient pH can be exemplified. For example, proton-dissociable groups capable of dissociating 90% or more protons at pH 5 to 11 are preferred.

In the cyanine dye represented by formula (I), preferred alkyl groups substituted with an acid radical can be represented by the following formulae:

Preferred alkyl group: -Qa-$T^1$
$T^1$: —SO$_3^-$
—COOH
—CONHSO$_2$Ra
—SO$_2$NHCORb
—CONHCORC
—SO$_2$NHSO$_2$Rd wherein Qa represents a linking group (preferably a divalent linking group) necessary to form an alkyl group; and Ra, Rb, Rc and Rd each represents an alkyl group, an aryl group, a heterocyclic group, an alkoxyl group, an aryloxy group, a heterocyclic oxy group, or an amino group.

Qa maybe any group so long as it satisfies the above condition, preferably comprised of an atom or an atomic group containing at least one of a carbon atom, a nitrogen atom, a sulfur atom and an oxygen atom. Qa preferably represents a linking group having from 0 to 10, preferably from 1 to 8, more preferably from 1 to 5 carbon atoms, consisting in combination of one or more of an alkylene group (e.g., methylene, ethylene, trimethylene, tetramethylene, pentamethylene, methyltrimethylene), an alkenylene group (e.g., ethenylene, propenylene), an alkynylene group (e.g., ethynylene, propynylene), an amido group, an ester group, a sulfoamido group, a sulfonic ester group, a ureido group, a sulfonyl group, a sulfinyl group, a thioether group, an ether group, a carbonyl group and —N(Wa)- (Wa represents a hydrogen atom or a monovalent substituent).

The above linking groups may further be substituted, or may contain a ring (e.g., an aromatic or non-aromatic hydrocarbon ring or a heterocyclic ring).

However, it is more preferred that these linking groups do not contain a hetero ring and that they are not substituted.

Still more preferably Qa represents a divalent linking group having from 1 to 5 carbon atoms consisting in combination of one or more of an alkylene group having from 1 to 5 carbon atoms (e.g., methylene, ethylene, trimethylene, tetramethylene, pentamethylene, methyltrimethylene), an alkenylene group having from 2 to 5 carbon atoms (e.g., ethenylene, propenylene), and an alkynylene group having from 2 to 5 carbon atoms (e.g., ethynylene, propynylene), and particularly preferably an alkylene group having from 1 to 5 carbon atoms (preferably, e.g., methylene, ethylene, trimethylene, tetramethylene).

When $T^1$ represents a sulfo group, Qa more preferably represents ethylene, trimethylene, tetramethylene, or methyltrimethylene, and particularly preferably trimethylene. When $T^1$ represents a carboxylg roup, Qa more preferably represents methylene, ethylene, or trimethylene, and particularly preferably methylene.

When $T^1$ represents —CONHSO$_2$Ra, —SO$_2$NHCORb, —CONHCORc or —SO$_2$NHSO$_2$Rd, Qa more preferably represents methylene, ethylene, or trimethylene, and particularly preferably methylene.

Ra, Rb, Rc and Rd each represents an alkyl group, an aryl group, a heterocyclic group, an alkoxyl group, an aryloxy group, a heterocyclic oxy group, or an amino group, and the following groups can be preferably exemplified.

For example, an unsubstituted alkyl group having from 1 to 18, preferably from 1 to 10, and more preferably from 1 to 5, carbon atoms (e.g. methyl,ethyl, propyl, butyl), a substituted alkyl group having from 1 to 18, preferably from 1 to 10, and more preferably from 1 to 5, carbon atoms (e.g., hydroxymethyl, trifluoromethyl, benzyl, carboxyethyl, ethoxycarbonylmethyl, acetylaminomethyl, and an unsaturated hydrocarbon group preferably having from 2 to 18, more preferably 3 to 10, and particularly preferably from 3 to 5, carbon atoms (e.g., vinyl, ethynyl, 1-cyclohexenyl, benzylidyne, benzylidene) is also included in the substituted alkyl group), a substituted or unsubstituted aryl group having from 6 to 20, preferably 6 to 15, and more preferably from 6 to 10, carbon atoms (e.g., phenyl, naphthyl, p-carboxyphenyl, p-nitrophenyl, 3,5-dichlorophenyl, p-cyanophenyl, m-fluorophenyl, p-tolyl), a heterocyclic group having from 1 to 20, preferably 2 to 10, and more preferably from 4 to 6, carbon atoms, which maybe substituted (e.g., pyridyl, 5-methylpyridyl, thienyl, furyl, morpholino, tetrahydrofurfuryl), an alkoxyl group having from 1 to 10, and preferably 1 to 8, carbon atoms (e.g., methoxy, ethoxy, 2-methoxyethoxy, 2-hydroxyethoxy, 2-phenylethoxy), an aryloxy group having from 6 to 20, preferably from 6 to 12, and more preferably from 6 to 10, carbon atoms (e.g., phenoxy, p-methylphenoxy, p-chlorophenoxy, naphthoxy), a heterocyclic oxy group having from 1 to 20, preferably from 3 to 12, and more preferably from 3to 10, carbonatoms (a heterocyclic oxy group is a group substituted with a heterocyclic group, e.g., 2-thienyloxy, 2-morpholinooxy), and an amino group having from 0 to 20, preferably from 0 to 12, and more preferably from 0 to 8, carbon atoms (e.g., amino, methylamino, dimethylamino, ethylamino, diethylamino, hydroxyethylamino, benzylamino, anilino, diphenylamino, morpholino which forms a ring, pyrrolidino) can be exemplified.

Ra, Rb, Rc and Rd each more preferably represents a methyl group, an ethyl group, or a hydroxyethyl group, and particularly preferably a methyl group.

In acid radicals, carboxyl groups and dissociable nitrogen atoms may be described in a form not dissociated (e.g., COOH, NH) or may be described in a dissociated form (e.g., COO⁻, N³¹). A dissociable group practically becomes a dissociating state or a non-dissociating state depending upon the atmosphere such as pH in which the dye is present.

When a cation is present as the counter ion, it may be described as, e.g., (COO⁻, Na⁺), (N⁻, Na⁺). In a non-dissociated state, it is described as (COOH), (NH), but regarding a cationic compound of the counter ion as a proton, it can also be described as (COO⁻, H⁺), (N⁻, H⁺).

In the cyanine dye represented by formula (IX), the case where at least one of R and $R^{11}$ represents an alkyl group substituted with an acid radical other than a sulfo group is particularly preferred, and the case where one of R and $R^{11}$ represents an alkyl group substituted with an acid radical other than a sulfo group and the other represents an alkyl group substituted with a sulfo group is most preferred.

The preferred alkyl groups substituted with an acid radical other than a sulfo group are alkyl groups substituted with a carboxyl group, a —CONHSO₂— group, an —SO₂NHCO— group, a —CONHCO— group or an —SO₂NHSO₂— group.

The preferred alkyl groups having a sulfo group are a 3-sulfopropyl group, a 4-sulfobutyl group, a 3-sulfobutyl group and a 2-sulfoethyl group, and the more preferred alkyl group is a 3-sulfopropyl group. As the preferred alkyl groups having an acid radical other than a sulfo group, a carboxymethyl group and a methanesulfonylcarbamoylmethyl group are particularly preferred.

The preferred combination of R and $R^{11}$ is the case where either one represents a carboxymethyl group or a methanesulfonylcarbamoylmethyl group, and the other represents a 3-sulfopropyl group, a 4-sulfobutyl group, a 3-sulfobutyl group or a 2-sulfoethyl group, and the more preferred combination is the case where either one represents a carboxymethyl group or a methanesulfonylcarbamoylmethyl group, and the other represents a 3-sulfopropyl group.

In the present invention, the methine dye represented by formula (I) is more preferably represented by formula (XX) or (XXX).

In formula (XX) $Y^{51}$ represents a furan ring or a pyrrole ring which maybe condensed with other 5-or 6-membered-carbocyclic or heterocyclic ring or may have a substituent, and two carbon atoms to which $Y^{51}$ is condensed may be bonded by a single bond or a double bond, preferably a double bond.

A dye having a furan ring or a pyrrole ring as represented by formula (XX) has particularly excellent photographic performances.

The preferred structures as $Y^{51}$ which represents a furan ring or a pyrrole ring are shown below together with the rings including $X^{51}$:

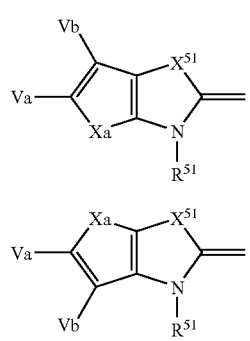

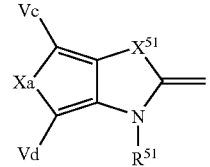

wherein Xa has the same meaning as Xa in the above formulae (1a) (1b) and (1c), which represents an oxygen atom or a nitrogen atom (N-Rw) and the similar ones are preferred. Va, Vb, Vc and Vd each represents a hydrogen atom or a monovalent substituent, Va and Vb may be bonded to each other to form a ring, and Va and Vb preferably represents a hydrogen atom or a monovalent substituent. In the case of (3a) and (3b), the case where Va represents a monovalent substituent and Vb represents a hydrogen atom is preferred. In the case of (3c), the case where at least either Vc or Vd is substituted with a monovalent substituent is preferred. As the preferred substituents, an alkyl group (e.g., methyl), an aryl group (e.g., phenyl), an aromatic heterocyclic group (e.g., 1-pyrrolyl), an alkoxyl group (e.g., methoxy), an alkylthio group (e.g., methylthio), a cyano group, an acyl group (e.g., acetyl), an alkoxycarbonyl group (e.g., methoxycarbonyl), and a halogen atom (e.g., fluorine, chlorine, bromine, iodine) are exemplified, the more preferred substituents are a methyl group, a methoxy group, a cyano group and a halogen atom, the still more preferred is a halogen atom, the particularly preferred are a fluorine atom, a chlorine atom and a bromine atom, and the most preferred is a chlorine atom.

Of (3a), (3b) and (3c), (3a) and (3b) are preferred.

$X^{51}$ and $X^{52}$ each represents an oxygen atom, a sulfur atom, a selenium atom, a tellurium atom, a nitrogen atom, or a carbon atom. The nitrogen atom can be preferably expressed by 13 N(Rx)— and the carbon atom by —C(Ry)(Rz)-, wherein Rx, Ry and Rz each represents a hydrogen atom or a monovalent substituent, preferably the same alkyl group, aryl group or heterocyclic group as represented by R, morepreferably the alkyl group. $X^{51}$ and $X^{52}$ each preferably represents an oxygen atom, a sulfur atom, or a nitrogen atom, and more preferably an oxygen atom or a sulfur atom.

$Y^{52}$ represents an atomic group necessary to form a benzene ring or a 5- or 6-membered unsaturated heterocyclic ring, which may further be condensed with other 5- or 6-membered carbocyclic or heterocyclic ring or may have a substituent, and two carbon atoms to which $y^{52}$ is condensed may be bonded by a single bond or a double bond, preferably a double bond. $Y^{52}$ represents an atomic group necessary to form a benzene ring or a 5- or 6-membered unsaturated heterocyclic ring, and as the 5- or 6-membered unsaturated heterocyclic ring formed by $Y^{52}$, the heterocyclic rings described in Y in the methine dye represented by formula (I) above can be exemplified, which may further form a condensed ring together with other 5- or 6-membered carbocyclic or heterocyclic ring, but it is preferred that a third condensed ring should not be present. $Y^{52}$ is preferably a benzene ring, a pyrrole ring, a furan ring, or a thiophene ring (as the pyrrole, furan and thiophene rings, the above-described (1a), (1b), (1c), (2a), (2b), (2c), (3a), (3b), (3c) and the later-described (4a), (4b) and (4c) can be exemplified and the similar ones are preferred), particularly preferably a benzene ring, a furan ring or a pyrrole ring, and most preferably a benzene ring. The substituents are not limited but preferably an alkyl group (e.g., methyl), an aryl group (e.g., phenyl), an aromatic heterocyclic group (e.g., 1-pyrrolyl), an alkoxyl group (e.g., methoxy), an alkylthio group (e.g., methylthio) a cyano group, an acyl group (e.g., acetyl), an alkoxycarbonyl group (e.g., methoxycarbonyl), and a halogen atom (e.g., fluorine, chlorine, bromine, iodine) are exemplified, more preferably a methyl group, a methoxy group, a cyano group and a halogen atom, still more preferably a halogen atom, particularly preferably a fluorine atom, a chlorine atom and a bromine atom, and most preferably a chlorine atom.

$R^{51}$ and $R^{52}$ each represents a substituted or unsubstituted alkyl group, a substituted or unsubstituted aryl group, or a substituted or unsubstituted heterocyclic group. Similarly to R and $R^{11}$ described above, the case where at least one of $R^{51}$ and $R^{52}$ represents an alkyl group substituted with an acid radical is preferred, the case where $R^{51}$ and $R^{52}$ both represent an alkyl group substituted with an acid radical is more preferred, the case where at least one of $R^{51}$ and $R^{52}$, which are alkyl groups substituted with an acid radical, represents an alkyl group substituted with an acid radical other than a sulfo group is particularly preferred, and the case where one of $R^{51}$ and $R^{52}$ represents an alkyl group substituted with an acid radical other than a sulfo group and the other represents an alkyl group substituted with a sulfo group is most preferred. The specific examples of the alkyl groups substituted with an acid radical and the preferred examples of combinations are the same as those described in R and $R^{11}$ above. The case where $R^{51}$ represents an alkyl group substituted with an acid radical other than a sulfo group is particularly preferred.

$L^{51}$, $L^{52}$ and $L^{53}$ each represents a methine group, which may be a substituted or unsubstituted methine group, and each has the same meaning as $L^{11}$, $L^{12}$ and $L^{13}$ described above. $n^{51}$ represents 0, 1, 2, 3 or 4, preferably 0, 1 or 2, and more preferably 0 or 1. When $n^{51}$ represents 2 or more, $L^{52}$ and $L^{53}$ are repeated but they may be or may not be the same. When $n^{51}$ represents 0, $L^{51}$ preferably represents an unsubstituted methine group, and when $n^{51}$ represents 1, $L^{51}$ and $L^{53}$ each preferably represents an unsubstituted methine group, and $L^{52}$ preferably represents a methine group substituted with an unsubstituted alkyl group (e.g., methyl, ethyl, propyl). $L^{52}$ more preferably represents a methine group substituted with an ethyl group.

$M^{51}$ represents a counter ion and has the same meaning as M described above.

The preferred examples of cations include a sodium ion, a potassium ion, a triethylammonium ion, a tetraethylammonium ion, a pyridinium ion, an ethylpyridinium ion and a methylpyridinium ion. The preferred examples of anions include a perchloric acid ion, an iodide ion, a bromide ion, a substituted arylsulfonic acid ion (e.g., p-toluenesulfonic acid ion).

$m^{51}$ represents a number of 0 or higher necessary to neutralize the charge in the molecule, and when an inner salt is formed, $m^{51}$ represents 0. $m^{51}$ preferably represents a number of from 0 to 4.

The methine dye represented by formula (XX) is more preferably represented by the following formula (XXI).

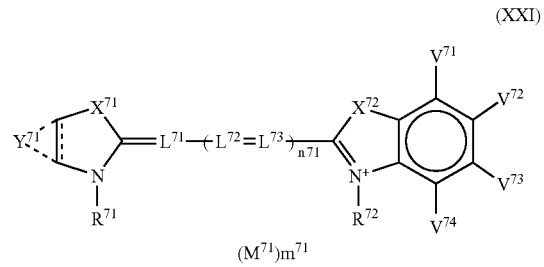

(XXI)

wherein $Y^{71}$ represents a furan ring or a pyrrole ring which may be condensed with other 5- or 6-membered carbocyclic or heterocyclic ring or may have a substituent, and two carbon atoms to which $Y^{71}$ is condensed may be bonded by a single bond or a double bond. $X^{71}$ and $X^{72}$ each represents an oxygen atom, a sulfur atom, a selenium atom, a tellurium atom, a nitrogen atom, or a carbon atom. $R^{71}$ and $R^{72}$ each represents a substituted or unsubstituted alkyl group, a substituted or unsubstituted aryl group, or a substituted or unsubstituted heterocyclic group. $L^{71}$, $L^{72}$ and $L^{73}$ each represents a methine group. $n^{71}$ represents 0, 1, 2, 3 or 4. $M^{71}$ represents a counter ion, and $m^{71}$ represents a number of 0 or higher necessary to neutralize the charge in the molecule. $V^{71}$, $V^{72}$, $V^{73}$ and $V^{74}$ each represents a hydrogen atom or a substituent.

$Y^{71}$ has the same meaning as $Y^{51}$ described above, and the similar ones are preferred, and two carbon atoms to which $Y^{71}$ is condensed may be bonded by a single bond or a double bond, preferably a double bond. $X^{71}$ and $X^{72}$ each represents an oxygen atom, a sulfur atom, a selenium atom, a tellurium atom, a nitrogen atom, or a carbon atom, each has the same meaning as $X^{51}$ and $X^{52}$ described above, and the similar ones are preferred. $R^{71}$ and $R^{72}$ each represents a substituted or unsubstituted alkyl group, a substituted or unsubstituted aryl group, or a substituted or unsubstituted heterocyclic group, each has the same meaning as $R^{51}$ and $R^{52}$ described above, and the similar ones are preferred. $L^{71}$, $L^{72}$ and $L^{73}$ each represents a methine group, each has the same meaning as $L^{51}$, $L^{52}$ and $L^{53}$ described above, and the similar ones are preferred. n represents 0, 1, 2, 3 or 4, preferably 0, 1 or 2, and more preferably 0 or 1. The case where the methine chain represented by $=L^{71}-(L^{72}=L^{73})_{n71}-$ represents the following LLa or LLb is particularly preferred.

Preferred Methine Chain

LLa: =CH—

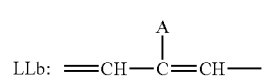

LLb: =CH—C=CH— wherein A represents a methyl group, an ethyl group or a propyl group, preferably an ethyl group.

$M^{71}$ represents a counter ion, and $m^{71}$ represents a number of 0 or higher necessary to neutralize the charge in the molecule, and they have the same meaning as M and m described above. It is particularly preferred that $M^{71}$ represents a cation, and preferred cations are a sodium ion, a potassium ion, a triethylammonium ion, a pyridinium ion and an N-ethylpyridinium ion.

$V^{71}$, $V^{72}$, $V^{73}$ and $V^{74}$ each represents a hydrogen atom or a substituent. Of these, two contiguous substituents may be linked to each other to form a saturated or unsaturated condensed ring but it is not preferred particularly to form an unsaturated condensed ring in view of photographic performances. Further, it is also preferred not to form a saturated condensed ring. It is preferred that both $V^{71}$ and $V^{74}$ represent a hydrogen atom, and $V^{72}$ and $V^{73}$ each represents a hydrogen atom, an alkyl group (e.g., methyl), an aryl group (e.g., phenyl), an aromatic heterocyclic group (e.g., 1-pyrrolyl), an alkoxyl group (e.g., methoxy), an alkylthio group (e.g., methylthio), a cyano group, an acyl group (e.g., acetyl), an alkoxycarbonyl group (e.g., methoxycarbonyl), or a halogen atom (e.g., fluorine, chlorine, bromine, iodine). $V^{72}$ more preferably represents a hydrogen atom and $V^{73}$ more preferably represents a methyl group, a methoxy group, a cyano group, an acetyl group, a methoxycarbonyl group, or a halogen atom, still more preferably a halogen atom, particularly preferably a fluorine atom, a chlorine atom or a bromine atom, and most preferably a fluorine atom or a chlorine atom.

When the methine dye represented by formula (XXI) is used in a red-sensitive emulsion layer, it is preferred that the methine chain ($L^{71}$, $L^{72}$ $L^{73}$, $n^{71}$) represents the above-described LLb (wherein A preferably represents an ethyl group), either $X^{71}$ or $X^{72}$ represents an oxygen atom and the other represents a sulfur atom, and $Y^{71}$ represents a pyrrole ring or a furan ring substituted with a halogen atom (preferably a chlorine atom or a bromine atom).

It is preferred that $R^{71}$ and $R^{72}$ each represents a sulfoalkyl group, a carboxyalkyl group or an alkanesulfonylcarbamoylalkyl group, all of $V^{71}$, $V^{72}$ and $V^{74}$ represent a hydrogen atom, $V^{73}$ represents an alkyl group (e.g., methyl), an alkoxyl group (e.g., methoxy), an alkylthio group (e.g., methylthio), a cyano group, an acyl group (e.g., acetyl), an alkoxycarbonyl group (e.g., methoxycarbonyl), or a halogen atom (e.g., fluorine, chlorine, bromine, iodine), morepreferably amethyl group, amethoxy group, a cyano group, an acetyl group, a methoxycarbonyl group or a halogen atom, particularly preferably a halogen atom, and most preferably a fluorine atom or a chlorine atom, $M^{71}$ represents an organic or inorganic monovalent cation, and $m^{71}$ represents 0 or 1.

When the methine dye represented by formula (XXI) is used in a green-sensitive emulsion layer, it is preferred that the methine chain ($L^{71}$, $L^{72}$, $L^{73}$, $n^{71}$) represents the above-described LLb (wherein A preferably represents an ethyl group), both of $X^{71}$ and $X^{72}$ represent an oxygen atom, and $Y^{71}$ represents a pyrrole ring or a furan ring substituted with a halogen atom (preferably a chlorine atom or a bromine atom).

It is preferred that $R^{71}$ and $R^{72}$ each represents a sulfoalkyl group, a carboxyalkyl group or an alkanesulfonylcarbamoylalkyl group, all of $V^{71}$, $V^{72}$ and $V^{74}$ represent a hydrogen atom, $V^{73}$ represents an alkyl group (e.g., methyl), an aryl group (e.g., phenyl), an aromatic heterocyclic group (e.g., 2-thienyl), an alkoxyl group (e.g., methoxy), an alkylthio group (e.g., methylthio), a cyano group, an acyl group (e.g., acetyl), an alkoxycarbonyl group (e.g., methoxycarbonyl), or a halogen atom (e.g., fluorine, chlorine, bromine, iodine), more preferably a methyl group, a methoxy group, a cyano group, an acetyl group, a methoxycarbonyl group or a halogen atom, particularly preferably a halogen atom, and most preferably a fluorine atom or a chlorine atom, $M^{71}$ represents an organic or inorganic monovalent cation, and $m^{71}$ represents 0 or 1.

When the methine dye represented by formula (XXI) is used in a blue-sensitive emulsion layer, it is preferred that the methine chain ($L^{71}$, $L^{72}$, $L^{73}$, $n^{71}$) represents the above-described LLa, both of $X^{71}$ and $X^{72}$ represent a sulfur atom, and $Y^{71}$ represents a pyrrole ring or a furan ring substituted with a halogen atom (preferably a chlorine atom or a bromine atom).

It is preferred that $R^{71}$ and $R^{72}$ each represents a sulfoalkyl group, a carboxyalkyl group or an alkanesulfonylcarbamoylalkyl group, all of $V^{71}$, $V^{72}$ and $V^{74}$ represent ahydrogen atom, $V^{73}$ represents an alkyl group (e.g., methyl), an alkoxyl group (e.g., methoxy), an alkylthio group (e.g., methylthio), a cyano group, an acyl group (e.g., acetyl), an alkoxycarbonyl group (e.g., methoxycarbonyl), or a halogen atom (e.g., fluorine, chlorine, bromine, iodine), more preferably a methyl group, a methoxy group, a cyano group, an acetyl group, a methoxycarbonyl group or a halogen atom, particularly preferably a halogen atom, and most preferably a fluorine atom or a chlorine atom, $M^{71}$ represents an organic or inorganic monovalent cation, and $m^{71}$ represents 0 or 1.

In formula (XXX), $Y^{61}$ represents a thiophene ring which may be condensed with other 5- or 6-membered carbocyclic or heterocyclic ring or may have a substituent but is substituted with at least one halogen atom, and two carbon atoms to which $Y^{61}$ is condensed may be bonded by a single bond or a double bond, preferably a double bond.

A dye having a thiophene ring substituted with at least one halogen atom as represented by formula (XXX) has particularly excellent photographic performances.

The preferred structures as $Y^{61}$ which represents a thiophene are shown below together with the rings including $X^{61}$:

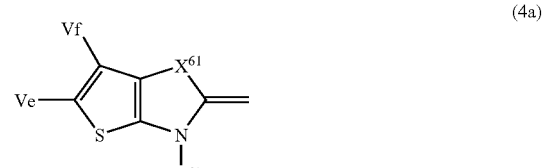

(4a)

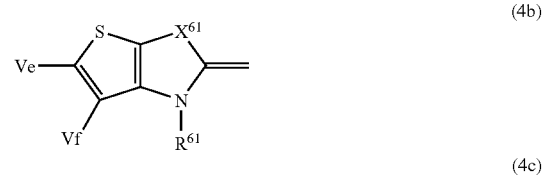

(4b)

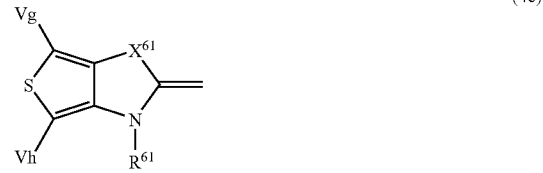

(4c)

wherein Ve, Vf, Vg and Vh each represents a hydrogen atom or a monovalent substituent, provided that at least one of Ve and Vf and at least one of Vg and Vh each represents a halogen atom. In the case of (4a) and (4b), it is preferred that Ve represents a halogen atom and Vf represents a hydrogen atom. In the case of (4c), it is preferred that at least one of Vg and Vh is substituted with a halogen atom.

As the above halogen atom, a fluorine atom, a chlorine atom, a bromine atom or an iodine atom is preferred, a chlorine atom or a bromine atom is more preferred and a chlorine atom is particularly preferred. As the monovalent substituent, preferably an alkyl group (e.g., methyl), an aryl group (e.g., phenyl), an aromatic heterocyclic group (e.g., 1-pyrrolyl), an alkoxyl group (e.g., methoxy), an alkylthio group (e.g., methylthio), a cyano group, an acyl group (e.g., acetyl), an alkoxycarbonyl group (e.g., methoxycarbonyl), and a halogen atom (e.g., fluorine, chlorine, bromine, iodine) are exemplified, more preferably a methyl group, a methoxy group, a cyano group, an acetyl group, a methoxycarbonyl group, and a halogen atom are exemplified, more preferably a methoxy group, a cyano group, an acetyl group, a methoxycarbonyl group, and a halogen atom are exemplified, still more preferably a halogen atom, particularly preferably a fluorine atom, a chlorine atom or a bromine atom, and most preferably a chlorine atom.

Of (4a), (4b) and (4c), (4a) and (4b) are preferred.

$X^{61}$ and $X^{62}$ each represents an oxygen atom, a sulfur atom, a selenium atom, a tellurium atom, a nitrogen atom, or a carbon atom. The nitrogen atom can be preferably expressed by -(Rx)- and the carbon atom by —C(Ry)(Rz)-, wherein Rx, Ry andRz each represents a hydrogen atom or a monovalent substituent, preferably the same alkyl group, aryl group or heterocyclic group as represented by R, more preferably the alkyl group. $X^{61}$ and $X^{62}$ each preferably represents an oxygen atom, a sulfur atom, or a nitrogen atom, and more preferably an oxygen atom or a sulfur atom.

$Y^{62}$ represents an atomic group necessary to form a benzene ring or a 5- or 6-membered unsaturated heterocyclic ring, which may further be condensed with other 5- or 6-membered carbocyclic or heterocyclic ring or may have a substituent, and two carbon atoms to which $Y^{62}$ is condensed may be bonded by a single bond or a double bond, preferably a double bond. $Y^{62}$ represents an atomic group necessary to form a benzene ring or a 5- or 6-membered unsaturated heterocyclic ring, and as the 5- or 6-membered unsaturated heterocyclic ring formed by $Y^{62}$ the heterocyclic rings described in Y in the methine dye represented by formula (I) above can be exemplified, which may further form a condensed ring together with other 5- or 6-membered carbocyclic or heterocyclic ring, but it is preferred that a third condensed ring should not be present. $Y^{62}$ is preferably a benzene ring, a pyrrole ring, a furan ring, or a thiophene ring (as the pyrrole, furan and thiophene rings, the above-described (1a), (1b), (1c), (2a), (2b), (2c), (3a), (3b), (3c), (4a), (4b) and (4c) can be exemplified and the similar ones are preferred), particularly preferably a benzene ring, a furan ring or a pyrrole ring, and most preferably a benzene ring. The substituents are not limited but preferably an alkyl group (e. g., methyl), an aryl group (e. g., phenyl), an aromatic heterocyclic group (e.g., 1-pyrrolyl), an alkoxyl group (e.g., methoxy), an alkylthio group (e.g., methylthio), a cyano group, an acyl group (e.g., acetyl), an alkoxycarbonyl group (e.g., methoxycarbonyl), and a halogen atom (e.g., fluorine, chlorine, bromine, iodine) are exemplified, more preferably a methyl group, a methoxy group, a cyano group and a halogen atom, still more preferably a halogen atom, particularly preferably a fluorine atom, a chlorine atom and a bromine atom, and most preferably a chlorine atom.

$R^{61}$ and $R^{62}$ each represents a substituted or unsubstituted alkyl group, a substituted or unsubstituted aryl group, or a substituted or unsubstituted heterocyclic group. Similarly to R and $R^{11}$ described above, the case where at least one of $R^{61}$ and $R^{62}$ represents an alkyl group substituted with an acid radical is preferred, the case where $R^{61}$ and $R^{62}$ both represent an alkyl group substituted with an acid radical is more preferred, the case where at least one of $R^{61}$ and $R^{62}$, which are alkyl groups substituted with an acid radical, represents an alkyl group substituted with an acid radical other than a sulfo group is particularly preferred, and the case where one of $R^{61}$ and $R^{62}$ represents an alkyl group substituted with an acid radical other than a sulfo group and the other represents an alkyl group substituted with a sulfo group is most preferred. The specific examples of the alkyl groups substituted with an acid radical and the preferred examples of combinations are the same as those described in R and $R^{11}$ above. The case where $R^{61}$ represents an alkyl group substituted with an acid radical other than a sulfo group is particularly preferred.

$L^{61}$, $L^{62}$ and $L^{63}$ each represents a methine group, and each has the same meaning as $L^{51}$, $L^{52}$ and $L^{53}$ described above. $n^{61}$ represents 0 or 1, preferably 1. When $n^{61}$ represents 0, $L^{61}$ preferably represents an unsubstituted methine group, and when $n^{61}$ represents 1, $L^{61}$ and $L^{63}$ each preferably represents an unsubstituted methine group, and $L^{62}$ preferably represents a methine group substituted with an unsubstitutedalkyl group (e.g., methyl, ethyl, propyl). $L^{62}$ more preferably represents a methine group substituted with an ethyl group. $M^6$ represents a counter ion, and $m^{61}$ represents a number of 0 or higher necessary to neutralize the charge in the molecule, and they have the same meaning as M and m described above.

The methine dye represented by formula (XXX) is preferably represented by formula (XXXI) or (XXXII).

In formula (XXXI) or (XXXII), $v^{61}$ represents a halogen atom (e.g., fluorine, chlorine, bromine, iodine), more preferably a fluorine atom, a chlorine atom or a bromine atom, and particularly preferably a chlorine atom. $Y^{61}$, $X^{61}$, $X^{62}$, $R^{61}$, $R^{62}$, $L^{61}$, $L^{62}$, $L^{63}$, $n^{61}$, $M^{61}$ and $m^{61}$ each has the same meaning as defined in formula (XXX) and the similar ones are preferred.

When $n^{61}$ represents 0, $L^{61}$ preferably represents an unsubstituted methine group, and when $n^{61}$ represents 1, $L^{61}$ and $L^{63}$ each preferably represents an unsubstituted methine group, and $L^{62}$ preferably represents a methine group substituted with an unsubstituted alkyl group (e.g., methyl, ethyl, propyl). $L^{62}$ more preferably represents a methine group substituted with an ethyl group.

The methine dye represented by formula (XXXI) is preferably represented by formula (XXXIa) or (XXXIb). The methine dye representedby formula (XXXII) is preferably representedby formula (XXXIIa) or (XXXIIb), more preferably formula (XXXIIb).

In formula (XXXIa) or (XXXIIa), $V^{85}$ represents a halogen atom, $X^{81}$ and $X^{82}$ each represents an oxygen atom or a sulfur atom, $R^{81}$ and $R^{82}$ each represents an alkyl group substituted with an acid radical $V^{81}$ $V^{82}$, $V^{83}$ and $V^{84}$ each represents a hydrogen atom or a substituent, $M^{81}$ represents a counter ion, and $m^{81}$ represents a number of 0 or higher necessary to neutralize the charge in the molecule.

$V^{85}$ represents a halogen atom (e.g., fluorine, chlorine, bromine, iodine), more preferably a fluorine atom, a chlorine atom or a bromine atom, and particularly preferably a chlorine atom.

$R^{81}$ and $R^{82}$ each represents an alkyl group substituted with an acid radical. Similarly to R and $R^{11}$ described above, the case where at least one of $R^{81}$ and $R^{82}$, which are alkyl groups substituted with an acid radical, represents an alkyl group substituted with an acid radical other than a sulfo group is preferred, and the case where one of $R^{81}$ and $R^{82}$ represents an alkyl group substituted with an acid radical other than a sulfo group (preferably a carboxyl group or an alkanesulfonylcarbamoyl group) and the other represents an alkyl group substituted with a sulfo group is more preferred. The specific examples of the alkyl groups substituted with an acid radical and the preferred examples of combinations are the same as those described in R and $R^{11}$ above. The case where one of $R^{81}$ and $R^{82}$ represents a carboxymethyl group or a methanesulfonylcarbamoylmethyl group is still more preferred, the case where $R^{81}$ represents a carboxymethyl group or a methanesulfonylcarbamoylmethyl group is particularly preferred, and the case where $R^{81}$ represents a methanesulfonylcarbamoylmethyl group is most preferred.

$M^{81}$ represents a counter ion, and $m^{81}$ represents a number of 0 or higher necessary to neutralize the charge in the molecule, and they have the same meaning as M and m described above. It is particularly preferred that $M^{81}$ represents a cation, and preferred cations are a sodium ion, a potassium ion, a triethylammonium ion, a pyridinium ion and an N-ethylpyridinium ion.

$V^{81}$, $V^{82}$, $V^{83}$ and $V^{84}$ each represents a hydrogen atom or a substituent. Of these, two contiguous substituents may be linked to each other to form a saturated or unsaturated condensed ring but it is not preferred particularly to form an unsaturated condensed ring in view of photographic performances. Further, it is also preferred not to form a saturated condensed ring. It is preferred that both $V^{81}$ and $V^{84}$ represent a hydrogen atom, and $V^{82}$ and $V^{83}$ each represents a hydrogen atom, an alkyl group (e.g., methyl), an aryl group (e.g., phenyl), an aromatic heterocyclic group (e.g., 1-pyrrolyl), an alkoxyl group (e.g., methoxy), an alkylthio group (e.g., methylthio), a cyano group, an acyl group (e.g., acetyl), an alkoxycarbonyl group (e.g., methoxycarbonyl), or a halogen atom (e.g., fluorine, chlorine, bromine, iodine). $V^{82}$ more preferably represents a hydrogen atom and $V^{83}$ more preferably represents a methyl group, a methoxy group, a cyano group, an acetyl group, a methoxycarbonyl group, or a halogen atom, still more preferably a halogen atom, particularly preferably a fluorine atom, a chlorine atom or a bromine atom, and most preferably a fluorine atom or a chlorine atom.

In formula (XXXIb) and (XXXIIb), $V^{95}$ represents a halogen atom, $X^{91}$ and $X^{92}$ each represents an oxygen atom or a sulfur atom, $R^{91}$ and $R^{92}$ each represents a substituted or unsubstituted alkyl group, a substituted or unsubstituted aryl group, or a substituted or unsubstituted heterocyclic group, $A^{91}$ represents a methyl group, an ethyl group or a propyl group, $V^{91}$, $V^{92}$, $V^{93}$ and $V^{94}$ each represents a hydrogen atom or a substituent, $M^{91}$ represents a counter ion, and $m^{91}$ represents a number of 0 or higher necessary to neutralize the charge in the molecule.

$V^{95}$ represents a halogen atom (e.g., fluorine, chlorine, bromine, iodine), more preferably a fluorine atom, a chlorine atom or a bromine atom, and particularly preferably a chlorine atom. $R^{91}$ and $R^{92}$ each represents a substituted or unsubstituted alkyl group, a substituted or unsubstituted aryl group, or a substituted or unsubstituted heterocyclic group, each has the same meaning as $R^{61}$ and $R^{62}$ described above, and the similar ones are preferred. $A^{91}$ represents a methyl group, an ethyl group or a propyl group, preferably a methyl group or an ethyl group, and particularly preferably an ethyl group.

$M^{91}$ represents a counter ion, and $m^{91}$ represents a number of 0 or higher necessary to neutralize the charge in the molecule, and they have the same meaning as M and m described above. It is particularly preferred that $M^{91}$ represents a cation, and preferred cations are a sodium ion, a potassium ion, a triethylammonium ion, a pyridinium ion and an N-ethylpyridinium ion.

$V^{91}$, $V^{92}$, $V^{93}$ and $V^{94}$ each represents a hydrogen atom or a substituent. Of these, two contiguous substituents maybe linked to each other to form a saturated or unsaturated condensed ring but it is not preferred particularly to form an unsaturated condensed ring in view of photographic performances. Further, it is also preferred not to form a saturated condensed ring. It is preferred that both $V^{91}$ and $V^{94}$ represent a hydrogen atom, and $V^{92}$ and $V^{93}$ each represents a hydrogen atom, an alkyl group (e.g., methyl), an aryl group (e.g., phenyl), an aromatic heterocyclic group (e.g., 1-pyrrolyl), an alkoxyl group (e.g., methoxy), an alkylthio group (e.g., methylthio), a cyano group, an acyl group (e.g., acetyl), an alkoxycarbonyl group (e.g., methoxycarbonyl), or a halogen atom (e.g., fluorine, chlorine, bromine, iodine). $V^{92}$ more preferably represents a hydrogen atom and $V^{93}$ more preferably represents a methyl group, a methoxy group, a cyano group, an acetyl group, a methoxycarbonyl group, or a halogen atom, still more preferably a halogen atom, particularly preferably a fluorine atom, a chlorine atom or a bromine atom, and most preferably a fluorine atom or a chlorine atom.

When the methine dye represented by formula (XXX) is used in a red-sensitive emulsion layer, it is preferred that the dye is represented by formula (XXXIb) or (XXXIIb) ($A^{91}$ preferably represents an ethyl group), either $X^{91}$ or $X^{92}$ represents an oxygen atom and the other represents a sulfur atom, and $V^{95}$ represents a chlorine atom or a bromine atom.

It is preferred that $R^{91}$ and $R^{92}$ each represents a sulfoalkyl group, a carboxyalkyl group or an alkanesulfonylcarbamoylalkyl group, all of $V^{91}$, $V^{92}$ and $V^{94}$ represent a hydrogen atom, $V^{93}$ represents an alkyl group (e.g., methyl), an alkoxyl group (e.g., methoxy), an alkylthio group (e.g., methylthio), a cyano group, an acyl group (e.g., acetyl), an alkoxycarbonyl group (e.g., methoxycarbonyl), or a halogen atom (e.g., fluorine, chlorine, bromine, iodine), more preferably a methyl group, a methoxy group, a cyano group, an acetyl group, a methoxycarbonyl group or a halogen atom, particularly preferably a halogen atom, and most preferably a fluorine atom or a chlorine atom, $M^{91}$ represents an organic or inorganic monovalent cation, and $m^{91}$ represents 0 or 1.

When the methine dye represented by formula (XXX) is used in a green-sensitive emulsion layer, it is preferred that the dye is represented by formula (XXXIb) or (XXXIIb) ($A^{91}$ preferably represents an ethyl group), both of $X^{91}$ and $X^{92}$ represent an oxygen atom, and $V^{95}$ represents a chlorine atom or a bromine atom.

It is preferred that $R^{91}$ and $R^{92}$ each represents a sulfoalkyl group, a carboxyalkyl group or an alkanesulfonylcarbamoylalkyl group, all of $V^{91}$, $V^{92}$ and $V^{94}$ represent a hydrogen atom, $V^{93}$ represents an alkyl group (e.g., methyl), an alkoxyl group (e.g., methoxy), an alkylthio group (e.g., methylthio), a cyano group, an acyl group (e.g., acetyl), an alkoxycarbonyl group (e.g., methoxycarbonyl), or a halogen atom (e.g., fluorine, chlorine, bromine, iodine), more preferably a methyl group, a methoxy group, a cyano group, an acetyl group, a methoxycarbonyl group or a halogen atom, particularly preferably a halogen atom, and most preferably a fluorine atom or a chlorine atom, $M^{91}$ represents an organic or inorganic monovalent cation, and $m^{91}$ represents 0 or 1.

When the methine dye represented by formula (XXX) is used in a blue-sensitive emulsion layer, it is preferred that the dye is represented by formula (XXXIa) or (XXXIIa), both of $X^{81}$ and $X^{82}$ represent a sulfur atom, and $V^{85}$ represents a chlorine atom or a bromine atom. Formula (XXXIa) is preferred to (XXXIIa).

$R^{81}$ and $R^{82}$ each preferably represents a sulfoalkyl group, a carboxyalkyl group or an alkanesulfonylcarbamoylalkyl group, more preferably either $R^{81}$ or $R^{82}$ represents an alkyl group substituted with a carboxyl group or an alkanesulfonylcarbamoyl group, and the other represents an alkyl group substituted with a sulfo group, still more preferably either $R^{81}$ or $R^{82}$ represents a carboxymethyl group or a methanesulfonylcarbamoylmethyl group, particularly preferably $R^{81}$ represents a carboxymethyl group or a methanesulfonylcarbamoylmethyl group, and most preferably $R^{81}$ represents a methanesulfonylcarbamoylmethyl group.

All of $V^{81}$, $V^{82}$ and $V^{84}$ represent a hydrogen atom, $V^{83}$ represents an alkyl group (e.g., methyl), an alkoxyl group (e.g., methoxy), an alkylthio group (e.g., methylthio), a cyano group, an acyl group (e.g., acetyl), an alkoxycarbonyl group (e.g., methoxycarbonyl), or a halogen atom (e.g., fluorine, chlorine, bromine, iodine), more preferably a methyl group, a methoxy group, a cyano group, an acetyl group, a methoxycarbonyl group or a halogen atom, particularly preferably a halogen atom, and most preferably a fluorine atom or a chlorine atom, $M^{81}$ represents an organic or inorganic monovalent cation, and $m^{81}$ represents 0 or 1.

In general, sensitizing dyes which are less in residual colors are poor in J-associative property and low in sensitivity, but the sensitizing dyes according to the present invention are remarkably high in J-associative property andhigh in sensitivity, although they generate less residual colors.

The specific examples of the methine dyes represented by formulae (I), (II), (III), (IV), (V), (VI), (VII), (VIII), (XX) (XXI), (XXX), (XXXI), (XXXIa), (XXXIb), (XXXII), (XXXIIa) and (XXXIIb) are shown below, but the present invention is not limited to these compounds.

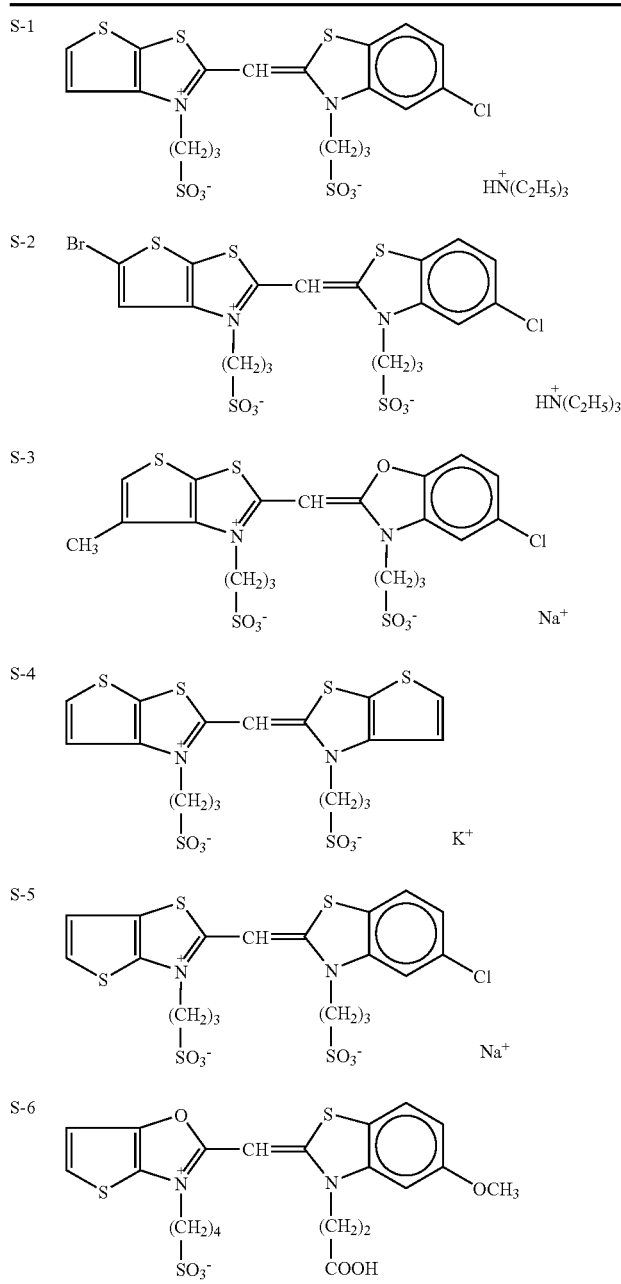

-continued
S-7 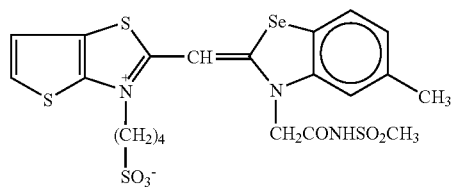
S-8 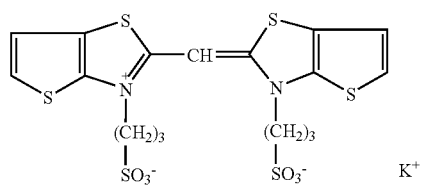
S-9 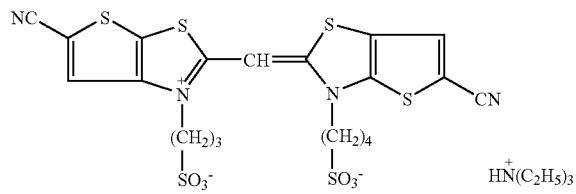
S-10 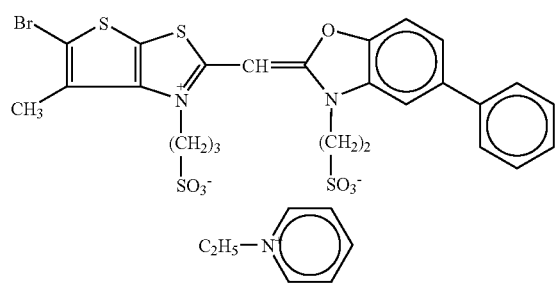
S-11 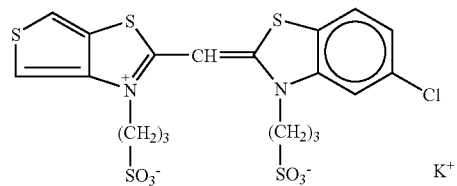
S-12 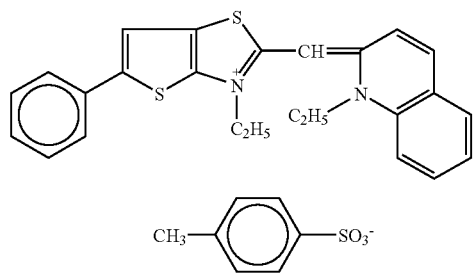
S-13 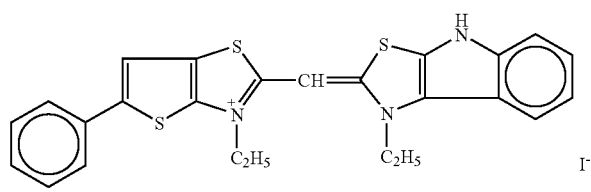

-continued
S-14
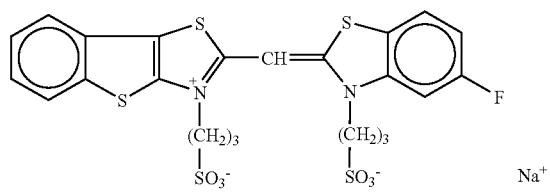
S-15
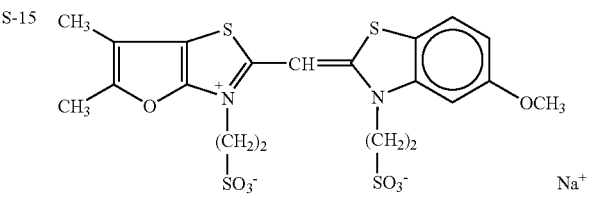
S-16
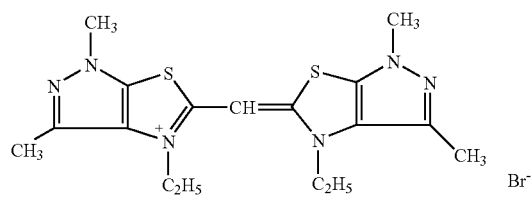
S-17
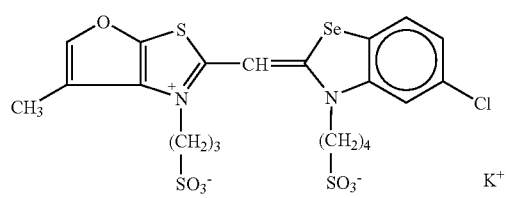
S-18
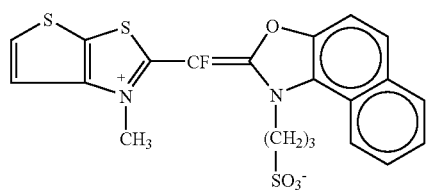
S-19
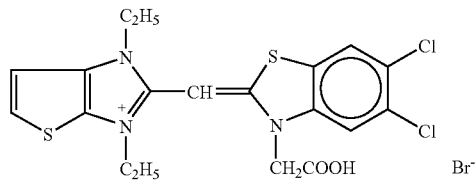
S-20
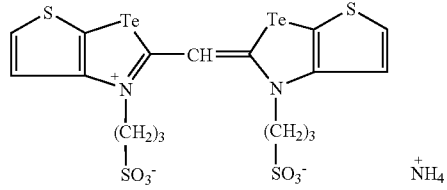

-continued
S-21 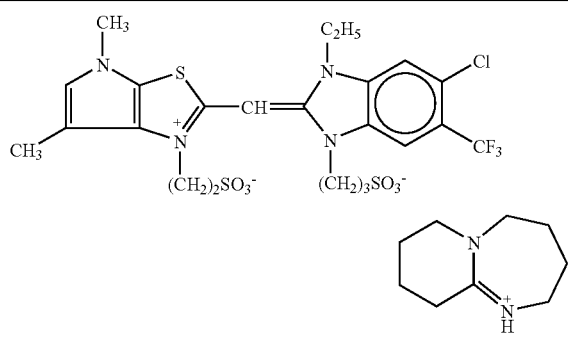
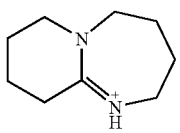
S-22 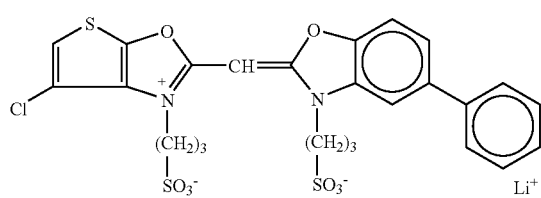
S-23 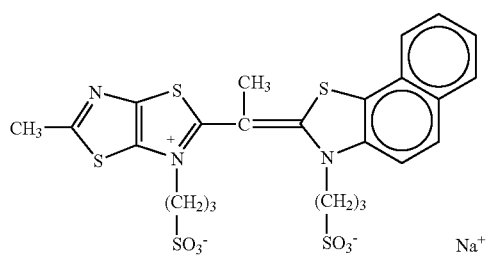
S-24 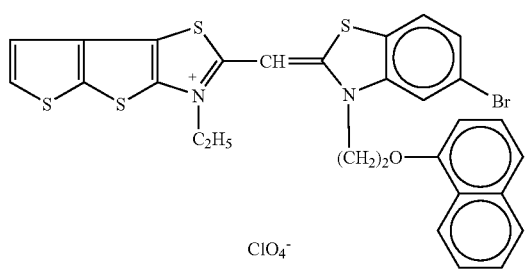
S-25 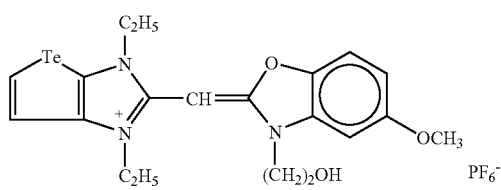
S-26 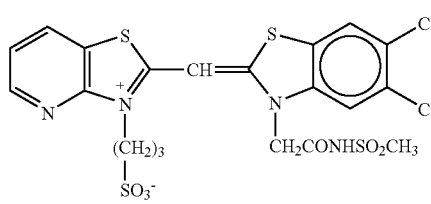
S-27 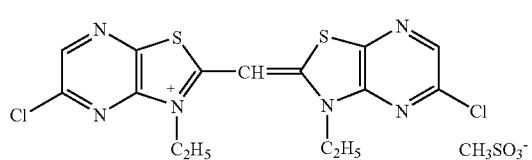

S-28 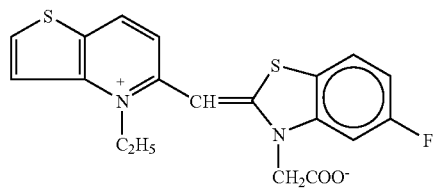
S-29 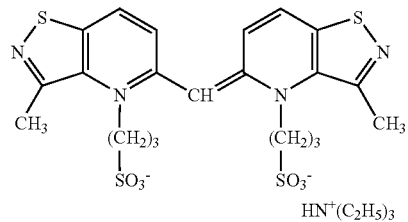
S-30 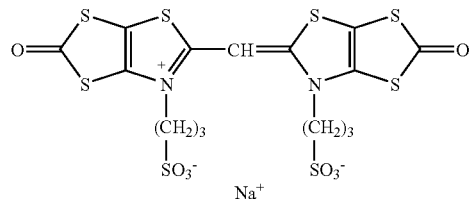
S-31 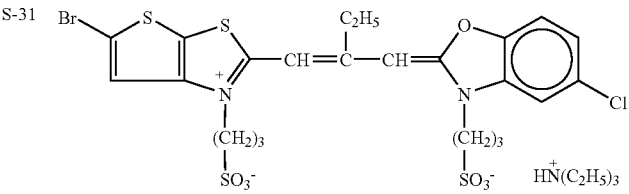
S-32 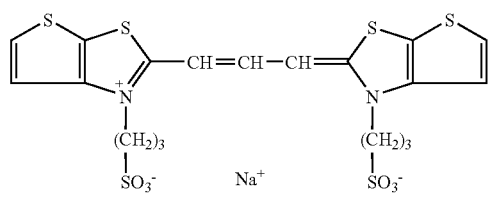
S-33 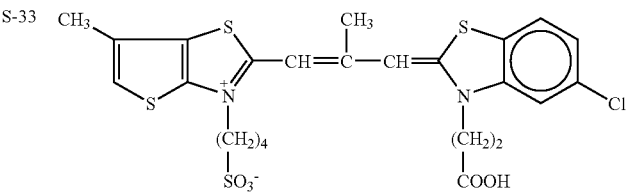
S-34 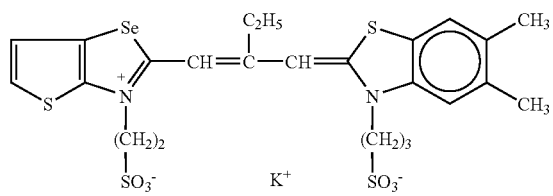

-continued
S-35 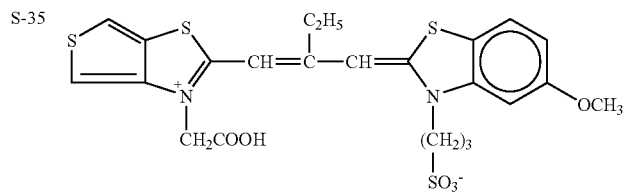
S-36 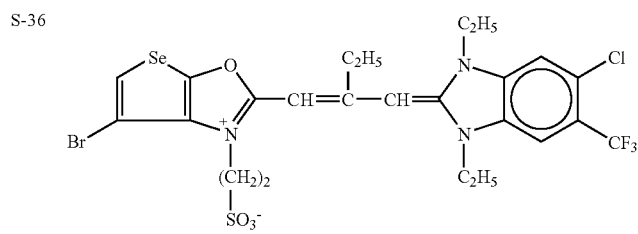
S-37 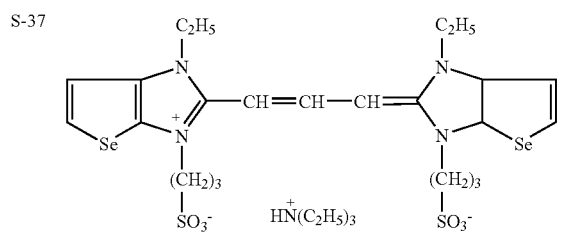
S-38 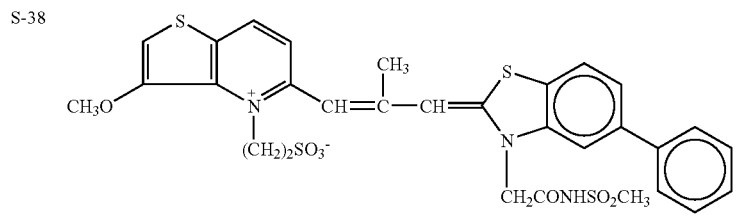
S-39 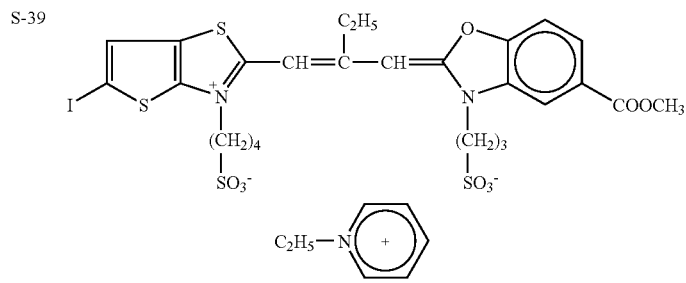
S-40 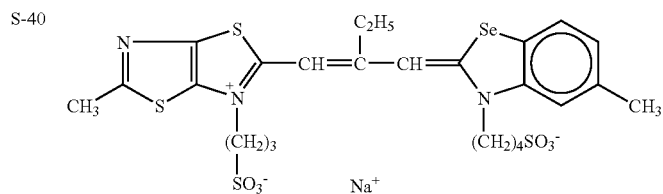
S-41 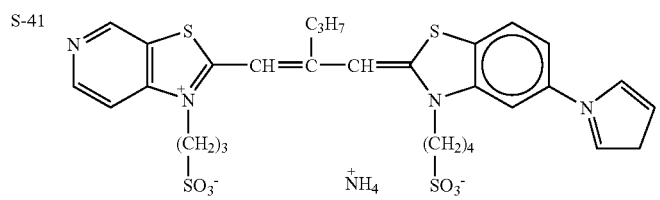

-continued
S-42 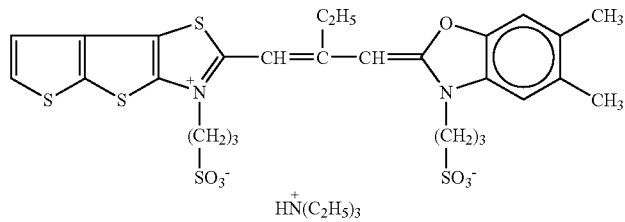
S-43 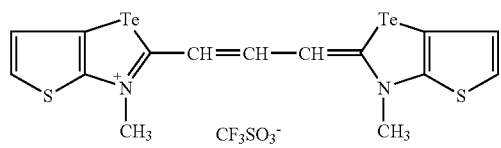
S-44 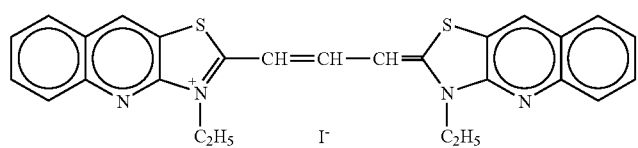
S-45 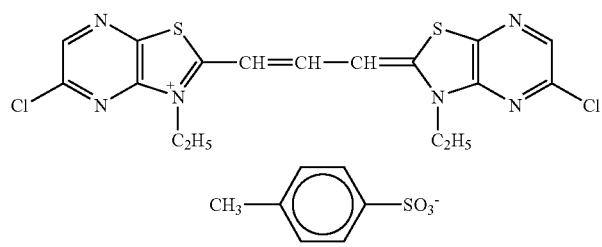
S-46 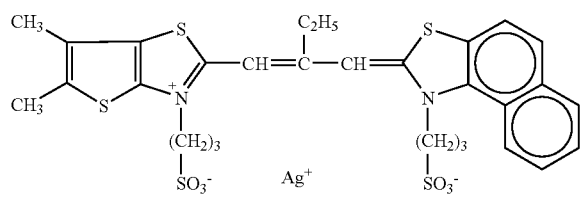
S-47 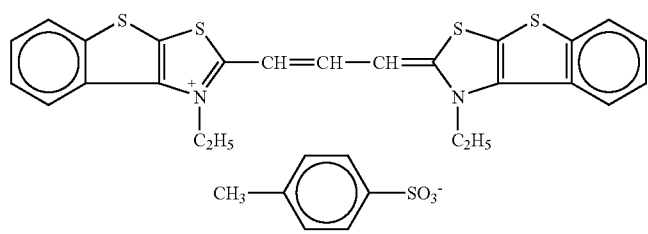
S-48 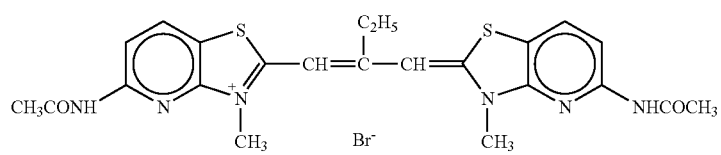
S-49 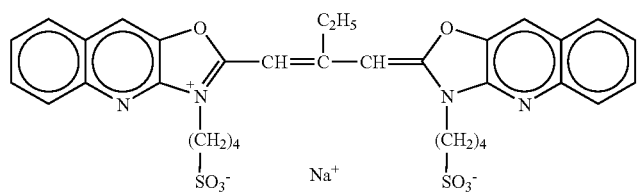

-continued
S-50
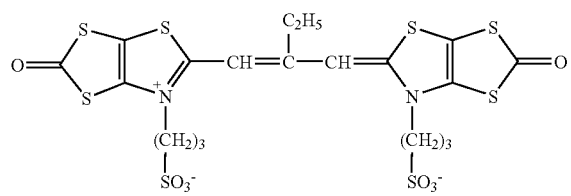
S-51
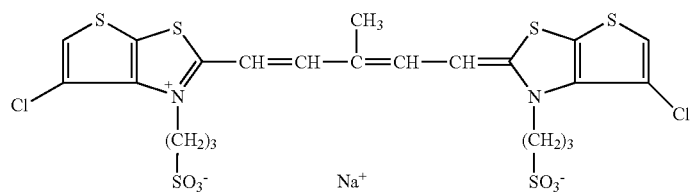
S-52
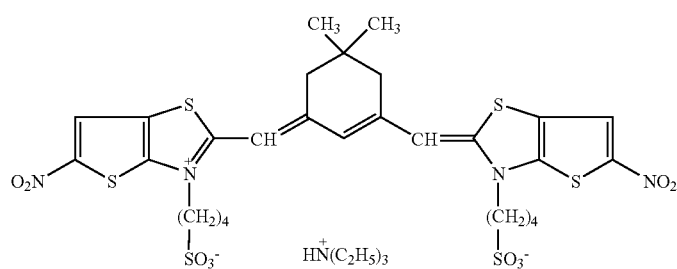
S-53
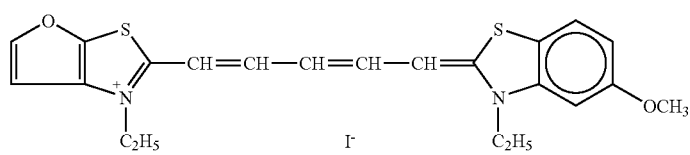
S-54
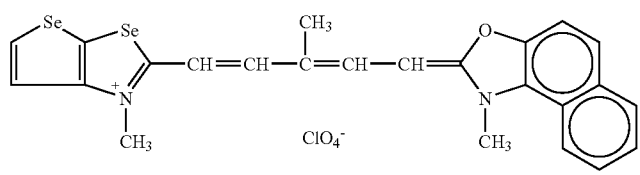
S-55
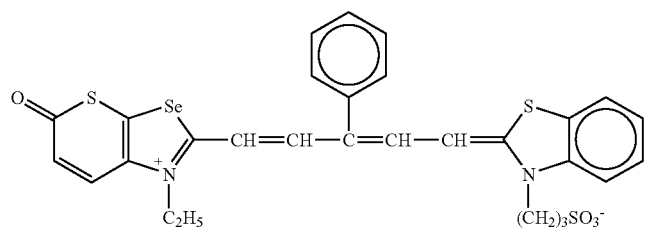
S-56
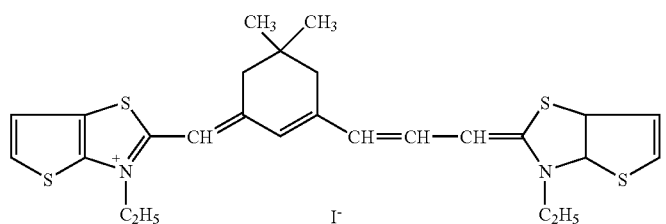

-continued
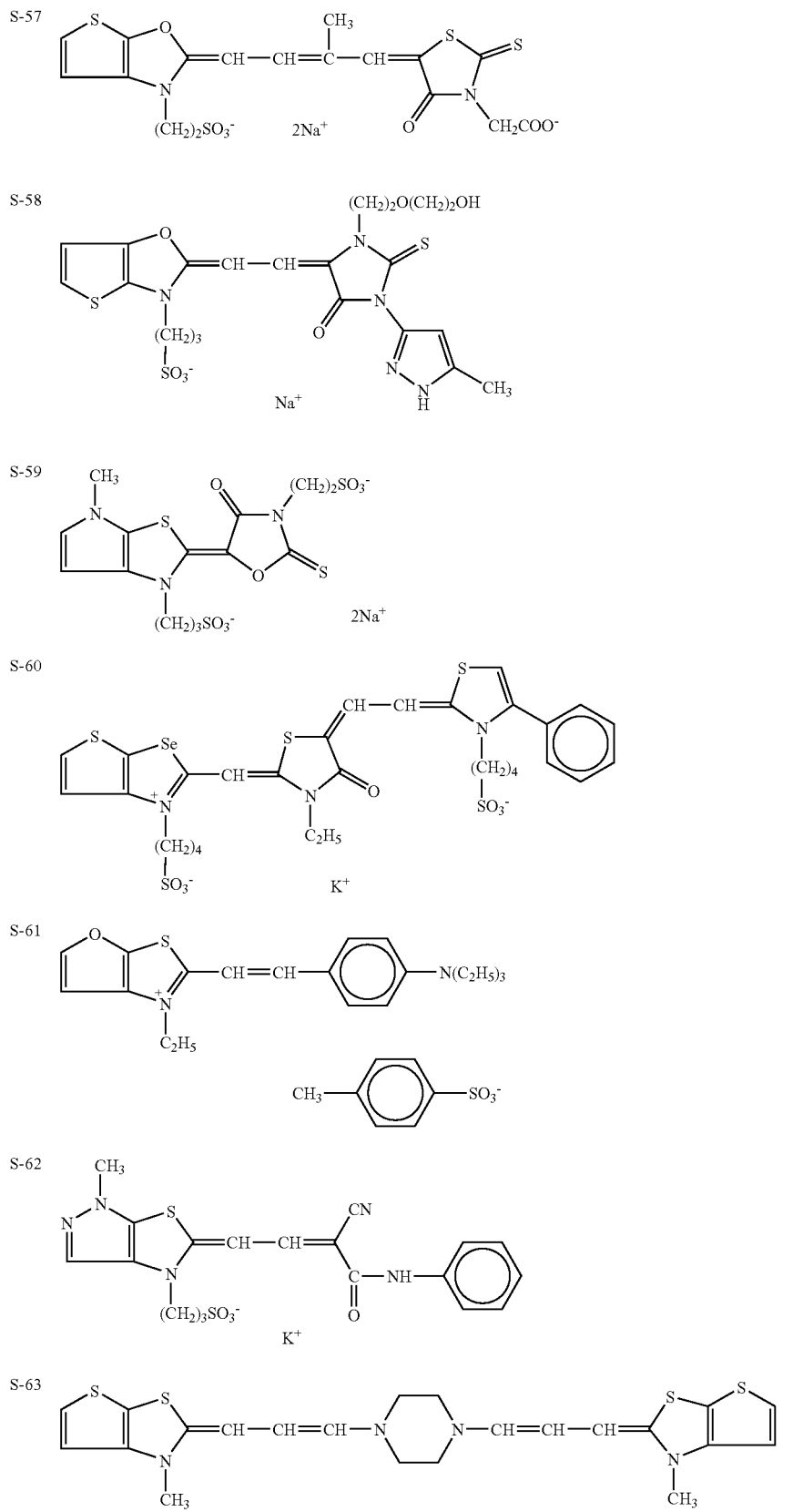

-continued
S-64 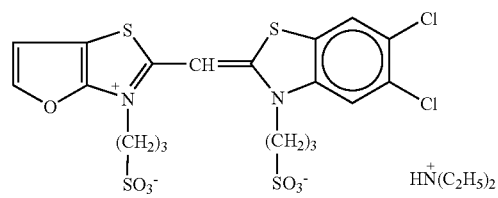
S-65 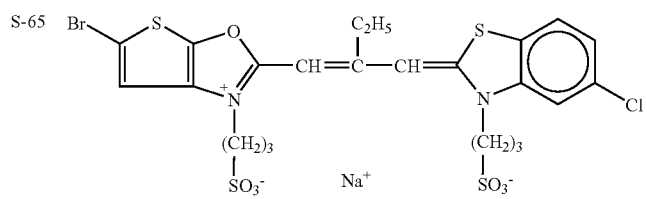
S-66 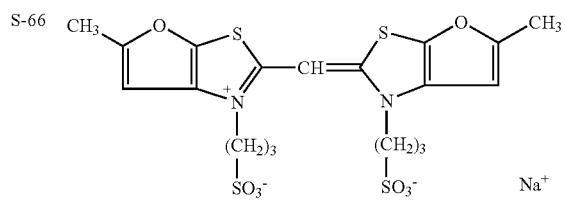
S-67 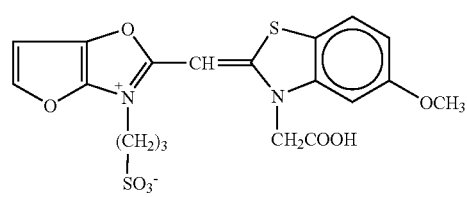
S-68 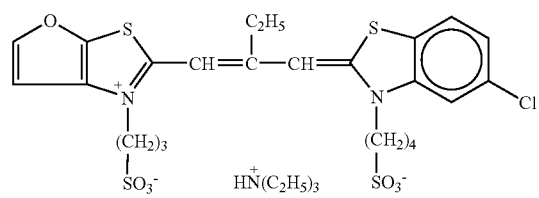
S-69 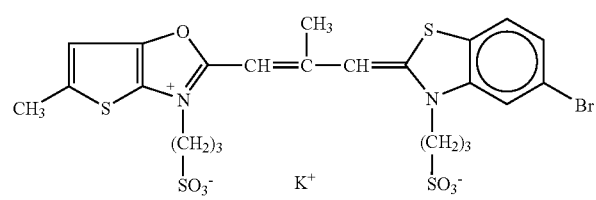
S-70 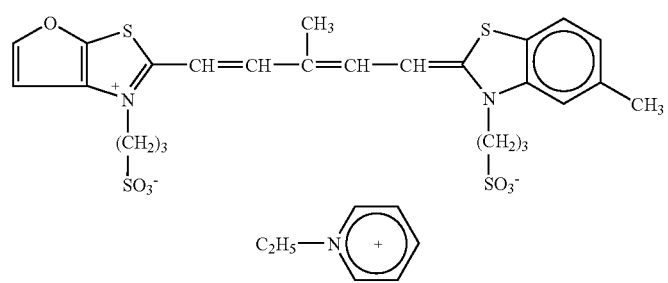

-continued
S-71
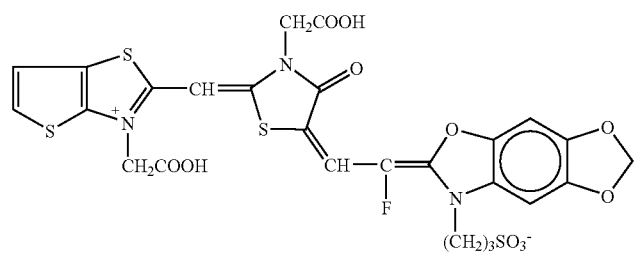
S-72
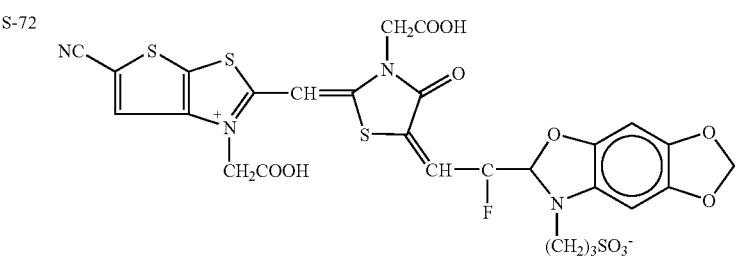
S-73
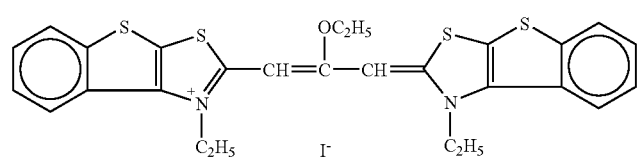
S-74
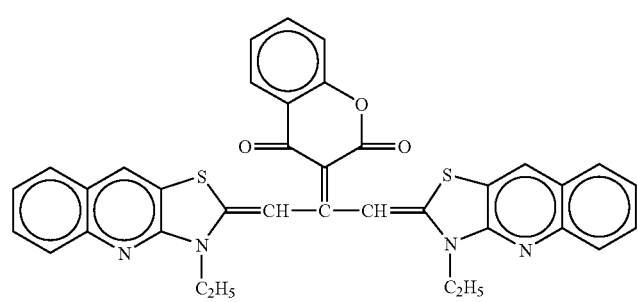
S-75
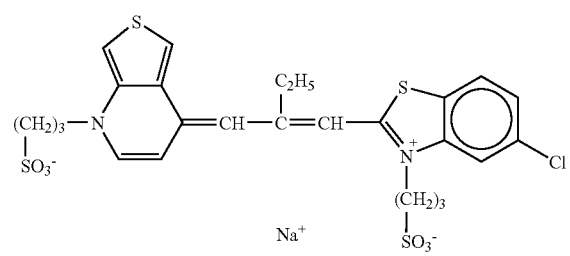
S-76
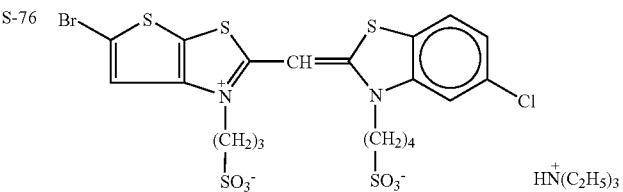

-continued
| | |
|---|---|
| S-77 | 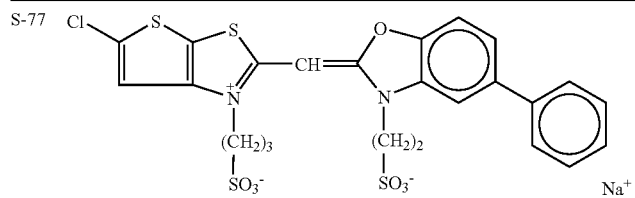 |
| S-78 | 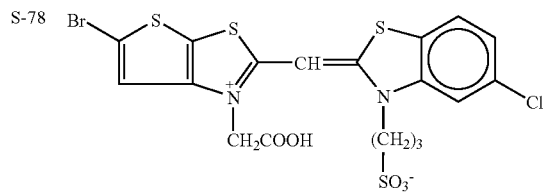 |
| S-79 | 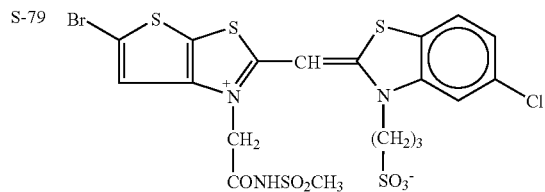 |
| S-80 | 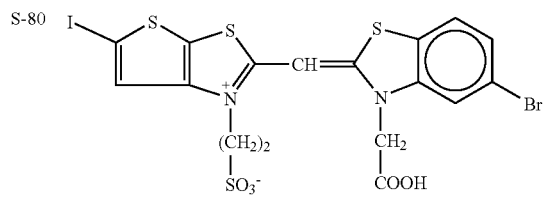 |
| S-81 | 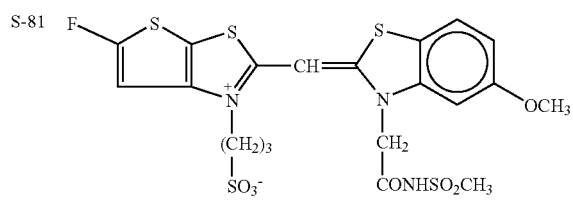 |
| S-82 | 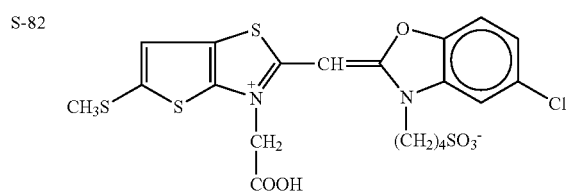 |
| S-83 | 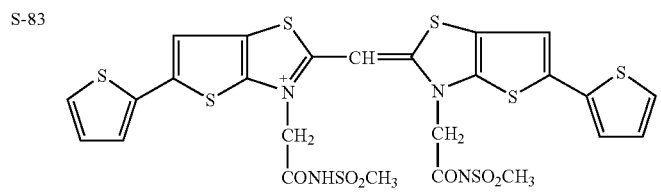 |
| S-84 | 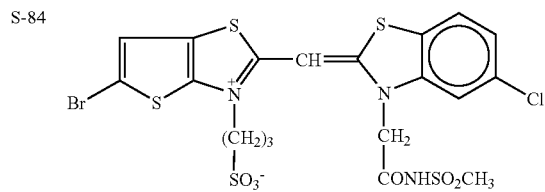 |

S-85 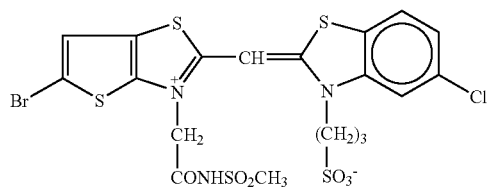
S-86 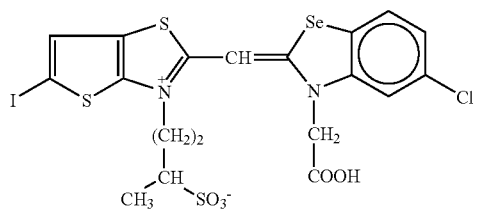
S-87 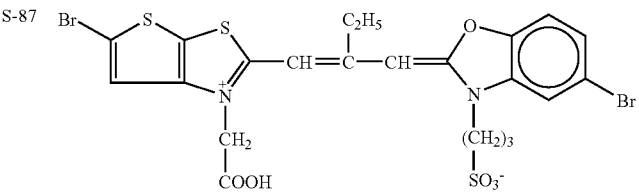
S-88 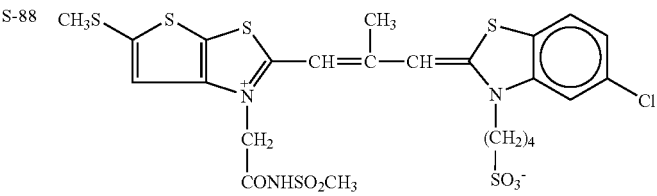
S-89 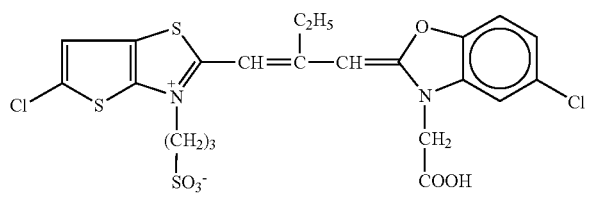
S-90 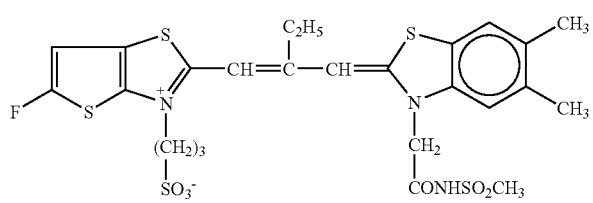
S-91 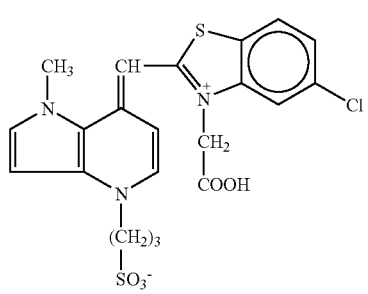

-continued
S-92 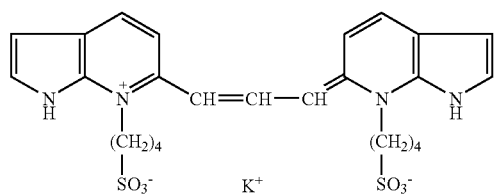
S-93 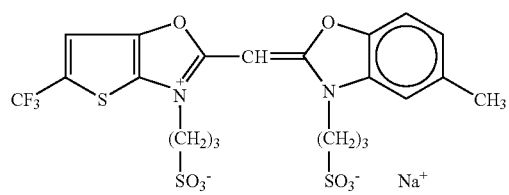
S-94 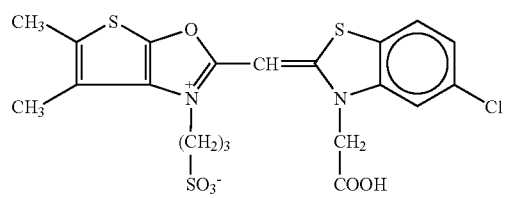
S-95 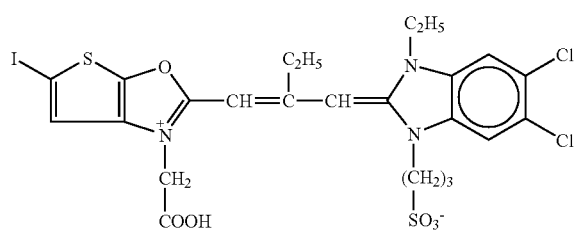
S-96 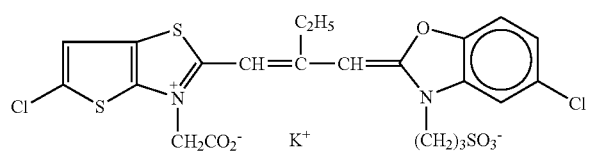
S-97 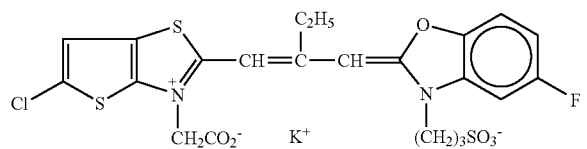
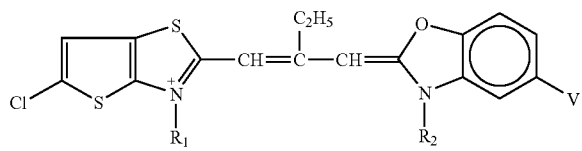
| | $R_1$ | $R_2$ | V |
|---|---|---|---|
| S-98 | $CH_2CONHSO_2CH_3$ | $(CH_2)_3SO_3^-$ | Br |
| S-99 | " | " | Cl |
| S-100 | " | " | F |
| S-101 | $(CH_2)_3SO_3^-$ | $CH_2CO_2H$ | Cl |
| S-102 | " | " | Br |
| S-103 | " | " | F |
| S-104 | $CH_2CO_2H$ | $(CH_2)_3SO_3^-$ | Br |

-continued

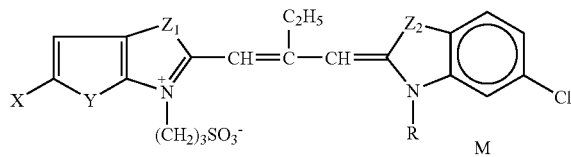

|  | X | Y | Z₁ | Z₂ | R | M |
|---|---|---|---|---|---|---|
| S-105 | F | Y | S | S | $CH_2CO_2H$ | — |
| S-106 | Br | O | O | S | $(CH_2)_3SO_3^-$ | $HN^+(C_2H_5)_3$ |
| S-107 | Cl | S | O | S | $CH_2CONHSO_2CH_3$ | — |
| S-108 | Cl | NH | O | O | $CH_2CO_2H$ | — |
| S-109 | Cl | S | S | O | $(CH_2)_3SO_3^-$ | $K^+$ |
| S-110 | Br | S | S | O | $(CH_2)_3SO_3^-$ | $K^+$ |
| S-111 | Cl | S | O | O | $(CH_2)_3SO_3^-$ | $Na^+$ |

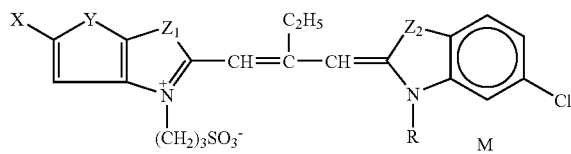

|  | X | Y | Z₁ | Z₂ | R | M |
|---|---|---|---|---|---|---|
| S-112 | Cl | O | S | O | $CH_2CO_2H$ | — |
| S-113 | Br | O | S | S | $(CH_2)_3SO_3^-$ | $K^+$ |
| S-114 | H | NH | S | O | $CH_2CO_2H$ | — |
| S-115 | Cl | NH | S | O | $CH_2CONHSO_2CH_3$ | — |
| S-116 | Cl | N—CH₃ | O | S | $CH_2CO_2H$ | — |

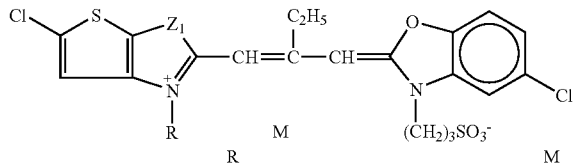

|  | R | M |
|---|---|---|
| S-117 | $(CH_2)_4SO_3^-$ | $K^+$ |
| S-118 | $CH_2CONHSO_2CH_3$ | — |
| S-119 | $CH_2CO_2H$ | — |

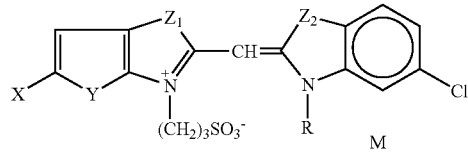

|  | X | Y | Z₁ | Z₂ | R | M |
|---|---|---|---|---|---|---|
| S-120 | Cl | O | S | S | $CH_2CO_2H$ | — |
| S-121 | Cl | NH | S | S | $CH_2CONHSO_2CH_3$ | — |
| S-122 | Br | S | O | S | $(CH_2)_3SO_3^-$ | $HN^+(C_2H_5)_3$ |
| S-123 | Br | O | S | S | $CH_2CO_2H$ | — |

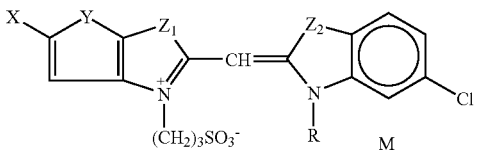

|  | X | Y | Z₁ | Z₂ | R | M |
|---|---|---|---|---|---|---|
| S-124 | Cl | S | O | S | $CH_2CO_2H$ | — |
| S-125 | H | NH | S | S | $(CH_2)_3SO_3^-$ | $HN^+(C_2H_5)_3$ |
| S-126 | Cl | NH | S | S | $CH_2SO_2NHCOCH_3$ | — |

-continued
| | | | | | | |
|---|---|---|---|---|---|---|
| S-127 | Br | O | S | S | CH$_2$CO$_2$H | — |
| S-128 | Cl | N—CH$_3$ | S | O | (CH$_2$)$_4$SO$_3^-$ | HN$^+$(C$_2$H$_5$)$_3$ |
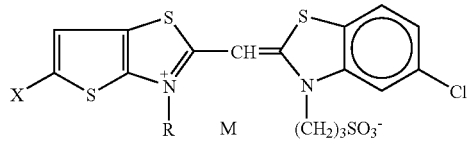
| | X | R | M |
|---|---|---|---|
| S-129 | Cl | (CH$_2$)$_3$SO$_3^-$ | HN$^+$(C$_2$H$_5$)$_3$ |
| S-130 | Cl | CH$_2$CONHSO$_2$CH$_3$ | — |
| S-131 | Cl | CH$_2$CO$_2$H | — |
| S-132 | Br | CH$_2$CO$_2$H | — |
S-133
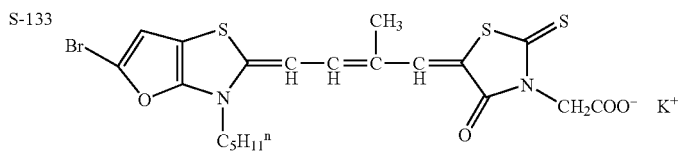
S-134
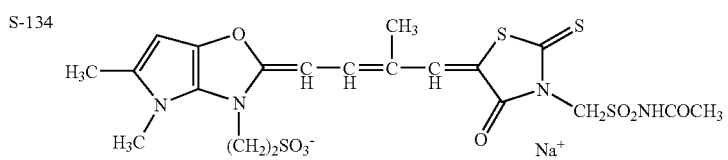
S-135
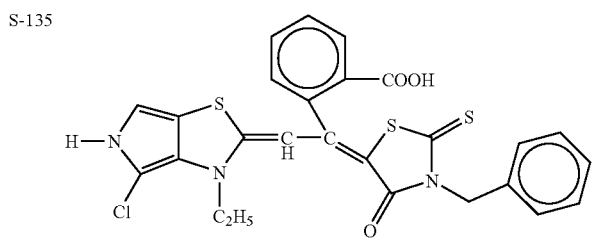
S-136
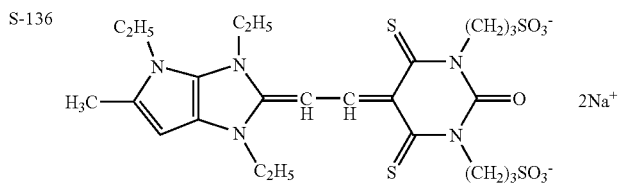
S-137
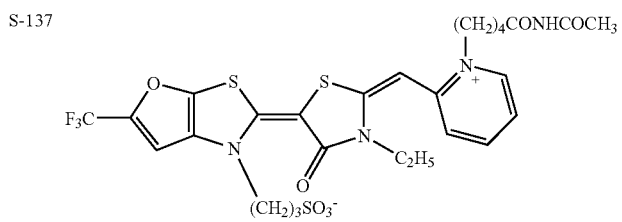
S-138
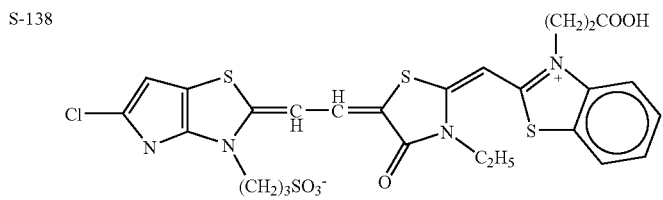

-continued
S-139 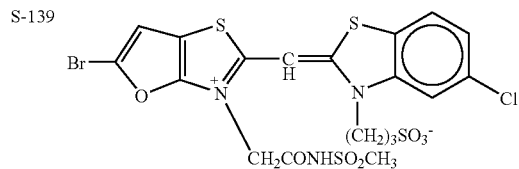
S-140 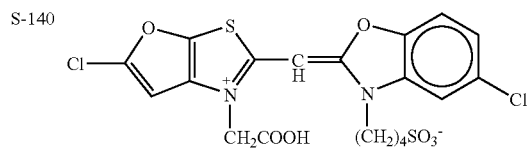
S-141 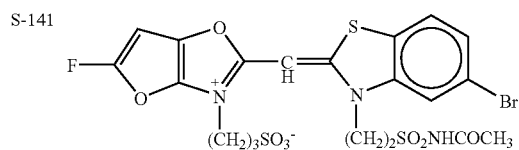
S-142 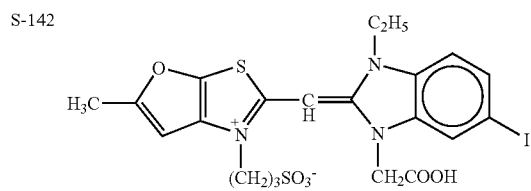
S-143 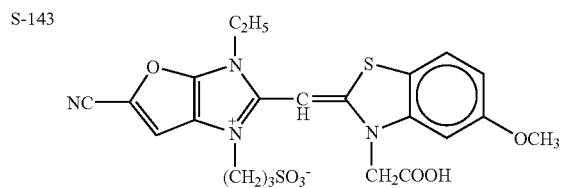
S-144 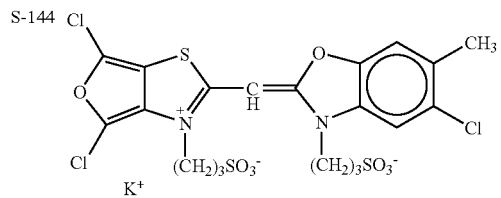
S-145 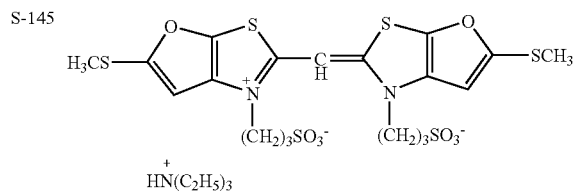
S-146 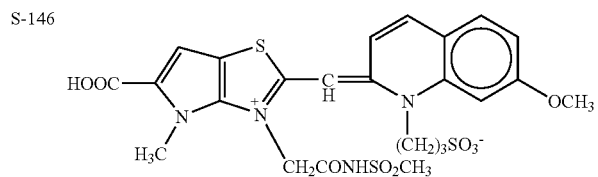

-continued
S-147 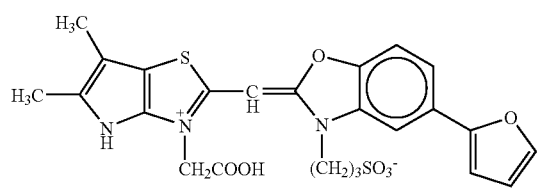
S-148 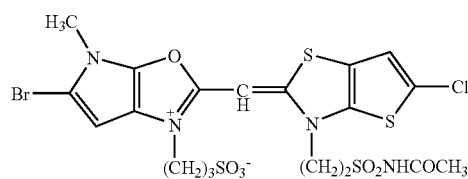
S-149 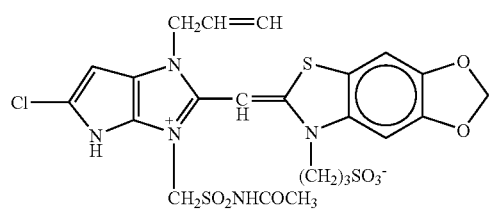
S-150 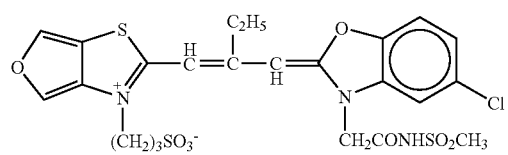
S-151 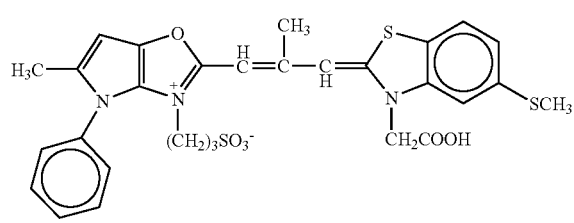
S-152 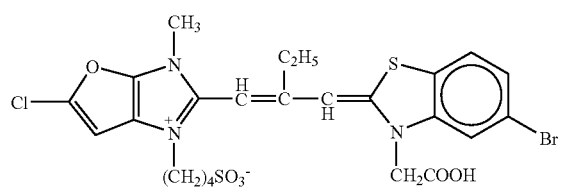
S-153 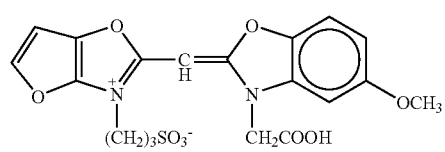
S-154 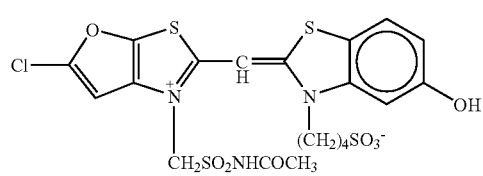

S-155

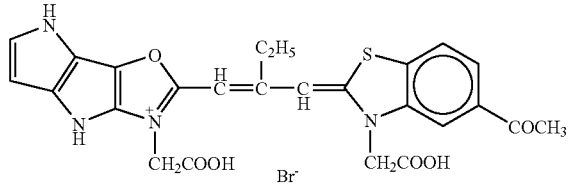

S-156

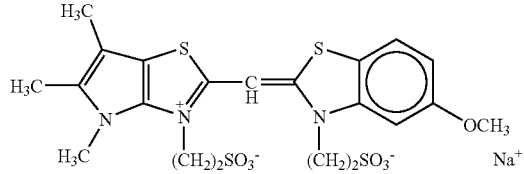

S-157

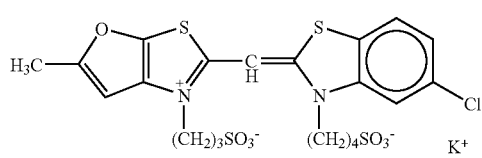

S-158

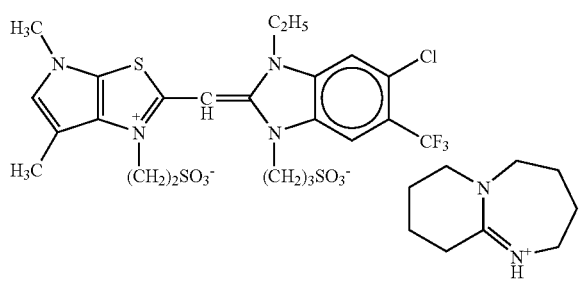

The methine dyes represented by formula (I), (II), (III), (IV), (V), (VI), (VII), (VIII), (XX), (XXI), (XXX), (XXXI), (XXXIa) (XXXIb), (XXXII), (XXXIIa) or (XXXIIb) for use in the present invention can be synthesized according to the methods described in the following literature.

a) F. M. Harmer, *Heterocyclic Compounds—Cyanine Dyes and Related Compounds*, John Wiley & Sons, New York, London (1964)
b) D. M. Sturmer, *Heterocyclic Compounds—Special Topics in Heterocyclic Chemistry*, Chap. 8, Clause 4, pp. 482 to 515, John Wiley & Sons, New York, London (1977)
c) *Rodd's Chemistry of Carbon Compounds*, 2nd Ed., Vol. 4, Part B, Chap. 15, pp. 369 to 422, Elsevier Science Publishing Company Inc., New York (1977)

The synthesis of hetero ring as a raw material of the methine dyes represented by formula (I), (II), (III), (IV), (V), (VI), (VII),(VIII), (XX), (XXI), (XXX), (XXXI), (XXXIa), (XXXIb) (XXXII), (XXXIIa) or (XXXIIb) for use in the present invention is disclosed in literatures such as Bulletin de la Societe Chimique de France, Chap. II, p. 150 (1980) and Journal of Heterocyclic Chemistry, Chap. 16, p. 1563 (1979).

For the incorporation of the methine dyes represented by formula (I), (II), (III), (IV), (V), (VI), (VII), (VIII), (XX), (XXI), (XXX), (XXXI), (XXXIa), (XXXIb), (XXXII), (XXXIIa) or (XXXIIb) according to the present invention into the silver halide emulsion of the present invention, they may be directly dispersed in the emulsion, or they may be dissolved in water, a single or mixed solvent of methanol, ethanol, propanol, acetone, methyl cellosolve, 2,2,3,3-tetrafluoropropanol, 2,2,2-trifluoroethanol, 3-methoxy-1-propanol, 3-methoxy-1-butanol, 1-methoxy-2-propanol, N,N-dimethylformamide, etc., and then added to the emulsion.

In addition, various methods can be used for incorporating dyes into the emulsion, for example, a method in which dyes are dissolved in a volatile organic solvent, the solution is dispersed in water or hydrophilic colloid and this dispersion is added to the emulsion as disclosed in U.S. Pat. No. 3,469,987, a method in which water-insoluble dyes are dispersed in a water-soluble solvent without being dissolved and this dispersion is added to the emulsion as disclosed in JP-B-46-24185 (the term "JP-B" as used herein means an "examined Japanese patent publication"), a method in which dyes are dissolved in acid and this solution is added to the emulsion, or dyes are added to the emulsion as an aqueous solution coexisting with acid or base as disclosed in JP-B-44-23389, JP-B-44-27555 and JP-B-57-22091, a method in which dyes are added to the emulsion as an aqueous solution or a colloidal dispersion coexisting with a surfactant as disclosed in U.S. Pat. Nos. 3,822,135 and 4,006,026, a method in which dyes are directly dispersed in a hydrophilic colloid and the dispersion is added to the emulsion as disclosed in JP-A-53-102733 and JP-A-58-105141, or a method in which dyes are dissolved using a compound capable of red-shifting and the solution is added to the emulsion as disclosed in JP-A-51-74624 can be used. Further, ultrasonic waves can also be used for dissolution.

The time of the addition of the methine dyes represented by formula (I), (II), (III), (IV), (V), (VI), (VII), (VIII), (XX), (XXI), (XXX), (XXXI), (XXXIa), (XXXIb), (XXXII), (XXXIIa) or (XXXIIb) according to the present invention to the silver halide emulsion of the present invention may be at any stage of the preparation of the emulsion recognized as useful hitherto. For example, they may be added at any stage if it is before coating, i.e., before grain formation stage of silver halide grains and/or before desalting stage, during desalting stage and/or after desalting and before beginning of chemical ripening, as disclosed in U.S. Pat. Nos. 2,735,766, 3,628,960, 4,183,756, 4,225,666, JP-A-58-184142 and JP-A-60-196749, or immediately before or during chemical ripening, after chemical ripening and before coating as disclosed in JP-A-58-113920. Also, as disclosed in U.S. Pat. No. 4,225,666 and JP-A-58-7629, the dyes can be used as a single compound alone or in combination with compounds having foreign structures, and they may be divided and added separately, for example, one part of them is added during grain formation stage and the remaining is added during chemical ripening or after the completion of chemical ripening, otherwise one part is added prior to chemical ripening or during ripening stage and the remaining after completion of chemical ripening. The kinds of compounds added separately and combinations of compounds may be varied.

The use amount of the methine dyes represented by formula (I), (II), (III), (IV), (V), (VI), (VII), (VIII), (XX), (XXI), (XXX), (XXXI), (XXXIa), (XXXIb), (XXXII), (XXXIIa) or (XXXIIb) according to the present invention varies in accordance with the shape and the size of silver halide grains, but is preferably from $1\times10^{-2}$ to $1\times10^{-8}$ mol per mol of the silver halide.

Other sensitizing dyes can be used in combination besides the methine dyes represented by formula (I), (II), (III), (IV), (V), (VI), (VII), (VIII), (XX), (XXI), (XXX), (XXXI), (XXXIa), (XXXIb), (XXXII), (XXXIIa) or (XXXIIb) according to the present einvention. Sensitizing dyes are often used in combination, in particular, for the purpose of supersensitization. Representative examples thereof are disclosed in U.S. Pat. Nos. 2,688,545, 2,977,229, 3,397,060, 3,522,052, 3,527,641, 3,617,293, 3,628,964, 3,666,480, 3,672,898, 3,679,428, 3,703,377, 3,769,301, 3,814,609, 3,837,862, 4,026,707, British Patents 1,344,281, 1,507,803, JP-B-43-4936, JP-B-53-12375, JP-A-52-110618 and JP-A-52-109925.

Any of silver chloride, silver bromide, silver chlorobromide, silver iodobromide, silver iodochloride, and silver chloroiodobromide can be used as silver halide grains in the silver halide photographic material according to the present invention.

The silver halide grains contained in the silver halide emulsion for use in the present invention have an average grain size (the grain size herein refers to the diameter of the equivalent circle corresponding to the projected area of the grains, and the number average is taken as the average grain size) of preferably from 0.1 to 2 µm.

With respect to the distribution of sizes of these grains, a so-called monodispersed emulsion having a variation coefficient (the value obtained by dividing the standard deviation of the grain size distribution by the average grain size) of 20% or less, preferably 15% or less, and more preferably 10% or less, is preferred. For obtaining a wide latitude, it is also preferred to blend the above described monodispersed emulsions in the same layer or multilayer-coat the monodispersed emulsion.

The silver halide grains contained in a photographic emulsion may have a regular crystal form, such as cubic, octahedral or tetradecahedral form, an irregular crystal form, such as spherical or plate-like form, or a composite form of these forms. In the present invention, the grains having the above described regular crystal forms preferably account for 50% or more, preferably 70% or more, and more preferably 90% or more.

Further, an emulsion in which the proportion of tabular grains having an average aspect ratio (equivalent-circle diameter/thickness) of 5 or more, preferably 8 or more, to the entire grains exceeds 50% as a projected area can also be preferably used.

The emulsion for use in the present invention can be prepared according to the methods disclosed, for example, in P. Glafkides, *Chimie et Physique Photographique*, Paul Montel (1967), G. F. Duffin, *Photographic Emulsion Chemistry*, Focal Press (1966), V. L. Zelikman, et al., *Making and Coating Photographic Emulsion*, Focal Press (1964), and so on. That is, any process, such as an acid process, a neutral process, and an ammoniacal process, can be used. A single jet method, a double jet method, and a combination of them may be used for reacting a soluble silver salt with a soluble halide, and any of these methods can be used. A method in which silver halide grains are formed in the atmosphere of excessive silver ions (a so-called reverse mixing method) may also be used. Further, a so-called controlled double jet method, which is one form of a double jet method, in which the pAg of the liquid phase in which the silver halide is formed is maintained constant, may also be used. According to this method, a silver halide emulsion having a regular crystal form and substantially an almost uniform grain size can be obtained.

The silver halide emulsions for use in the present invention are generally chemically sensitized. In chemical sensitization according to the present invention, chemical sensitization using chalcogen sensitizers (typically, sulfur sensitization represented by the addition of labile sulfur compounds, selenium sensitization by selenium compounds, and tellurium sensitization by tellurium compounds can be exemplified), noble metal sensitization represented by gold sensitization, and reduction sensitization are used alone or in combination. The compounds disclosed in JP-A-62-215272, from p. 18, right lower column to p. 22, right upper column are preferably used in the chemical sensitization of the present invention.

Various compounds and precursors thereof can be added to the silver halide emulsions of the present invention for the purpose of preventing generation of fog or stabilizing photographic performances during production, storage or photographic processing of the photographic material. The compounds disclosed in JP-A-62-215272, from pp. 39to 72 are preferably used. Further, 5-arylamino-1,2,3,4-thiatriazole compounds (the aryl residue has at least one electron attractive group) disclosed in European Patent 0447647 are also preferably used.

The silver halide emulsions produced according to the present invention can be used in both color photographic materials, such as color papers, color films for photographing, and color reversal films, and black-and-white photographic materials, such as X-ray films, general films for photographing, and photographic films for printing, and preferably used as color photographic materials.

With respect to various techniques and inorganic and organic materials which can be used in the silver halide photographic emulsions, in general, those described in *Research Disclosure*, No. 308119 (1989), ibid., No. 37038 (1995) can be used.

In addition to these, more specifically, for example, techniques and inorganic and organic materials which can be used in the color photographic material to which the silver halide photographic emulsion of the present invention is applicable are disclosed in the following places of EP-A-436938 and the patents cited in the following places.

| Item | Place |
| --- | --- |
| 1) Layer Constitution | line 34, page 146 to line 25, page 147 |
| 2) Silver Halide Emulsion | line 26, page 147 to line 12, page 148 |
| 3) Yellow Coupler | line 35, page 137 to line 33, page 146, lines 21 to 23, page 149 |
| 4) Magenta Coupler | lines 24 to 28, page 149; line 5, page 3 to line 55, page 25 of EP-A-421453 |
| 5) Cyan Coupler | lines 29 to 33, page 149; line 28, page 3 to line 2, page 40 of EP-A-432804 |
| 6) Polymer Coupler | lines 34 to 38, page 149; line 39, page 113 to line 37, page 123 of EP-A-435334 |
| 7) Colored Coupler | line 42, page 53 to line 34, page 137, lines 39 to 45, page 149 |
| 8) Other Functional Coupler | line 1, page 7 to line 41, page 53, line 46, page 149 to line 3 page 150; line 1, page 3 to line 50, page 29 of EP-A-435334 |
| 9) Preservative | lines 25 to 28, page 150 |
| 10) Formalin Scavenger | lines 15 to 17, page 149 |
| 11) Other Additives | lines 38 to 47, page 153; line 21, page 75 to line 56, page 84 of EP-A-421453 |
| 12) Dispersion Method | lines 4 to 24, page 150 |
| 13) Support | line 32 to 34, page 150 |
| 14) Film Thickness, Physical Properties of Film | lines 35 to 49, page 150 |
| 15) Color Development Process | line 50, page 150 to line 47, page 151 |
| 16) Desilvering Process | line 48, page 151 to line 53, page 152 |
| 17) Automatic Processor | line 54, page 152 to line 2, page 153 |
| 18) Washing and Stabilizing Processes | lines 3 to 37, page 153 |

In the photographic material of the present invention, it is preferred to color a hydrophilic colloid layer for the purpose of preventing irradiation and halation and improving safelight stability. As water-soluble dyes which can be used as such a coloring substance, the dyes capable of decoloration by processing (oxonol dyes and cyanine dyes, above all) disclosed in EP-A-0337490, pages 27 to 76, can be exemplified.

A coloring substance disperses regardless of the position where it is added and pervades over the entire constitutional layers of the photographic material by such coloration.

Cyan, magenta and yellow couplers are preferably impregnated in a loadable latex polymer (e.g., disclosed in U.S. Pat. No. 4,203,716) in the presence (or absence) of the high boiling point organic solvents described in the above table, or dissolved in a polymer insoluble in water but soluble in an organic solvent and emulsified and dispersed in a hydrophilic colloid aqueous solution.

Examples of polymers insoluble in water but soluble in an organic solvent which can preferably be used in the present invention include homopolymers or copolymers disclosed in U.S. Pat. No. 4,857,449, from pages 12 to 30. Methacrylate based or acrylamide based polymers are more preferred, in particular, acrylamide based polymers are preferred in the light of color image stability.

In the photographic material of the present invention, it is preferred to use color image preservability improving compounds disclosed in EP-A-0277589 in combination with the couplers. In particular, the use in combination with pyrazoloazole couplers or pyrrolotriazole couplers is preferred.

That is, the use of the compound disclosed in the above EP Patent which produces a chemically inactive and substantially colorless compound upon chemically bonding with an aromatic amine developing agent remaining after color development processing and/or the compound disclosed in the above EP Patent which produces a chemically inactive and substantially colorless compound upon chemically bonding with the oxidized product of an aromatic amine color developing agent remaining after color development processing, alone or in combination, is preferred for preventing the generation of stain due to the formation of a colored dye caused by the coupling reaction of the coupler with the color developing agent or the oxidized product thereof remaining in the film, or preventing other side reactions, during preservation after processing.

The present invention will be illustrated specifically with reference to examples below, but these are not to be construed as limiting the invention.

EXAMPLE 1

Synthesis of Methine Dye S-76

5-Bromo-2-methylthieno[3,2-d]thiazole was obtained at a yield of 34% by reacting 3-acetylamino-2,5-dibromothiophene (synthesized according to J. Am. Chem. Soc, 1954, 76, 2447) with phosphorous pentasulfide in toluene under heat-reflux.

5-Bromo-2-methylthieno[3,2-d]thiazole (2.58 g), 1.61 g of 1,3-propanesultone and 6.4 ml anisole were mixed and stirred with heating at 150° C. for 3 hours. After cooling the reaction mixture, the black precipitate generated was washed with acetone, the supernatant was removed by decantation, and 5.21 g of 4-(5-chloro-2-sulfobutylthio-3-benzothiazolio)butanesulfonate and 55 ml of acetonitrile were added thereto, followed by stirring with heating at 100° C.

Triethylamine (7.7 ml) was added to the reaction mixture and the mixture was refluxed under heating with stirring for 1.5 hours, thereby yellow precipitate was generated. The precipitate was filtered out by cooling with ice, washed with acetonitrile to thereby obtain 2.27 g of yellow powder. The yellow powder was dissolved in 150 ml of methanol, and then the solvent was distilled off to thereby obtain 1.34 g of Methine Dye S-76 as powder. The structure of S-76 was confirmed by $^1$H-NMR, FAB-MS, and elemental analysis.

$\lambda$max (MeOH)=435.7 nm ($\epsilon$=7.1×10$^4$)

EXAMPLE 2

Synthesis of Methine Dye S-31

5-Bromo-2-methylthieno[3,2-d]thiazole (1.47 g), 0.93 g of 1,3-propanesultone and 3.7 ml of anisole were mixed and stirred with heating at 150° C. for 3 hours. After cooling the reaction mixture, the black precipitate generated was washed with acetone. The supernatant was removed by decantation, and 3.28 g of 3-[5-chloro-2-(2-ethoxy-1-butenyl)-3-benzoxazolio]propane-sulfonate and 45 ml of dimethylsulfoxide were added thereto, followed by stirring at room temperature. 1,8-Diazabicyclo[5.4.0]-7-undecene (2.4 ml) was added to the reaction solution and the solution was stirred for 30 minutes, and then 6 ml of acetic acid and 600 ml of ethyl acetate were added thereto, thereby red precipitate was generated. The precipitate was purified by column chromatography, and 1.0 g of potassium acetate was added to methanol solution to distill off the solvent, thereby 1.03 g of Methine Dye S-31 was obtained as green powder. The structure of S-31 was confirmed by $^1$H-NMR, FAB-MS, and elemental analysis.

λmax (MeOH)=524.3 nm ($\epsilon$=7.8×$10^4$)

EXAMPLE 3

Synthesis of Methine Dye S-85

5-Bromo-2-methylthieno[2,3-d]thiazole was obtained at a yield of 96% by adding dropwise bromine to 2-methylthieno[2,3-d]thiazole (synthesized according to J. Heterocyclic Chem., 1983, 20, 113) in the presence of sodium acetate in an acetic acid solvent.

5-Bromo-2-methylthieno[3,2-d]thiazole (9.37 g), 10.37 g of methanesulfonylcarbamoylmethyl bromide and 12 ml of cumene were mixed and stirred with heating at 150° C. for 5 hours. The temperature of the reaction mixture was lowered to 80° C., acetone was added thereto, and the mixture was refluxed for 1 hour. The gray precipitate generated after cooling was filtered out, washed with acetone to thereby obtain 18.45 g of 5-bromo-3-methanesulfonylcarbamoylmethyl-2-methylthieno[2,3-d]thiazolium bromide as powder. The above-obtained compound (1.80 g), 1.78 g of 4-(5-chloro-2-sulfopropylthio-3-benzothiazolio)propanesulfonate, and 16 ml of acetonitrile were mixed and stirred with heating at 40° C. Triethylamine in an amount of 2 ml was added thereto and the reaction mixture was heated for 1 hour to thereby generate yellow precipitate. After ice-cooling the reaction solution, the precipitate was filtered out, washed with acetonitrile, thereby 1.61 g of yellow powder was obtained. The obtained powder was dissolved in a mixed solvent of 20 ml of methanol, 20 ml of water and 1 ml of triethylamine, and then 3 ml of acetic acid was added thereto, thereby precipitate was generated. The precipitate was filtered out and washed with acetone to obtain 1.24 g of Methine Dye S-85 as powder. The structure of S-85 was confirmed by $^1$H-NMR, FAB-MS, and elemental analysis.

λmax (MeOH)=445.8 nm ($\epsilon$=7.1×$10^4$)

EXAMPLE 4

Synthesis of Methine Dye S-96

5—Chloro-2-methylthieno[2,3-d]thiazole was obtained by making trichloroisocyanuric acid act on the above 2-methylthieno[2,3-d]thiazole in a dichloromethane solvent. Yield: 98%.

5- Chloro-2-methylthieno[2,3-d]thiazole (15.2 g), 13.3 g of bromoacetic acid and 24 ml of cumene were mixed and stirred with heating at outer temperature of 135° C. for 8 hours. After cooling the reaction mixture, 100 ml of acetone was added thereto. The crystals precipitated were filtered out by suction, washed with 50 ml of acetone, dried under reduced pressure, thereby 15.6 g of 3-carboxymethyl-5-chloro-2-methylthieno[2,3-d]thiazolium bromide (A) was obtained as yellow powder. To 7.4 g of (A), 18.5 g of 3-[5-chloro-2-(2-ethoxy-1-butenyl)-3-benzoxazolio]propanesulfonate and 70 ml of benzyl alcohol were added and stirred at room temperature. After that, 10.1 ml of 1,8-diazabicyclo[5.4.0]-7-undecene was added to the above mixture and stirred at outer temperature of 50° C. for 20 minutes, 1,000 ml of ethyl acetate was then added thereto, a supernatant was removed by decantation to obtain a residue. The residue was dissolved in methanol and refined by Sephadex column chromatography. The refined product was dissolved in 150 ml of methanol, 3 g of potassium acetate was added thereto, after heating under reflux for 10 minutes, the mixture was allowed to be cooled, and the crystals precipitated were filtered out by suction. Methanol (300 ml) was added to the above-obtained powder, and the solution was heated under reflux for 50 minutes, then the solution was concentrated by distilling off 100 ml of the solvent. After cooling, the obtained crystals were recoveredby suction filtration, the filtrate was washed with 50 ml of methanol and dried under reduced pressure, thereby 2.65 g of orange powder of S-96 was obtained. The structure of S-96 was confirmed by $^1$H-NMR, FAB-MS, and elemental analysis. λmax (MeOH)=535 nm ($\epsilon$=8.3×$10^4$)

EXAMPLE 5

Synthesis of Methine Dye S-97

Orange powder of S-97 was synthesized in the same manner as in Example 4 except for using 3-[5-fluoro-2-(2-ethoxy-1-butenyl)-3-benzoxazolio]propanesulfonate in place of 3-[5-chloro-2-(2-ethoxy-1-butenyl)-3-benzoxazolio]propanesulfonate. The structure of S-97 was confirmed by $^1$H-NMR, FAB-MS, and elemental analysis. λmax (MeOH)=534 nm ($\epsilon$=8.2×$10^4$)

EXAMPLE 6

Synthesis of Methine Dye S-122

Synthesis of 2-Acetyl-3-hydroxythiophene

According to the description in *Synth. Commun.*, 1996, 26, 1083, methyl 2-acetyl-3-hydroxythiophene-5-carboxylate was synthesized with chloroacetone, dimethyl acetylene dicarboxylate and sodium hydrosulfide as starting materials (yield: 60%).

The above-obtained methyl 2-acetyl-3-hydroxythiophene-5-carboxylate was hydrolyzed with an aqueous solution of sodium hydroxide, the hydrolyzate was heated with copper-quinoline to be decarboxylated, thereby the objective 2-acetyl-3-hydroxythiophene was obtained (yield: 58%).

Synthesis of 2-Methylthieno[2,3-d]oxazole

According to the description in *Arch. Pharm.*, (Weinheim) 1987, 320, 837, oxime was prepared using 2-acetyl-3-hydroxythiophene and hydroxylamine (yield: 88%), and the oxime was further acetylated with acetic anhydride (yield: 69%). The oxime acetate was subjected to treatment with sodium hydroxide in an N,N-dimethylformamide solvent at room temperature, thereby the objective 2-methylthieno[2,3-d]oxazole was obtained (yield: 57%).

Synthesis of 5-Bromo-2-methylthieno[2,3-d]oxazole

Sodium acetate (1.4 g) and 2 g of 2-methylthieno[2,3-d]oxazole were dissolved in 24 ml of an acetic acid solvent, and a solution comprised of 15.8 ml of bromine and 7.2 ml of acetic acid was dropwise added thereto with stirring at room temperature. After stirring at room temperature for 2.5 hours, the reaction solution was added to 150 ml of water, followedby further stirring at room temperature for 2 hours. The crystals precipitated were recovered by suction filtration, and dried under reduced pressure, thereby 1.7 g of 5-bromo-2-methylthieno[2,3-d]oxazole was obtained as pale yellow powder (yield: 54%).

Synthesis of Methine Dye S-122

5-Bromo-2-methylthieno[2,3-d]oxazole (1.53 g) (7 mmol) and 0.94 g of 1,3-propanesultone (7.7 mmol) were heated at 130° C. with stirring for 6 hours. After cooling the mixture, 3.1 g of 3-[5-chloro-2-(3-sulfopropyl)thio-1-benzothiazolio]propanesulfonate (7 mmol), 5 ml of dimethyl sulfoxide and 5 ml of acetonitrile were added to the above reaction mixture, and 3.9 ml of triethylamine (28 mmol) was added with stirring at 60° C., and stirring was further continued for 1 hour. The solution was concentrated and refined by column chromatography, thereby 0.51 g of the objective Dye S-122 was obtained. Yield: 10%, λmax (MeOH)=428.6 nm.

EXAMPLE 7

Synthesis of Methine Dye S-125

Synthesis of 2-Methylpyrrolo[3,2-d]thiazole

According to the description in *J. Heterocyclic Chem.*, 1979, 16, 1563, 4-chloromethyl-2-methylthiazole was synthesized with 1,3-dichloroacetone and thioacetamide as starting materials. The above-obtained 4-chloromethyl-2-methylthiazole was converted to a 4-hydroxymethyl body by dilute sulfuric acid, and then introduced into a 4-formyl body by oxidation of manganese dioxide (yield to this point: 62%). 5-Ethoxycarbonyl-2-methylpyrrolo[3,2-d]thiazole was obtained by making ethyl azidoacetate act on the above product in the presence of sodium ethoxide and further heating in xylene (yield: 31%).

Subsequently, according to the description in *Synth. Commun.*, 1992, 2077, the above-obtained 5-ethoxycarbonyl-2-methylpyrrolo 3,2-d] thiazole was hydrolyzed with sodium hydroxide, and then heated in diphenylmethane at 230° C.for3.5hours, thereby the objective decarboxylated 2-methyl-pyrrolo[3,2-d]thiazole was obtained (yield: 63%).

Synthesis of Methine Dye S-125

2-Methylpyrrolo[3,2-d]thiazole (0.70 g) (5mmol) and 0.67 g of 1,3-propanesultone (5.5 mmol) were stirred with heating at 130° C. for 6 hours. After cooling, the crystals precipitated were filtered out and washed with acetone, thereby 1.2 g of 3-[2-methyl-1-pyrrolo[3,2-d]thiazolio]propanesulfonate was obtained (yield: 92%). 3-[5- Chloro-2-(3-sulfopropyl)thio-1-benzothiazolio]propanesulfonate (0.45 g) (1 mmol), 2 ml of dimethyl sulfoxide and 2 ml of acetonitrile were added to 0.26 g of the quaternary salt of 3-[2-methyl-1-pyrrolo[3,2-d]thiazolio]propanesulfonate (1 rmmol) and the mixture was stirred at 50° C. with adding 0.56 ml of triethylamine (4 mmol), followed by further stirring for 1 hour. The solution was concentrated, and then refined with column chromatography, thereby 0.10 g of the objective Methine Dye S-125 was obtained. Yield: 15%, ?max (MeOH)=447.5 nm.

EXAMPLE 8

Preparation of Sample No. 101

A multilayer color photographic material was prepared as Sample No. 101 by coating each layer having the following composition on an undercoated cellulose triacetate film support having a thickness of 127 μm. The numeral corresponding to each component indicates the addition weight per m². The functions of the compounds added are not limited to the use described.

First Layer: Antihalation Layer

| | | |
|---|---|---|
| Black Colloidal Silver | silver amount: | 0.28 g |
| Gelatin | | 2.20 g |
| Ultraviolet Absorber U-1 | | 0.27 g |
| Ultraviolet Absorber U-3 | | 0.08 g |
| Ultraviolet Absorber U-4 | | 0.08 g |
| High Boiling Point Organic Solvent Oil-1 | | 0.29 g |
| Coupler C-9 | | 0.12 mg |

Second Layer: Interlayer

| | |
|---|---|
| Gelatin | 0.38 g |
| Compound Cpd-K | 5.0 mg |
| Ultraviolet Absorber U-2 | 3.0 mg |
| High Boiling Point Organic Solvent Oil-3 | 0.06 g |
| Dye D-4 | 10.0 mg |

Third Layer: Interlayer

| | | |
|---|---|---|
| Yellow Colloidal Silver | silver amount: | 0.007 g |
| Gelatin | | 0.40 g |

Fourth Layer:
First Red-Sensitive Emulsion Layer

| | | |
|---|---|---|
| Emulsion A | silver amount: | 0.55 g |
| Emulsion B | silver amount: | 0.23 g |
| Surface Fogged Fine Grain Silver Iodobromide Emulsion (average grain size: 0.11 μm) | silver amount: | 0.07 g |
| Gelatin | | 1.11 g |
| Coupler C-1 | | 0.04 g |
| Coupler C-2 | | 0.09 g |
| Compound Cpd-A | | 1.0 mg |
| Compound Cpd-E | | 0.14 g |
| Compound Cpd-K | | 2.0 mg |
| Compound Cpd-H | | 4.4 mg |
| High Boiling Point Organic Solvent Oil-2 | | 0.09 g |

Fifth Layer:
Second Red-Sensitive Emulsion Layer

| | | |
|---|---|---|
| Emulsion C | silver amount: | 0.14 g |
| Emulsion D | silver amount: | 0.28 g |
| Gelatin | | 0.65 g |
| Coupler C-1 | | 0.05 g |
| Coupler C-2 | | 0.11 g |
| Compound Cpd-E | | 0.10 g |
| High Boiling Point Organic Solvent Oil-2 | | 0.09 g |

Sixth Layer:
Third Red-Sensitive Emulsion Layer

| | | |
|---|---|---|
| Emulsion E | silver amount: | 0.50 g |
| Gelatin | | 1.56 g |
| Coupler C-3 | | 0.63 g |
| Compound Cpd-E | | 0.11 g |
| Additive P-1 | | 0.16 g |
| High Boiling Point Organic Solvent Oil-2 | | 0.04 g |

Seventh Layer: Interlayer

| | |
|---|---|
| Gelatin | 0.50 g |
| Compound Cpd-D | 0.04 g |
| High Boiling Point Organic Solvent Oil-3 | 0.08 g |

Eighth Layer: Interlayer

| | | |
|---|---|---|
| Yellow Colloidal Silver | silver amount: | 0.01 g |
| Gelatin | | 1.56 g |
| Compound Cpd-A | | 0.12 g |
| Compound Cpd-I | | 0.04 mg |
| Compound Cpd-J | | 0.07 g |
| High Boiling Point Organic Solvent Oil-3 | | 0.15 g |

Ninth Layer:
First Green-Sensitive Emulsion Layer

| | | |
|---|---|---|
| Emulsion F | silver amount: | 0.42 g |
| Emulsion G | silver amount: | 0.38 g |
| Emulsion H | silver amount: | 0.32 g |
| Surface Fogged Core/Shell Type | silver amount: | 0.08 g |

-continued

| | | |
|---|---|---|
| Fine Grain Silver Bromide Emulsion (average grain size: 0.11 μm) | | |
| Gelatin | | 1.53 g |
| Coupler C-7 | | 0.07 g |
| Coupler C-8 | | 0.17 g |
| Compound Cpd-B | | 0.30 mg |
| Compound Cpd-C | | 2.00 mg |
| Compound Cpd-K | | 3.0 mg |
| Polymer Latex P-2 | | 0.02 g |
| High Boiling Point Organic Solvent Oil-2 | | 0.10 g |
| Tenth Layer: | | |
| Second Green-Sensitive Emulsion Layer | | |
| Emulsion I | silver amount: | 0.16 g |
| Emulsion J | silver amount: | 0.34 g |
| Gelatin | | 0.75 g |
| Coupler C-4 | | 0.20 g |
| Compound Cpd-B | | 0.03 g |
| Polymer Latex P-2 | | 0.01 g |
| High Boiling Point Organic Solvent Oil-2 | | 0.01 g |
| Eleventh Layer: | | |
| Third Green-Sensitive Emulsion Layer | | |
| Emulsion K | silver amount: | 0.44 g |
| Gelatin | | 0.91 g |
| Coupler C-4 | | 0.34 g |
| Compound Cpd-B | | 0.06 g |
| Polymer Latex P-2 | | 0.01 g |
| High Boiling Point Organic Solvent Oil-2 | | 0.02 g |
| Twelfth Layer: Yellow Filter Layer | | |
| Yellow Colloidal Silver | silver amount: | 0.02 g |
| Gelatin | | 0.73 g |
| Microcrystal Dispersion of Dye E-1 | | 0.24 g |
| Compound Cpd-G | | 0.02 g |
| Compound Cpd-J | | 0.04 g |
| High Boiling Point Organic Solvent Oil-3 | | 0.08 g |
| Polymer M-1 | | 0.23 g |
| Thirteenth Layer: | | |
| First Blue-Sensitive Emulsion Layer | | |
| Emulsion L | silver amount: | 0.35 g |
| Gelatin | | 0.55 g |
| Coupler C-5 | | 0.20 g |
| Coupler C-6 | | 4.00 g |
| Coupler C-10 | | 0.02 g |
| Compound Cpd-E | | 0.07 g |
| Compound Cpd-K | | 0.03 mg |
| Fourteenth Layer: | | |
| Second Blue-Sensitive Emulsion Layer | | |
| Emulsion M | silver amount: | 0.06 g |
| Emulsion N | silver amount: | 0.10 g |
| Gelatin | | 0.75 g |
| Coupler C-5 | | 0.35 g |
| Coupler C-6 | | 5.00 g |
| Coupler C-10 | | 0.30 g |
| Compound Cpd-E | | 0.04 g |
| Fifteenth Layer: | | |
| Third Blue-Sensitive Emulsion Layer | | |
| Emulsion O | silver amount: | 0.20 g |
| Emulsion P | silver amount: | 0.02 g |
| Gelatin | | 2.40 g |
| Coupler C-6 | | 0.09 g |
| Coupler C-10 | | 0.90 g |
| Compound Cpd-E | | 0.09 g |
| Compound Cpd-M | | 0.05 mg |
| High Boiling Point Organic Solvent Oil-2 | | 0.40 g |
| Additive P-2 | | 0.10 g |
| Sixteenth Layer: First Protective Layer | | |
| Gelatin | | 1.30 g |
| Ultraviolet Absorber U-1 | | 0.10 g |
| Ultraviolet Absorber U-2 | | 0.03 g |
| Ultraviolet Absorber U-5 | | 0.20 g |
| Compound Cpd-F | | 0.40 g |
| Compound Cpd-J | | 0.06 g |
| Dye D-1 | | 0.01 g |
| Dye D-2 | | 0.01 g |
| Dye D-3 | | 0.01 g |
| Dye D-5 | | 0.01 g |
| High Boiling Point Organic Solvent Oil-2 | | 0.37 g |
| Seventeenth Layer: | | |
| Second Protective Layer | | |
| Fine Grain Silver Iodobromide Emulsion (average grain size: 0.06 μm, AgI content: 1 mol %) | silver amount: | 0.05 g |
| Gelatin | | 1.80 g |
| Compound Cpd-L | | 0.8 mg |
| Polymethyl Methacrylate (average particle size: 1.5 μm) | | 5.00 g |
| Copolymer of Methyl Methacrylate/ Methacrylic Acid in Proportion of 6/4 (average particle size: 1.5 μm) | | 0.10 g |
| Silicone Oil SO-1 | | 0.030 g |
| Surfactant W-2 | | 0.030 g |

Additives F-1 to F-11 were further added to every emulsion layer in addition to the above components. Moreover, Gelatin Hardener H-i and Surfactants W-1, W-3, W-4, W-5 and W-6 for coating and emulsifying were added to every layer in addition to the above components.

In addition, phenol, 1,2-benzisothiazolin-3-one, 2-phenoxyethanol, phenethyl alcohol, and p-hydroxybenzoic acid butyl ester were added as antibacterial and antifungal agents. Photosensitive emulsions used in Sample No. 101 are shown in Table 1 below.

TABLE 1

| Emulsion | Equivalent-Sphere Diameter (μm) | Variation Coefficient of Equivalent-Circle Diameter (%) | Average Aspect Ratio of Entire Grains | Iodide Content (mol %) | Sensitizing Dye Kind | Sensitizing Dye Addition Amount ($\times 10^{-4}$ mol/mol-Ag) | Sensitizing Dye Kind | Sensitizing Dye Addition Amount ($\times 10^{-4}$ mol/mol-Ag) | Sensitizing Dye Kind | Sensitizing Dye Addition Amount ($\times 10^{-4}$ mol/mol-Ag) |
|---|---|---|---|---|---|---|---|---|---|---|
| A | 0.20 | 16 | 1.6 | 4.0 | Sen-1 | 8.1 | | | Sen-3 | 0.3 |
| B | 0.25 | 15 | 3.0 | 4.0 | Sen-1 | 8.9 | | | Sen-3 | 0.3 |
| C | 0.22 | 14 | 2.5 | 4.0 | Sen-1 | 8.8 | Sen-2 | 0.2 | Sen-3 | 0.2 |
| D | 0.35 | 10 | 3.6 | 4.0 | Sen-1 | 9.8 | Sen-2 | 0.3 | Sen-3 | 0.2 |
| E | 0.49 | 16 | 5.0 | 2.0 | Sen-1 | 6.7 | Sen-2 | 0.5 | Sen-3 | 0.2 |
| F | 0.15 | 15 | 1.0 | 3.5 | Sen-4 | 15.1 | Sen-5 | 1.5 | | |
| G | 0.23 | 14 | 1.9 | 3.5 | Sen-4 | 10.4 | Sen-5 | 2.0 | | |

TABLE 1-continued

| Emulsion | Equivalent-Sphere Diameter (μm) | Variation Coefficient of Equivalent-Circle Diameter (%) | Average Aspect Ratio of Entire Grains | Iodide Content (mol %) | Sensitizing Dye Kind | Addition Amount ($\times 10^{-4}$ mol/mol-Ag) | Sensitizing Dye Kind | Addition Amount ($\times 10^{-4}$ mol/mol-Ag) | Sensitizing Dye Kind | Addition Amount ($\times 10^{-4}$ mol/mol-Ag) |
|---|---|---|---|---|---|---|---|---|---|---|
| H | 0.32 | 11 | 2.4 | 3.5 | Sen-4 | 7.5 | Sen-5 | 1.4 | | |
| I | 0.28 | 11 | 4.5 | 3.3 | Sen-4 | 7.7 | Sen-5 | 1.4 | | |
| J | 0.40 | 16 | 4.0 | 3.3 | Sen-4 | 7.2 | Sen-5 | 1.4 | | |
| K | 0.59 | 20 | 5.9 | 2.8 | Sen-4 | 6.4 | Sen-5 | 1.2 | | |
| L | 0.24 | 14 | 3.4 | 4.6 | Sen-6 | 6.5 | Sen-7 | 2.5 | | |
| M | 0.30 | 10 | 3.0 | 4.6 | Sen-6 | 6.2 | Sen-7 | 2.0 | | |
| N | 0.40 | 9 | 4.5 | 1.6 | Sen-6 | 5.6 | Sen-7 | 1.8 | | |
| O | 0.60 | 15 | 5.5 | 1.0 | Sen-6 | 4 | Sen-7 | 1.5 | | |
| P | 0.80 | 18 | 2.5 | 1.0 | Sen-6 | 3.4 | Sen-7 | 1.1 | | |

Note 1) All of the above emulsions were silver iodobromide emulsions chemically sensitized using gold, sulfur and selenium.
Note 2) All of the above emulsions were added with sensitizing dyes before chemical sensitization.
Note 3) Appropriate amounts of Compounds F-5, F-7, F-8, F-9, F-10, F-11, F-12, F-13, F-14 and F-15 were respectively added to the above emulsions.
Note 4) Emulsions A, B, I and J comprise triple structure tabular grains having main planes comprising {100} faces and other emulsions comprise triple structure tabular grains having main planes comprising {111} faces.
Note 5) Emulsions A, B, E, F, I and P are emulsions whose internal sensitivity is higher than surface sensitivity.
Note 6) Emulsions E, I and P are emulsions comprising silver chloride grains epitaxially grown after chemical sensitization.
Note 7) Emulsions other than A, E and F comprise grains having 50 or more dislocation lines per one grain observed by a transmission electron microscope.

Preparation of Dispersion of Organic Solid Dispersion Dye

Dye E-1 shown below was dispersed according to the following method. That is, water and 70 g of W-4 were added to 1,400 g of a wet cake of the dye containing 30% of water, and the mixture was stirred to obtain a slurry having 30% dye concentration. Next, 1,700 ml of zirconia beads having an average diameter of 0.5 mm was filled in an ultravisco mill (UVM-2) manufactured by Imex Co., the slurry was passed and pulverized at a peripheral speed of about 10 m/sec and discharge amount of 0.5 l/min for 8 hours. Beads were removed by filtration and the resulting dispersion was heated at 90° C. for 10 hours for stabilization, then water and gelatin were added thereto to dilute the dispersion to dye concentration of 3%. The average grain size of the obtained fine grains of the dye was 0.4 μm and the extent of distribution of grain sizes [(standard deviation of grain sizes)/(average grain size)×100] was 18%.

Preparation of Sample Nos. 100, 102 to 130

Sample Nos. 102 to 130 were prepared in the same manner as in the preparation of Sample No. 101 except that Sensitizing Dye Sen-2 or Sen-7 in the emulsions used in Sample No. 101 were replaced in equimolar amount as shown in Tables 2 and 3. Sample No. 100 (i.e., blank sample) was prepared by excluding Sen-2 and Sen-7. Each of the thus-obtained samples was subjected to 20 CMS white light exposure for 1/100 sec. through a gray wedge.

The exposed sample was processed according to the processing step shown below and sensitometry was carried out. Further, residual colors were evaluated by subtracting the yellow stain density and magenta stain density of Sample No. 100, a dye-blank sample, from the yellow stain density and magenta stain density of each processed sample. The stain density was measured with densitometer Status A manufactured by X-RITE Co., Ltd.

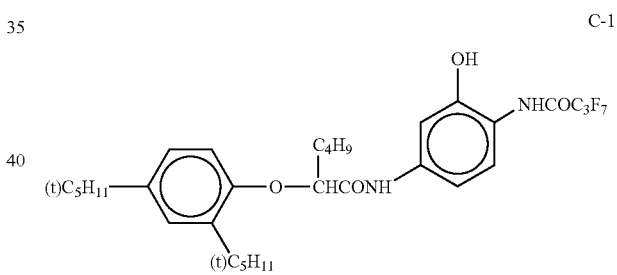

C-1

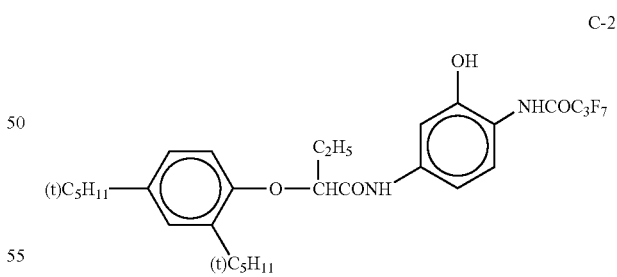

C-2

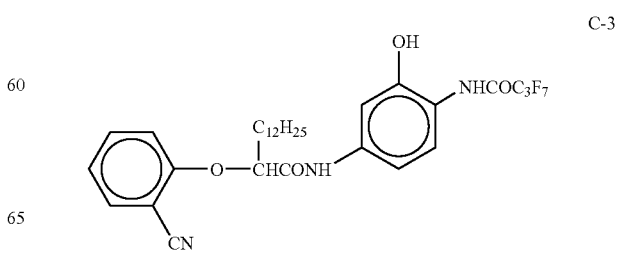

C-3

-continued
C-4
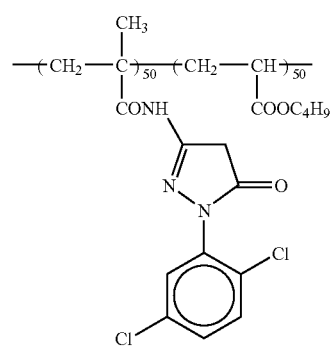
numerals indicate weight percentage
average molecular weight: about 25,000
C-5
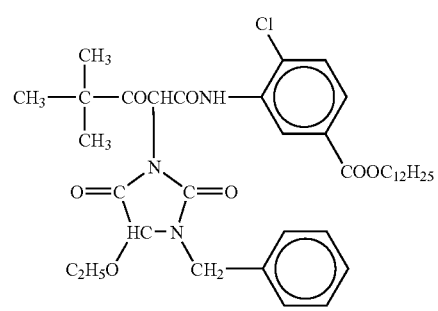
C-6
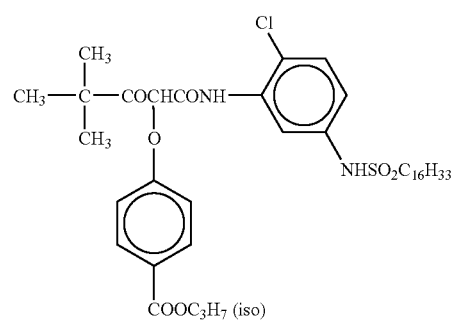
C-7
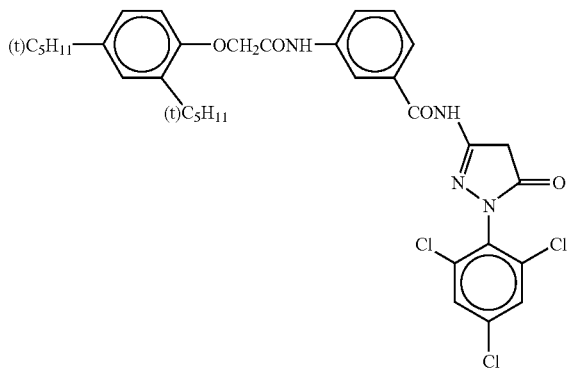
-continued
C-8
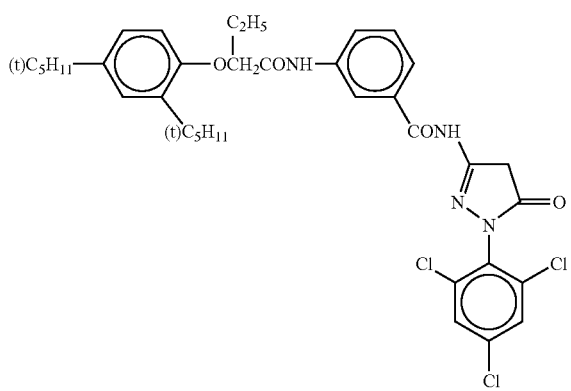
C-9
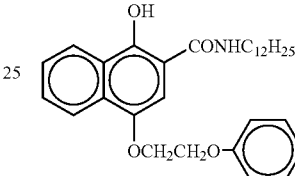
C-10
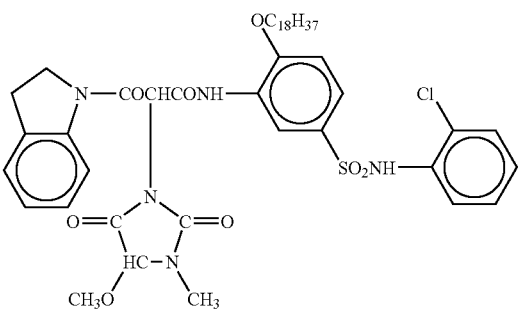
Dibutyl Phthalate — Oil-1
Tricresyl Phosphate — Oil-2
Oil-3
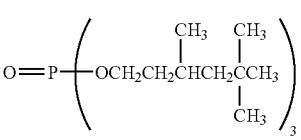
Cpd-A
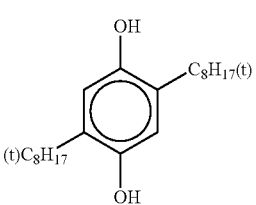

-continued
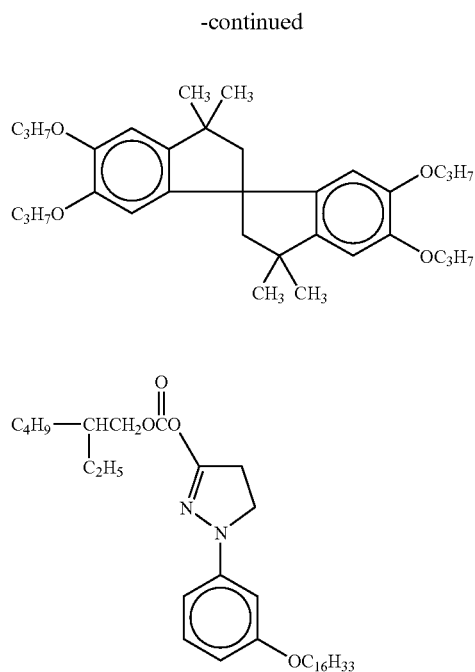
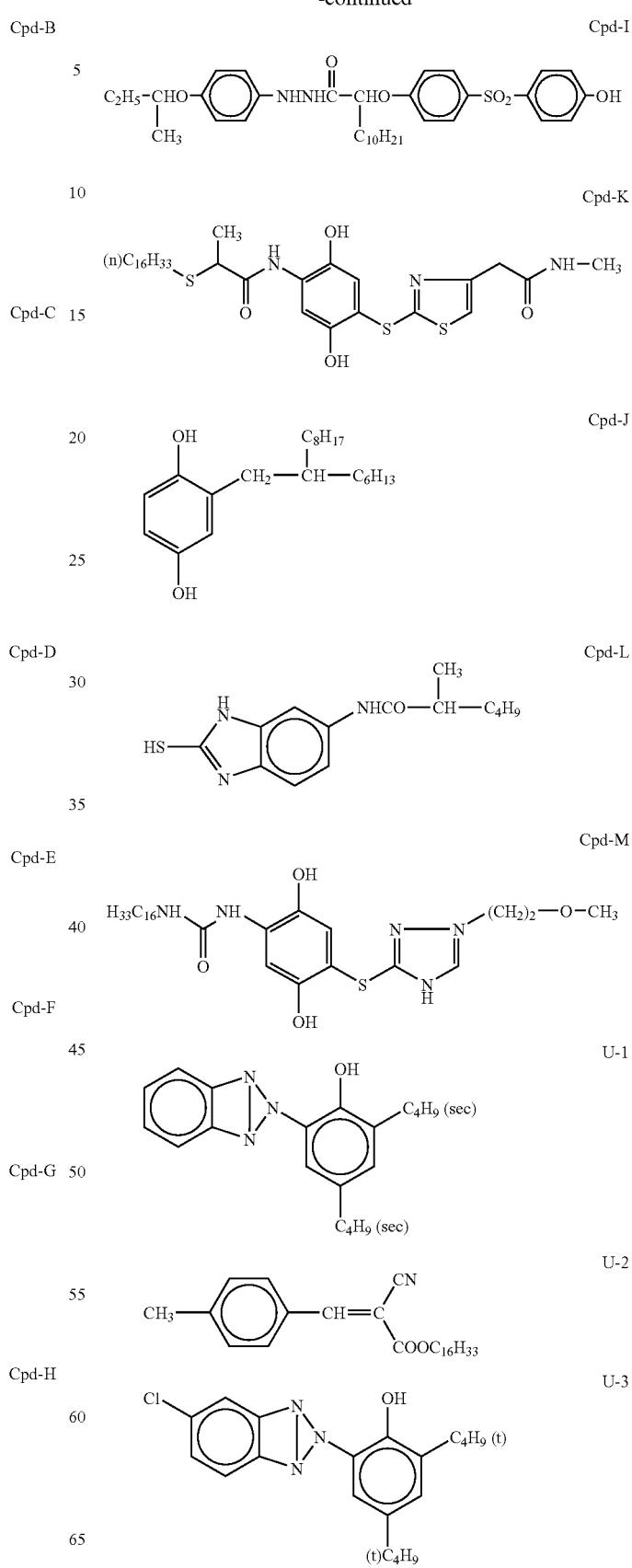

-continued
U-4
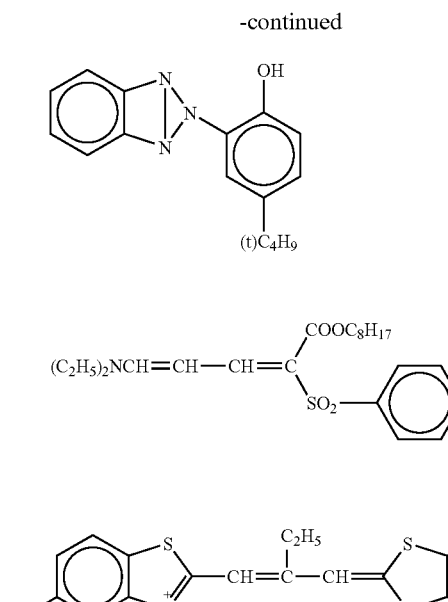
U-5
Sen-1
Sen-2
Sen-3
Sen-4
Sen-5
Sen-6
-continued
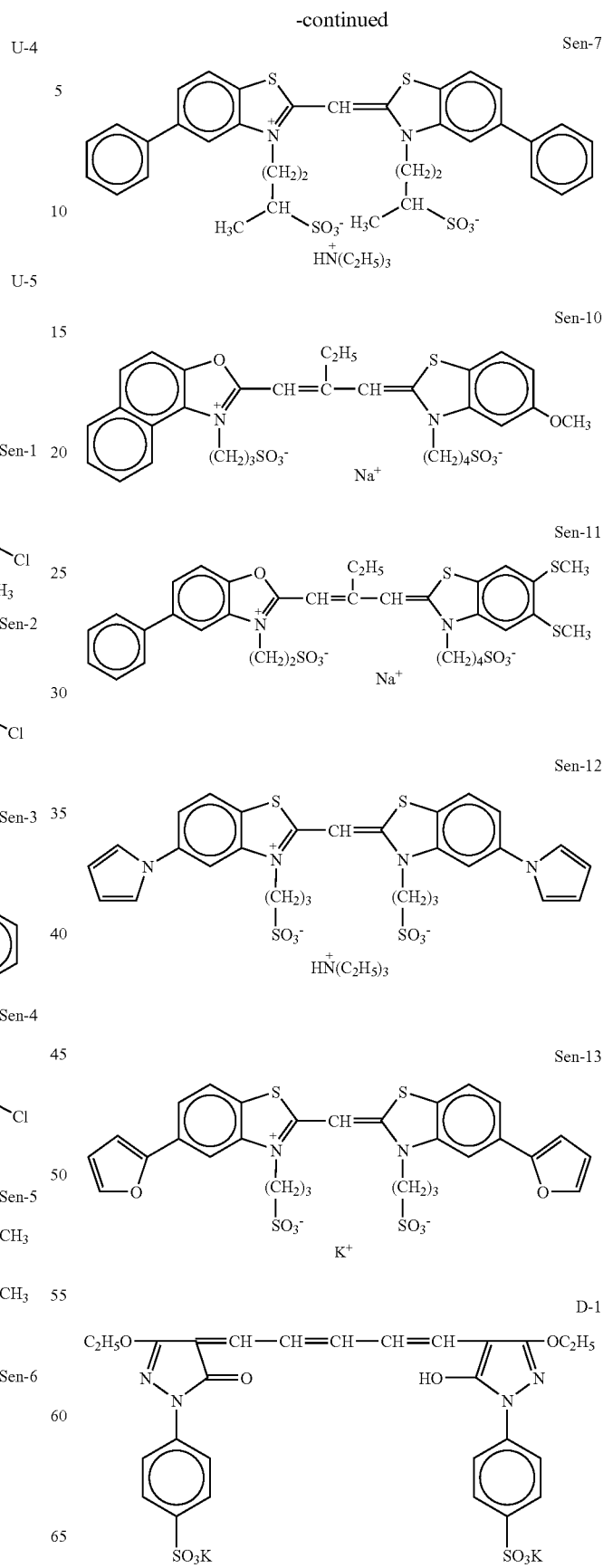

-continued

D-2

Structure: Bis-pyrazolone dye with KOOC and COOK groups, connected by -CH=CH-CH= bridge, with phenyl-SO₃K substituents.

D-3

Structure: NaO₃S-phenyl-N=N-pyrazole-COONa with HO, and phenyl-SO₃Na substituent.

D-4

Structure: Naphthoquinone imine dye with CONH(CH₂)₃O-phenyl-(C₅H₁₁(t))₂ group, CH₃, and N(C₂H₅)₂ substituents.

D-5

Structure: Bis-pyrazolone dye with C₂H₅OOC and COOC₂H₅ groups, connected by -CH=CH-CH=CH-CH= bridge, with phenyl-SO₃K substituents.

E-1

Structure: Pyrazolone-indole compound with CH₃, phenyl-COOH, and CH(CH₃)COOCH₃ substituents.

H-1

$$CH_2=CH-SO_2-CH_2-CONH-CH_2$$
$$CH_2=CH-SO_2-CH_2-CONH-CH_2$$

W-1

$$H_{25}C_{12}-O-SO_3H \cdot Na$$

W-2

$$C_8F_{17}SO_2NCH_2COOK$$
$$\quad\quad\quad\quad |$$
$$\quad\quad\quad\quad C_3H_7$$

W-3

$$\quad\quad\quad CH_2COOCH_2CH(C_2H_5)C_4H_9$$
$$\quad\quad\quad |$$
$$NaO_3S-CHCOOCH_2CH(C_2H_5)C_4H_9$$

W-4

$$C_8H_{17}-\text{phenyl}-(OCH_2CH_2)_3-SO_3Na$$

W-5

Structure: Naphthalene with C₃H₇ groups at 1,4,5,8 positions and SO₃Na.

W-6

$$C_{12}H_{25}-\text{phenyl}-SO_3Na$$

P-1

$$-(CH_2-CH)_n-$$
$$\quad\quad\quad |$$
$$\quad\quad CONHC_4H_9(t)$$

M-1

$$-(CH_2-CH)_n-$$
$$\quad\quad\quad |$$
$$\quad\quad COOC_4H_9$$

SO-1

$$(CH_3)_3SiO-(Si(CH_3)_2-O)_{29}-(Si(CH_3)(CH_2CH(CH_3)C_6H_5)-O)_{46}-Si(CH_3)_3$$

P-2

Polybutyl acrylate/acrylic acid copolymer in proportion of 95/5

F-1

Structure: 5-methyl-7-hydroxy-[1,2,4]triazolo[1,5-a]pyrimidine

F-2

Structure: Triazine with NH-(CH₂)₃-NH linking group, NHCH₂CH₂OH, and CH₃ substituents; ·HNO₃; (n = 3~4)

F-3

Structure: 1,3,4-thiadiazole with HS and SCH₃ substituents.

-continued

F-4 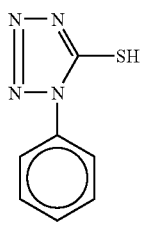

F-5 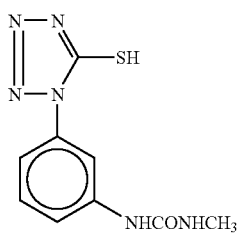

F-6 

F-7 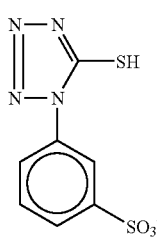

F-8 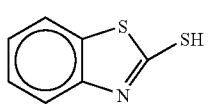

F-9 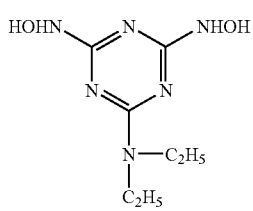

F-10 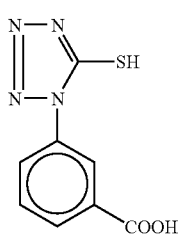

F-11 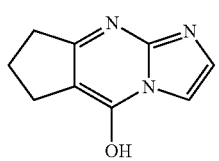

-continued

F-12 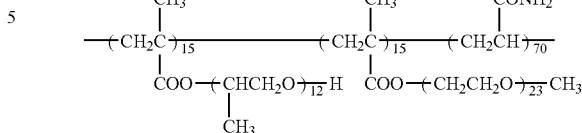

F-13 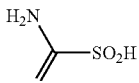

F-14 K$_2$IrCl$_6$

Processing

| Processing Step | Processing Time (min) | Processing Temperature (° C.) | Tank Capacity (liter) | Replenishing Rate (ml/m$^2$) |
|---|---|---|---|---|
| First Development | 6 | 38 | 12 | 2,200 |
| First Washing | 2 | 38 | 4 | 7,500 |
| Reversal | 2 | 38 | 4 | 1,100 |
| Color Development | 6 | 38 | 12 | 2,200 |
| Pre-bleaching | 2 | 38 | 4 | 1,100 |
| Bleaching | 6 | 38 | 2 | 220 |
| Fixing | 4 | 38 | 8 | 1,100 |
| Second Washing | 4 | 38 | 8 | 7,500 |
| Final Rinsing | 1 | 25 | 2 | 1,100 |

The composition of each processing solution used was as follows.

| First Developing Solution | Tank Solution | Replenisher |
|---|---|---|
| Pentasodium Nitrilo-N,N,N-trimethylenephosphonate | 1.5 g | 1.5 g |
| Pentasodium Diethylene-triaminepentaacetate | 2.0 g | 2.0 g |
| Sodium Sulfite | 30 g | 30 g |
| Potassium Hydroquinone-monosulfonate | 20 g | 20 g |
| Potassium Carbonate | 15 g | 20 g |
| Sodium Bicarbonate | 12 g | 15 g |
| 1-Phenyl-4-methyl-4-hydroxymethyl-3-pyrazolidone | 1.5 g | 2.0 g |
| Potassium Bromide | 2.5 g | 1.4 g |
| Potassium Thiocyanate | 1.2 g | 1.2 g |
| Potassium Iodide | 2.0 mg | — |
| Diethylene Glycol | 13 g | 15 g |
| Water to make | 1,000 ml | 1,000 ml |
| pH (adjusted with sulfuric acid or potassium hydroxide) | 9.60 | 9.60 |

| Reversal Solution | Tank Solution | Replenisher |
|---|---|---|
| Pentasodium Nitrilo-N,N,N-trimethylenephosphonate | 3.0 g | same as the tank solution |
| Stannous Chloride Dihydrate | 1.0 g | |
| p-Aminophenol | 0.1 g | |
| Sodium Hydroxide | 8 g | |
| Glacial Acetic Acid | 15 ml | |
| Water to make | 1,000 ml | |
| pH (adjusted with acetic acid or sodium hydroxide) | 6.00 | |

| Color Developing Solution | Tank Solution | Replenisher |
|---|---|---|
| Pentasodium Nitrilo-N,N,N-trimethylenephosphonate | 2.0 g | 2.0 g |
| Sodium Sulfite | 7.0 g | 7.0 g |
| Trisodium Phosphate Dodecahydrate | 36 g | 36 g |
| Potassium Bromide | 1.0 g | — |
| Potassium Iodide | 90 mg | — |
| Sodium Hydroxide | 3.0 g | 3.0 g |
| Citrazinic Acid | 1.5 g | 1.5 g |
| N-Ethyl-N-(β-methanesulfon-amidoethyl)-3-methyl-4-aminoaniline•Sesquisulfate•Monohydrate | 11 g | 11 g |
| 3,6-Dithiaoctane-1,8-diol | 1.0 g | 1.0 g |
| Water to make | 1,000 ml | 1,000 ml |
| pH (adjusted with sulfuric acid or potassium hydroxide) | 11.80 | 12.00 |

| Pre-bleaching Solution | Tank Solution | Replenisher |
|---|---|---|
| Disodium Ethylenediamine-tetraacetate Dihydrate | 8.0 g | 8.0 g |
| Sodium Sulfite | 6.0 g | 8.0 g |
| 1-Thioglycerol | 0.4 g | 0.4 g |
| Sodium Bisulfite Addition Product of Formaldehyde | 30 g | 35 g |
| Water to make | 1,000 ml | 1,000 ml |
| pH (adjusted with acetic acid or sodium hydroxide) | 6.30 | 6.10 |

| Bleaching Solution | Tank Solution | Replenisher |
|---|---|---|
| Disodium Ethylenediamine-tetraacetate Dihydrate | 2.0 g | 4.0 g |
| Ammonium Ethylenediamine-tetraacetato Ferrate (III) Dihydrate | 120 g | 240 g |
| Potassium Bromide | 100 g | 200 g |
| Ammonium Nitrate | 10 g | 20 g |
| Water to make | 1,000 ml | 1,000 ml |
| pH (adjusted with nitric acid or sodium hydroxide) | 5.70 | 5.50 |

| Fixing Solution | Tank Solution | Replenisher |
|---|---|---|
| Ammonium Thiosulfate | 80 g | same as the tank solution |
| Sodium Sulfite | 5.0 g | same as the tank solution |
| Sodium Bisulfite | 5.0 g | same as the tank solution |
| Water to make | 1,000 ml | same as the tank solution |
| pH (adjusted with acetic acid or aqueous ammonia) | 6.60 | |

| Stabilizing Solution | Tank Solution | Replenisher |
|---|---|---|
| 1,2-Benzisothiazolin-3-one | 0.02 g | 0.03 g |
| Polyoxyethylene-p-monononyl-phenyl Ether (average polymerization degree: 10) | 0.3 g | 0.3 g |
| Polymaleic Acid (average molecular weight: 2,000) | 0.1 g | 0.15 g |
| Water to make | 1,000 ml | 1,000 ml |
| pH | 7.0 | 7.0 |

The results of sensitometry and evaluation of residual colors are shown in the following Tables 2 and 3. Relative sensitivities of the blue-sensitive layer and the red-sensitive layer were compared based on the relative exposure amount giving density of minimum density plus 1.0.

TABLE 2

| Sample No. | Replacement of Sensitizing Dye Sen-7 in Emulsions L to P | Relative Sensitivity of Blue-Sensitive Layer | Yellow Stain Density |
|---|---|---|---|
| 100 (blank) | None | — | 0 (control) |
| 101 (comparison) | Sen-7 | 100 (control) | 0.073 |
| 102 (comparison) | Comparative Dye Sen-12 | 92 | 0.055 |
| 103 (comparison) | Comparative Dye Sen-13 | 109 | 0.088 |
| 104 (invention) | S-1 | 113 | 0.017 |
| 105 (invention) | S-2 | 114 | 0.028 |
| 106 (invention) | S-3 | 115 | 0.025 |
| 107 (invention) | S-5 | 115 | 0.015 |
| 108 (invention) | S-6 | 112 | 0.018 |
| 109 (invention) | S-7 | 116 | 0.012 |
| 110 (invention) | S-10 | 125 | 0.034 |
| 111 (invention) | S-15 | 111 | 0.020 |
| 112 (invention) | S-64 | 119 | 0.015 |
| 113 (invention) | S-66 | 124 | 0.012 |
| 114 (invention) | S-76 | 142 | 0.0260 |
| 115 (invention) | S-78 | 133 | 0.018 |
| 116 (invention) | S-79 | 135 | 0.019 |
| 117 (invention) | S-80 | 140 | 0.022 |
| 118 (invention) | S-81 | 123 | 0.013 |
| 119 (invention) | S-84 | 127 | 0.016 |
| 120 (invention) | S-85 | 125 | 0.017 |

TABLE 3

| Sample No. | Replacement of Sensitizing Dye Sen-2 in Emulsions C to F | Relative Sensitivity of Red-Sensitive Layer | Magenta Stain Density |
|---|---|---|---|
| 100 (blank) | None | — | 0 (control) |
| 101 (comparison) | Sen-2 | 100 (control) | 0.085 |
| 121 (comparison) | Comparative Dye Sen-10 | 92 | 0.067 |
| 122 (comparison) | Comparative Dye Sen-11 | 83 | 0.044 |
| 123 (invention) | S-31 | 118 | 0.031 |
| 124 (invention) | S-39 | 106 | 0.026 |
| 125 (invention) | S-65 | 117 | 0.030 |
| 126 (invention) | S-69 | 112 | 0.020 |
| 127 (invention) | S-87 | 110 | 0.026 |
| 128 (invention) | S-88 | 125 | 0.028 |
| 129 (invention) | S-89 | 115 | 0.021 |
| 130 (invention) | S-90 | 121 | 0.016 |

As is apparent from the results in Tables 2 and 3, photographic materials showing less residual colors and having high sensitivity can be obtained by using the compounds and emulsions according to the present invention. Above all, excellent effect can be obtained when the methine dyes represented by formula (VII) or (VIII) are used. Thus, it is apparent that high sensitivity and less residual colors are compatible for the first time by using the constitution according to the present invention.

EXAMPLE 9

Preparation of Seed Emulsion a

An aqueous solution (1,164 ml) comprised of 0.017 g of KBr and 0.4 g of oxidation-processed gelatin having an average molecular weight of 20,000 was stirred with maintaining the temperature at 35° C. An aqueous solution containing 1.6 g of $AgNO_3$, an aqueous solution of KBr and an aqueous solution containing 2.1 g of oxidation-processed gelatin having an average molecular weight of 20,000 were added to the above solution by a triple jet method over 48 seconds. At this time, the silver potential was maintained at 13 mV to the saturated calomel electrode. An aqueous solution of KBr was added thereto, and the silver potential was adjusted to −66 mV, and the temperature was raised to 60° C. After 21 g of succinated gelatin having an average molecular weight of 100,000 was added to the above solution, an aqueous solution containing 5.1 g of NaCl was added. An aqueous solution containing 206.3 g of $AgNO_3$ and an aqueous solution containing KBr were added thereto by a double jet method over 61 minutes with accelerating the flow rate. At this time, the silver potential was maintained at −44 mV to the saturated calomel electrode. After desalting, succinated gelatin having an average molecular weight of 100,000 was added to the solution to adjust pH to 5.8 and pAg to 8.8 at 40° C., thus a seed emulsion was obtained. The seed emulsion was tabular grain emulsion containing 1 mol of Ag and 80 g of gelatin per kg of the emulsion, and having an average equivalent-circle diameter of 1.46 μm, an equivalent-circle diametyer variation coefficient of 28%, an average thickness of 0.046 μm, and an average aspect ratio of 32.

Formation of Core

An aqueous solution (1,200 ml) comprised of 134 g of the above-prepared Seed Emulsion a, 1.9 g of KBr and 22 g of succinated gelatin having an average molecular weight of 100,000 was stirred with maintaining the temperature at 75° C. An aqueous solution containing 43.9 g of $AgNO_3$, an aqueous solution containing KBr, and an aqueous solution containing gelatin having a molecular weight of 20,000 were mixed just before addition in another chamber equipped with a magnetic coupling induction stirrer disclosed in JP-A-10-43570, and added to the above emulsion over 25 minutes. At this time, the silver potential was maintained at −40 mV to the saturated calomel electrode.

Formation of First Shell

After the formation of the above core grains, an aqueous solution containing 43.9 g of $AgNO_3$, an aqueous solution containing KBr, and an aqueous solution containing gelatin having a molecular weight of 20,000 were mixed just before addition in the same another chamber, and added to the above emulsion over 20 minutes. At this time, the silver potential was maintained at −40 mV to the saturated calomel electrode.

Formation of Second Shell

After the formation of the above first shell, an aqueous solution containing 42.6 g of $AgNO_3$, an aqueous solution containing KBr, and an aqueous solution containing gelatin having a molecular weight of 20,000 were mixed just before addition in the same another chamber, and added to the above emulsion over 17 minutes. At this time, the silver potential was maintained at −20 mV to the saturated calomel electrode, and then the temperature was lowered to 55° C.

Formation of Third Shell

After the formation of the above second shell, the silver potential was adjusted to −55 mV, and an aqueous solution containing 7.1 g of $AgNO_3$, an aqueous solution containing 6.9 g of KI, and an aqueous solution containing gelatin having a molecular weight of 20,000 were mixed just before addition in the same another chamber, and added to the above emulsion over 5 minutes.

Formation of Fourth Shell

After the formation of the above third shell, an aqueous solution containing 66.4 g of $AgNO_3$ and an aqueous solution containing KBr were added to the above emulsion by a double jet method over 30 minutes at constant flow rate. Potassium iridium hexachloride and yellow prussiate of potash were added en route. At this time, the silver potential was maintained at 30 mV to the saturated calomel electrode. The emulsion was subjected to ordinary washing, and then gelatin was added to adjust pH to 5.8 and pAg to 8.8 at 40° C. The thus-obtained emulsion was designated Emulsion b. Emulsion b was a tabular grain emulsion having an average equivalent-circle diameter of 3.3 μm, an equivalent-circle diameter variation coefficient of 21%, an average thickness of 0.090 μm and an average aspect ratio of 37. Tabular grains having an equivalent-circle diameter of 3.3 μm or more and a thickness of 0.090 μm or less accounted for 70% or more of the entire projected area of Emulsion b.

Emulsion b was heated at 56° C., and after the sensitizing dye shown in Table 4 was added in an amount of $1.1 \times 10^{-3}$ mol/mol Ag, C-5, potassium thiocyanate, chloroauric acid, sodium thiosulfate and N,N-dimethylselenourea were added and the emulsion was optimally chemically sensitized, and stirred for 60 minutes.

The sensitizing dye was used as the solid fine particle dispersion prepared according to the method disclosed in JP-A-11-52507. That is, 0.8 weight parts of sodium nitrate and 3.2 weight parts of sodium sulfate were dissolved in 43 parts of ion exchange water, 13 weight parts of the sensitizing dye was added to the above solution, and dispersed by means of dissolver blades at 2,000 rpm for 20 minutes on the condition of 60° C., thereby a solid dispersion of the sensitizing dye was obtained.

Preparation of Coated Sample

On a triacetyl cellulose film support having an undercoat layer, the emulsion layer and the protective layer as shown in Table 4 below were coated, and Sample Nos. 201 to 214 shown in Table 5 were prepared.

TABLE 4

| Coating Condition of Emulsion | |
|---|---|
| (1) Emulsion Layer | |
| Emulsion b (used dye are shown in Table 5 below) | $2.1 \times 10^{-2}$ mol/m$^2$ (silver amount) |
| Coupler A, B or C shown below | $1.5 \times 10^{-3}$ mol/m$^2$ |
| Tricresyl phosphate | 1.10 g/m$^2$ |
| Gelatin | 2.30 g/m$^2$ |

TABLE 4-continued

Coating Condition of Emulsion (2) Protective Layer

| | |
|---|---|
| Gelatin | 1.80 g/m² |
| 2,4-Dichloro-6-hydroxy-s-triazine sodium salt | 0.08 g/m² |

Coupler A

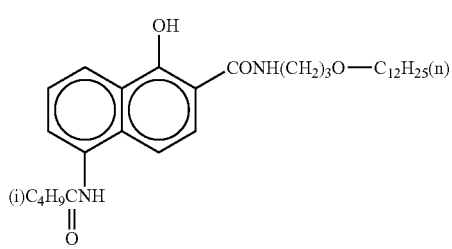

Coupler B

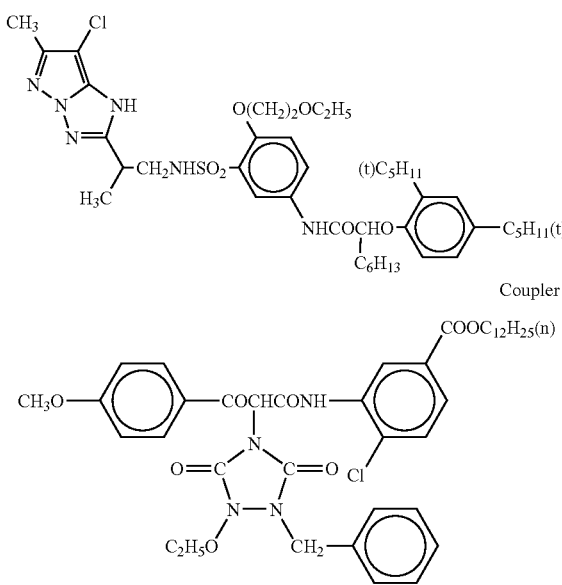

C-5

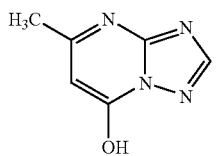

Sen-14

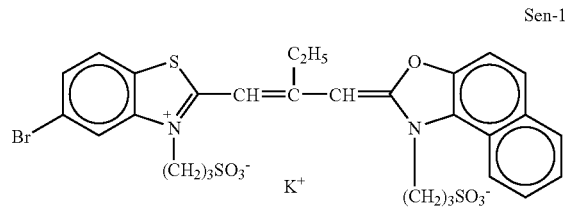

Sen-15

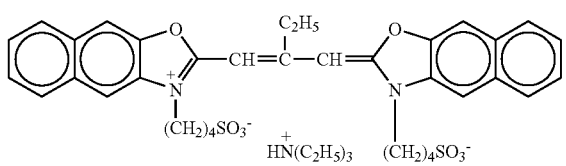

Sen-16

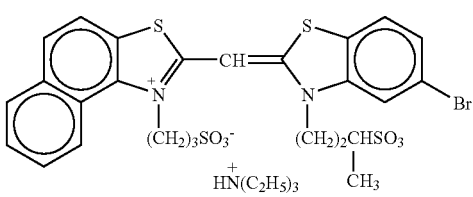

Samples shown in Table 5 were subjected to sensitometric exposure for 1/100 sec. and to the following development process.

| Processing Step | | | | |
|---|---|---|---|---|
| Processing Step | Processing Time | Temperature (° C.) | Replenishment Rate* (ml) | Tank Capacity (liter) |
| Color Development | 2 min 45 sec | 38 | 33 | 20 |
| Bleaching | 6 min 30 sec | 38 | 25 | 40 |
| Washing | 2 min 10 sec | 24 | 1,200 | 20 |
| Fixing | 4 min 20 sec | 38 | 25 | 30 |
| Washing (1) | 1 min 05 sec | 24 | countercurrent system from (2) to (1) | 10 |
| Washing (2) | 1 min 00 sec | 24 | 1,200 | 10 |
| Stabilization | 1 min 05 sec | 38 | 25 | 10 |
| Drying | 4 min 20 sec | 55 | | |

Replenishment rate: per 1 meter of 35 mm wide

The composition of each processing solution is described below.

| Color Developing Solution | | |
|---|---|---|
| | Mother Solution (g) | Replenisher (g) |
| Diethylenetriaminepentaacetic Acid | 1.0 | 1.1 |
| 1-Hydroxyethylidene-1,1-diphosphonic Acid | 3.0 | 3.2 |
| Sodium Sulfite | 4.0 | 4.4 |
| Potassium Carbonate | 30.0 | 37.0 |
| Potassium Bromide | 1.4 | 0.7 |
| Potassium Iodide | 1.5 mg | — |
| Hydroxylamine Sulfate | 2.4 | 2.8 |
| 4-(N-Ethyl-N-β-hydroxyethyl-amino)-2-methylaniline Sulfate | 4.5 | 5.5 |
| Water to make | 1.0 l | 1.0 l |
| pH | 10.05 | 10.05 |

| Bleaching Solution | | |
| --- | --- | --- |
| | Mother Solution (g) | Replenisher (g) |
| Sodium Ethylenediaminetetra-acetato Ferrate Trihydrate | 100.0 | 120.0 |
| Disodium Ethylenediamine-tetraacetate | 10.0 | 11.0 |
| Ammonium Bromide | 140.0 | 160.0 |
| Ammonium Nitrate | 30.0 | 35.0 |
| Aqueous Ammonia (27%) | 6.5 ml | 4.0 ml |
| Water to make | 1.0 l | 1.0 l |
| pH | 6.0 | 5.7 |

| Fixing Solution | | |
| --- | --- | --- |
| | Mother Solution (g) | Replenisher (g) |
| Sodium Ethylenediaminetetra-acetate | 0.5 | 0.7 |
| Sodium Sulfite | 7.0 | 8.0 |
| Sodium Bisulfite | 5.0 | 5.5 |
| Aqueous Solution of Ammonium Thiosulfate (70%) | 170.0 ml | 200.0 ml |
| Water to make | 1.0 l | 1.0 l |
| pH | 6.7 | 6.6 |

| Stabilizing Solution | | |
| --- | --- | --- |
| | Mother Solution (g) | Replenisher (g) |
| Formalin (37%) | 2.0 ml | 3.0 ml |
| Polyoxyethylene-p-monononyl-phenyl Ether (polymerization degree: 10) | 0.3 | 0.45 |
| Disodium Ethylenediaminetetra-acetate | 0.05 | 0.08 |
| Water to make | 1.0 l | 1.0 l |
| pH | 5.8-8.0 | 5.8-8.0 |

The density of each processed sample was measured, i.e., Sample Nos. 201 to 206 were measured through a red filter, Sample Nos. 207 to 209 were measured through a green filter, and Sample Nos. 210 to 214 were measured through a blue filter respectively and sensitivity was evaluated.

The reciprocal of the exposure amount giving density of fog density +0.2 is taken as sensitivity, and sensitivity of each sample is shown in a relative value taking the value of Sample No. 201 as 100 with Sample Nos. 201 to 206, taking the value of Sample No. 207 as 100 with Sample Nos. 207 to 209, and taking the value of Sample No. 210 as 100 with Sample Nos. 210 to 214.

The sensitizing dye formed a J-association body having absorption maximum at about 605 nm in Sample No. 206, and at about 487 nm in Sample No. 213, and each sensitizing dye showed similar spectral sensitivity distribution to that of absorption.

For further evaluating residual colors of sensitizing dyes, samples in Table 5 were subjected to color development processing in the same manner as above (ordinarily processed samples) as one group, and the samples were subjected to sufficient washing processing (that is, the same processing was performed except that the time of washing (2) in the processing step was changed to 30 minutes) to completely remove the remaining sensitizing dyes (washing-processed samples) as the other group, each sample was not subjected to exposure. Since the samples did not undergo exposure, development did not occur and image-forming dyes were not formed.

After processing each sample, the spectrum by transmission mode of from 360 to 700 nm of each sample was recorded with a spectrophotometer. After that, for evaluating the remaining sensitizing dye of the ordinarily processed sample, the difference spectrum of the ordinarily processed sample and the washing-processed sample was taken. The absorption of the difference spectrum means the amount of the retained dye, i.e., the residual color of the sensitizing dye. The residual color of each sample is shown in a relative value of the absorbance of the peak wavelength of each sample taking the absorbance of the peak wavelength of Sample No. 201 as 100 with Sample Nos. 201 to 206, taking the absorbance of the peak wavelength of Sample No. 207 as 100 with Sample Nos. 207 to 209, and taking the absorbance of the peak wavelength of Sample No. 210 as 100 with Sample Nos. 210 to 214.

Further, pressure resistance test was performed as follows. A needle having a diameter of 0.1 mm was put on the above sample before exposure and 5 g of load was applied to the needle and the needle was moved at a rate of 600 mm/min. (pressure processing). The difference in density between the part where pressure processing was performed and the part where pressure processing was not performed (pressure marks) of the sample which had been development-processed without undergoing exposure was measured with a micro-densitometer having an aperture diameter of 10 μm.

The results of evaluation of sensitivity, residual color and pressure marks of each sample are shown in Table 5.

TABLE 5

| Sample No. | Dye | Coupler | Sensitivity | Residual Color | Pressure Marks | Remarks |
| --- | --- | --- | --- | --- | --- | --- |
| 201 | Sen-14 | A | 100 (criterion) | 100 (criterion) | 0.225 | Comparison |
| 202 | S-110 | A | 155 | 50 | 0.131 | Invention |
| 203 | S-109 | A | 155 | 48 | 0.123 | Invention |
| 204 | S-98 | A | 161 | 25 | 0.055 | Invention |
| 205 | S-99 | A | 162 | 18 | 0.046 | Invention |
| 206 | S-96 | A | 161 | 18 | 0.046 | Invention |
| 207 | Sen-15 | B | 100 (criterion) | 100 (criterion) | 0.210 | Comparison |
| 208 | S-111 | B | 153 | 35 | 0.105 | Invention |
| 209 | S-108 | B | 155 | 19 | 0.041 | Invention |
| 210 | Sen-16 | C | 100 (criterion) | 100 (criterion) | 0.225 | Comparison |
| 211 | S-129 | C | 135 | 50 | 0.151 | Invention |
| 212 | S-130 | C | 144 | 20 | 0.061 | Invention |
| 213 | S-131 | C | 142 | 21 | 0.063 | Invention |
| 214 | S-132 | C | 142 | 36 | 0.066 | Invention |

It can be seen from the results in Table 5 that the samples containing the sensitizing dyes according to the present invention are high sensitivity and conspicuously low in residual color as compared with the samples containing comparative dyes. In particular, sensitivity is markedly improved in trimethyl cyanine dyes.

The samples containing the sensitizing dyes according to the present invention are also excellent in pressure marks (i.e., pressure resistance).

EXAMPLE 10

Preparation of {111} High Silver Chloride Tabular Grains (A)

To 1. 2 liters of water were added 1. 0 g of sodium chloride and 2.5 g of inert gelatin and the temperature of the reaction vessel was maintained at 27°C. An aqfueous solution of silver nitrate (75 ml) (containing 18 g of silver nitrate) and 75 ml of an aqueous solution of sodium chloride (containing 6.2 g of sodium chloride and 0.75 g of inert gelatin) were added to the reaction vessel by a double jet method with stirring over 1 minute. One minutes after the completion of addition, 18.6 ml of an aqueous solution containing 0. 92 mmol of Crystal Phase Controlling Agent-1 was added to the reaction solution. One minute after that, 450 ml of a 10% aqueous solution of oxidation-processed gelatin was added thereto. Then, the temperature of the reaction vessel was raised to 55° C. over 28 minutes, and ripening was performed for 27 minutes.

After ripening, 2.35 mg of sodium benzylthiosulfate was added to the reaction solution. Thereafter, an aqueous solution of silver nitrate (containing 263 g of silver nitrate) and an aqueous solution of NaCl (containing 96 g of NaCl and 0.016 mg of $K_2IrCl_6$) were added to the reaction solution at an accelerated flow rate over 32 minutes. At the same time, 2.63 mmol of Crystal Phase Controlling Agent-1 was added at an accelerated flow rate (in proportion to the addition amount of silver nitrate) After that, an aqueous solution of silver nitrate (containing 71 g of silver nitrate) and an NaCl aqueous solution (containing 24.2 g of NaCl, 1.39 g of KI and 12 mg of yellow prussiate of potash) were added to the reaction mixture at an accelerated flow rate over 14 minutes. After addition was finished, the temperature of the reaction solution was raised to 75° C. over 20 minutes, and an aqueous solution of silver nitrate (containing 2.9 g of silver nitrate) and a KBr aqueous solution (containing 2.25 g of KBr) were added to the reaction solution at a constant flow rate over 1 minute.

The temperature was lowered to 40° C. and washing was performed according to ordinary flocculation method. After washing, 175 g of inert gelatin, 34 ml of phenoxyethanol (35%) and 700 ml of distilled water were added to the above mixture. pH and pAg were adjusted to 6.2 and 7.5 respectively using sodium hydroxide and an aqueous solution of sodium chloride. Thus, grains (A) was obtained, in which 99% of the entire projected area was occupied by tabular grains having an average equivalent-circle diameter of 0.85 μm and an average thickness of 0.146 μm. The variation coefficient of thickness was 16.8% and the variation coefficient of equivalent-circle diameter was 19.0%.

Crystal Phase Controlling Agent-1

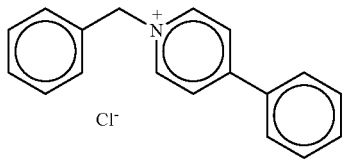

Chemical sensitization

Emulsion A was optimally chemically sensitized at 60° C. using Sen-17, Sen-18, Sen-19, S-132 and S-78 shown in Table 6, sodium benzylthiosulfonate, sodium thiocyanate, 1-(5-methylureidophenyl)-5-mercaptotetrazole, sodium thiosulfate and chloroauric acid.

TABLE 6

| Sample No. | Grains | Sensitizing Dye | Molar Ratio | Addition Amount of Sensitizing Dye Total Amount (mol/mol-Ag) | Remarks |
|---|---|---|---|---|---|
| 301 | A | Sen-17 and Sen-18 | 1/1 | $8 \times 10^{-4}$ | Comparison |
| 302 | A | Sen-19 and Sen-18 | 1/1 | $8 \times 10^{-4}$ | Comparison |
| 303 | A | Sen-19 and S-132 | 1/1 | $8 \times 10^{-4}$ | Invention |
| 304 | A | Sen-19 and S-78 | 1/1 | $8 \times 10^{-4}$ | Invention |

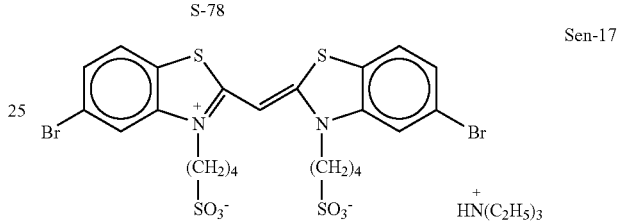

Sen-17

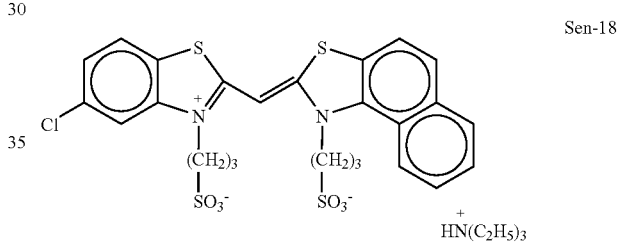

Sen-18

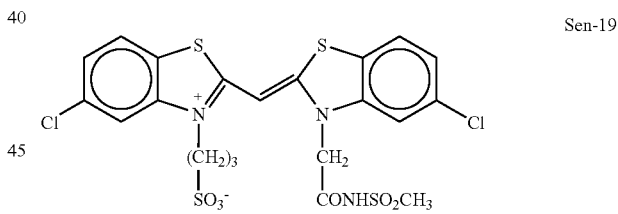

Sen-19

Preparation of Coated Sample and Evaluation of Photographic Properties and Stability The surface of a paper support both surfaces of which were laminated with polyethylene resin was subjected to corona discharge treatment. The support was provided with a gelatin undercoat layer containing sodium dodecylbenzenesulfonate, and further, photographic constitution layers, from the first layer to the seventh layer, described below were coated in order to prepare a silver halide color photographic material samples shown below. The coating solution of each photographic constitution layer was prepared as described below.

Preparation of Coating Solution

Each coupler, color image stabilizer and ultraviolet absorber were dissolved in a solvent and ethyl acetate. The solution was emulsified and dispersed in a 10 weight % gelatin aqueous solution containing a surfactant by means of a high speed dissolver, thus an emulsified dispersion was prepared.

The above emulsified dispersion and silver chlorobromide emulsion were mixed and dissolved to prepare a coating solution having the composition described below.

As the gelatin hardening agent in each layer, 1-oxy-3,5-dichloro-s-triazine sodium salt was used.

Further, Ab-1, Ab-2 and Ab-3 were added to each layer so that the total amount became 15.0 mg/m², 60.0 mg/m² and 5.0 mg/m², respectively.

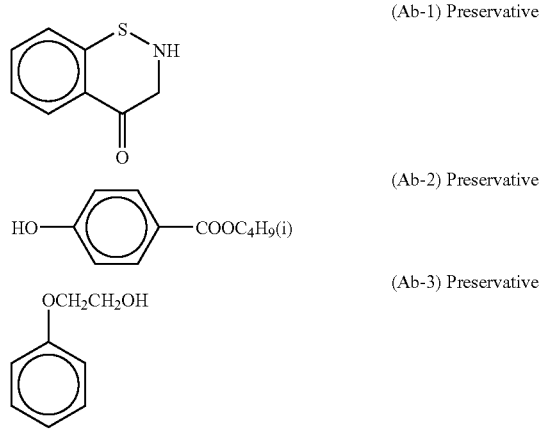

(Ab-1) Preservative
(Ab-2) Preservative
(Ab-3) Preservative

High silver chloride emulsion used in each photosensitive emulsion layer was as follows.

Blue-Sensitive Emulsion Layer
See Table 6.

Green-Sensitive Emulsion Layer

To silver chlorobromide emulsion (a cubic form, a mixture in a ratio of 1/3 (silver molar ratio) of a large grain size emulsion having an average grain size of 0.45 um and a small grain size emulsion having an average grain size of 0.35 µm, variation coefficients of the grain size distribution were 10% and 8%, respectively, emulsions of both sizes contained 0.4 mol % of silver bromide localized at a part of the grain surface and the remaining substrate was comprised of silver chloride), Sensitizing Dye D was added to the large grain size emulsion in an amount of $3.0 \times 10^{-4}$ mol per mol of the silver halide and to the small grain size emulsion in an amount of $3.6 \times 10^{-4}$ mol per mol of the silver halide, and Sensitizing Dye E was added to the large grain size emulsion in an amount of $4.0 \times 10^{-5}$ mol per mol of the silver halide and to the small grain size emulsion in an amount of $2.8 \times 10^{-4}$ mol per mol of the silver halide.

Sensitizing Dye D

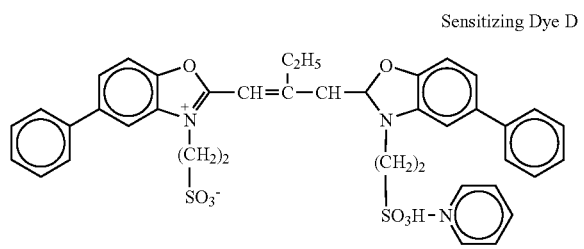

Sensitizing Dye E

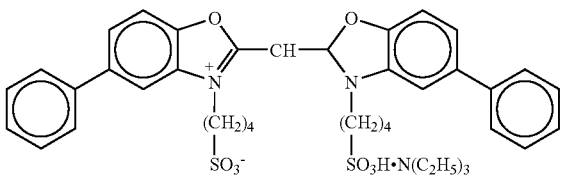

Red-Sensitive Emulsion Layer

To silver chlorobromide emulsion (a cubic form, a mixture in a ratio of 1/1 (silver molar ratio) of large grain size emulsion having an average grain size of 0.40 µm and small grain size emulsion having an average grain size of 0.30 µm, variation coefficients of the grain size distribution were 0.09 and 0.11, respectively, emulsions of both sizes contained 0.5 mol % of silver bromide localized at a part of the grain surface, and the remaining substrate was comprised of silver chloride), Sensitizing Dyes G and H were added to the large grain size emulsion each in an amount of $9.0 \times 10^{-5}$ mol per mol of the silver halide, and to the small grain size emulsion each in an amount of $1.2 \times 10^{-5}$ mol per mol of the silver halide.

Further, the following Compound I was added to a red-sensitive emulsion layer in an amount of $3.0 \times 10^{-3}$ mol per mol of the silver halide.

Sensitizing Dye G

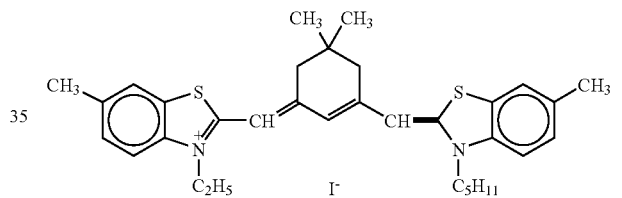

Sensitizing Dye H

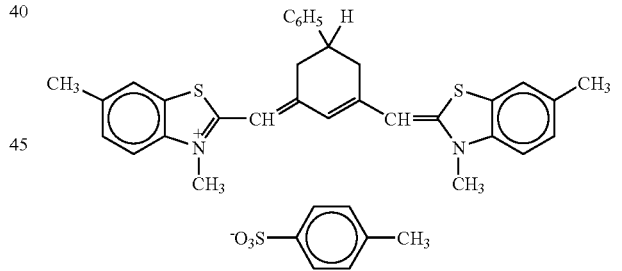

Compound I

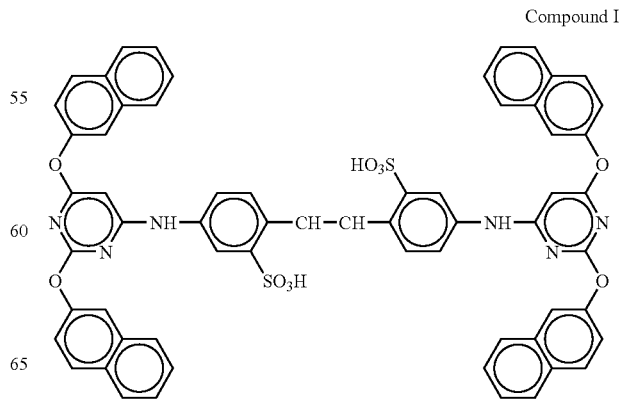

Further, 1-(3-methylureidophenyl)-5-mercaptotetrazole was added to a blue-sensitive emulsion layer, a green-sensitive emulsion layer and a red-sensitive emulsion layer in an amount of $3.3 \times 10^{-4}$ mol, $1.0 \times 10^{-3}$ mol and $5.9 \times 10^{-4}$ mol, respectively, per mol of the silver halide.

Further, 1-(3-methylureidophenyl)-5-mercaptotetrazole was added to the second layer, the fourth layer, the sixth layer and the seventh layer in an amount of 0.2 mg/m$^2$, 0.2 mg/M$^2$, 0.6 mg/M$^2$ and 0.1 mg/m$^2$, respectively.

Further, 4-hydroxy-6-methyl-1,3,3a,7-tetraazaindene was added to a blue-sensitive emulsion layer and a green-sensitive emulsion layer in an amount of $1 \times 10^4$ mol and $2 \times 10^{-4}$ mol respectively, per mol of the silver halide.

Copolymer of methacrylic acid and butyl acrylate (weight ratio: 1/1, average molecular weight: from 200,000 to 400,000) was added to a red-sensitive emulsion layer in an amount of 0.05 g/m$^2$. Further, disodium catechol-3,5-disulfonate was added to the second layer, the fourth layer and the sixth layer in an amount of 6 mg/m$^2$, 6 mg/M$^2$ and 18 mg/M$^2$, respectively.

Moreover, the following dyes were added to emulsion layers for preventing irradiation (the numerals in parentheses represent the coating amount).

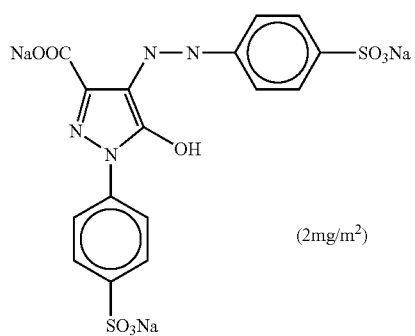

(2mg/m$^2$)

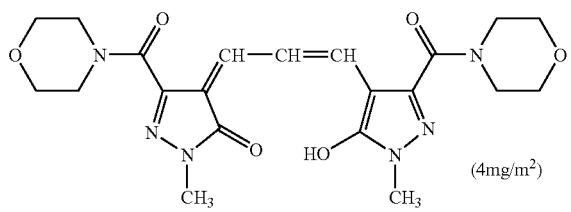

(4mg/m$^2$)

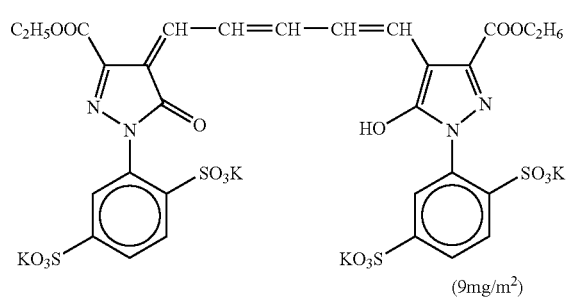

(9mg/m$^2$)

-continued

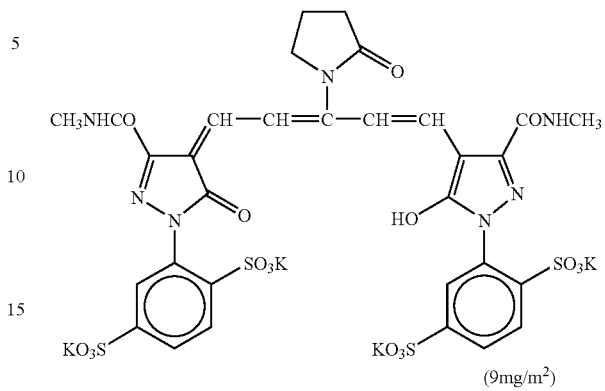

(9mg/m$^2$)

Layer Constitution

The constitution of each layer is described below. The numeral represents the coating amount (g/M$^2$). The numeral for an emulsion represents the coating amount in terms of silver.

Support

Polyethylene resin-laminated paper [a white pigment (TiO$_2$, content: 16 weight %, ZnO, content: 4 weight %), a brightening agent (13 mg/m$^2$ of 4,4'-bis(5-methylbenzoxazolyl)stilbene), and 96 mg/m$^2$ of a bluish dye (ultramarine) were added to the polyethylene resin of the first layer side].

| First Layer (red-sensitive emulsion layer) | |
|---|---|
| Emulsion (the above red-sensitive emulsion) | 0.12 |
| Gelatin | 0.59 |
| Cyan Coupler (ExC-1) | 0.13 |
| Cyan Coupler (ExC-2) | 0.03 |
| Color Image Stabilizer (Cpd-7) | 0.01 |
| Color Image Stabilizer (Cpd-9) | 0.04 |
| Color Image Stabilizer (Cpd-15) | 0.19 |
| Color Image Stabilizer (Cpd-18) | 0.04 |
| Solvent (Solv-5) | 0.09 |
| Second Layer (color mixing preventing layer) | |
| Gelatin | 0.60 |
| Color Mixing Preventive (Cpd-1) | 0.09 |
| Color Image Stabilizer (Cpd-5) | 0.007 |
| Color Image Stabilizer (Cpd-7) | 0.007 |
| Ultraviolet Absorber (UV-C) | 0.05 |
| Solvent (Solv-5) | 0.11 |
| Third Layer (green-sensitive emulsion layer) | |
| Emulsion (green-sensitive emulsion) | 0.14 |
| Gelatin | 0.73 |
| Magenta Coupler (ExM) | 0.15 |
| Ultraviolet Absorber (UV-A) | 0.05 |
| Color Image Stabilizer (Cpd-2) | 0.02 |
| Color Image Stabilizer (Cpd-7) | 0.008 |
| Color Image Stabilizer (Cpd-8) | 0.07 |
| Color Image Stabilizer (Cpd-9) | 0.03 |
| Color Image Stabilizer (Cpd-10) | 0.009 |
| Color Image Stabilizer (Cpd-11) | 0.0001 |
| Solvent (Solv-3) | 0.06 |
| Solvent (Solv-4) | 0.11 |
| Solvent (Solv-5) | 0.06 |
| Fourth Layer (color mixting preventing layer) | |
| Gelatin | 0.48 |
| Color Mixing Preventive (Cpd-4) | 0.07 |
| Color Image Stabilizer (Cpd-5) | 0.006 |
| Color Image Stabilizer (Cpd-7) | 0.006 |
| Ultraviolet Absorber (UV-C) | 0.04 |
| Solvent (Solv-5) | 0.09 |

-continued

| | |
|---|---|
| Fifth Layer (blue-sensitive emulsion layer) | |
| Emulsion (see Table 6) | 0.24 |
| Gelatin | 1.25 |
| Yellow Coupler (ExY) | 0.57 |
| Color Image Stabilizer (Cpd-1) | 0.07 |
| Color Image Stabilizer (Cpd-2) | 0.04 |
| Color Image Stabilizer (Cpd-3) | 0.07 |
| Color Image Stabilizer (Cpd-8) | 0.02 |
| Solvent (Solv-1) | 0.21 |
| Sixth Layer (ultraviolet absorbing layer) | |
| Gelatin | 0.32 |
| Ultraviolet Absorber (UV-C) | 0.42 |
| Solvent (Solv-7) | 0.08 |
| Seventh Layer (protective layer) | |
| Gelatin | 0.70 |
| Acryl-Modified Copolymer of Polyvinyl Alcohol (modification degree: 17%) | 0.04 |
| Liquid Paraffin | 0.01 |
| Surfactant (Cpd-13) | 0.01 |
| Polydimethylsiloxane | 0.01 |
| Silicon Dioxide | 0.003 |

(ExY) Yellow Coupler

A mixture (70/30 in the molar ratio) of

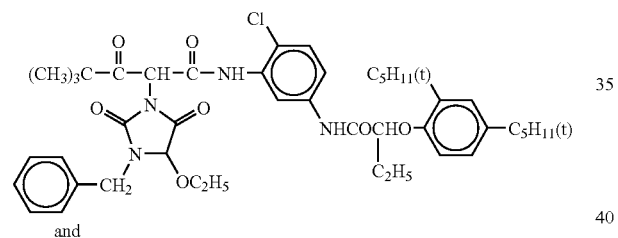

and

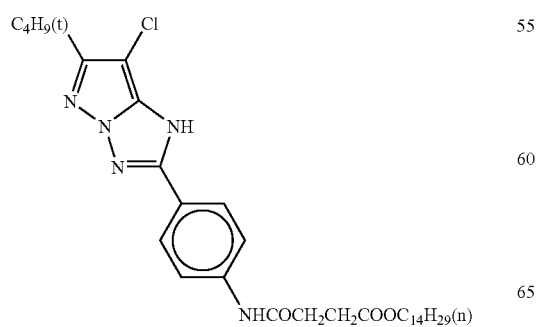

(ExM) Magenta Coupler

A mixture (40/40/20 in the molar ratio) of

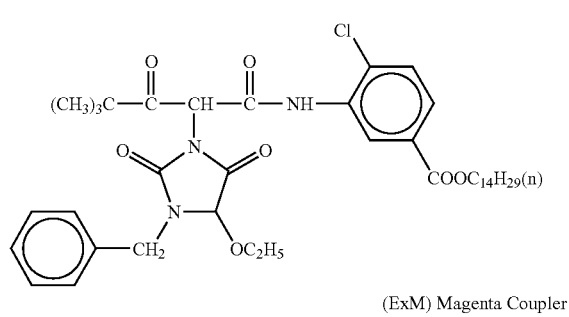

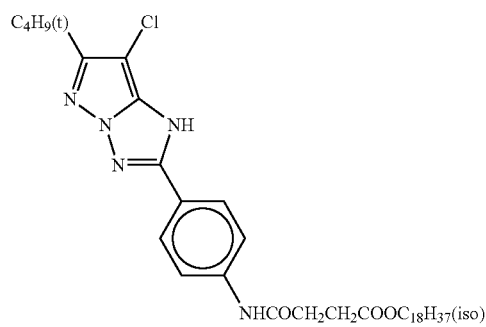

and

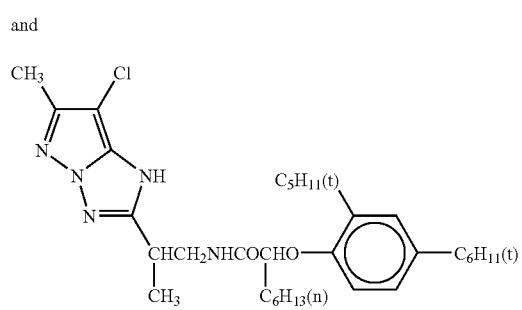

(ExC-1) Cyan Coupler

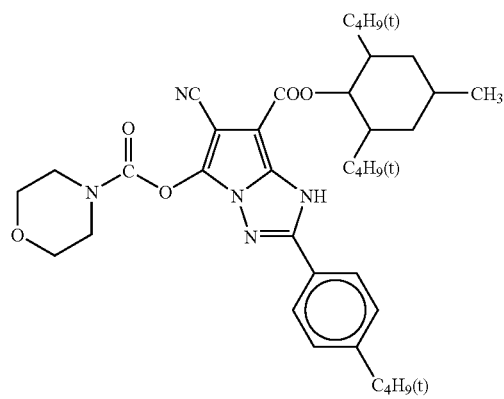

(ExC-2) Cyan Coupler

A mixture (50/25/25 in the molar ratio) of

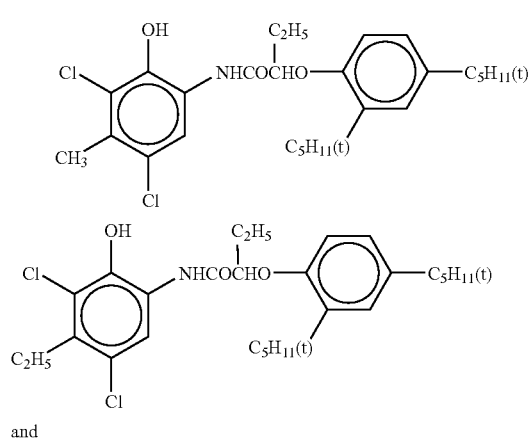

and

-continued
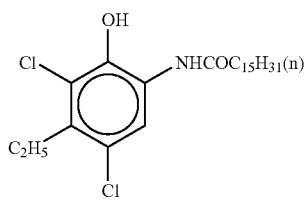
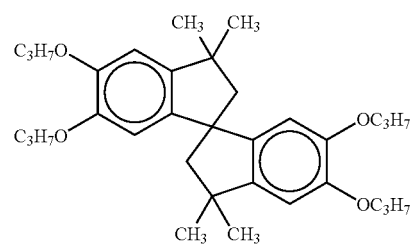
(Cpd-8) Color Image Stabilizer
(Cpd-1) Color Image Stabilizer
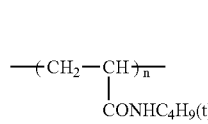
number average molecular weight: 60,000
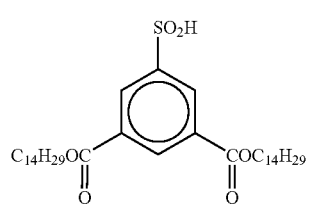
(Cpd-9) Color Image Stabilizer
(Cpd-2) Color Image Stabilizer
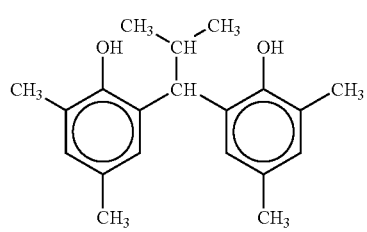
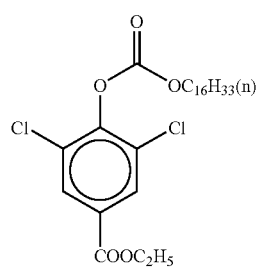
(Cpd-10) Color Image Stabilizer
(Cpd-3) Color Image Stabilizer
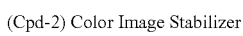
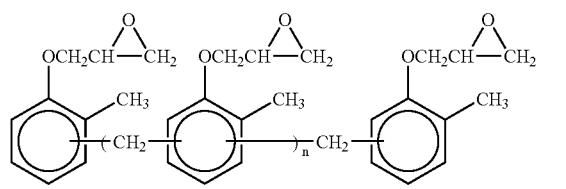
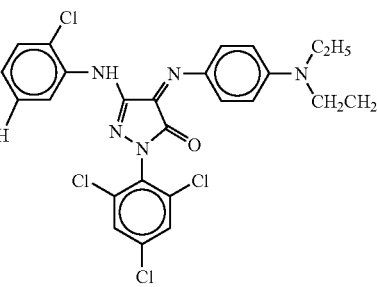
(Cpd-11)
(Cpd-4) Color Mixing Preventive
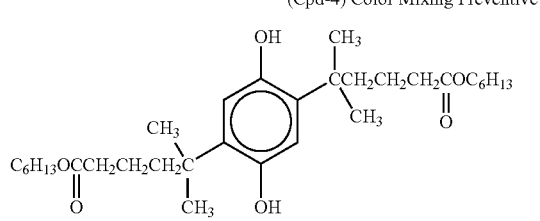
(Cpd-5) Color Mixing Preventive
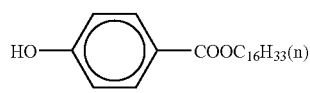
(Cpd-7) Color Mixing Preventive
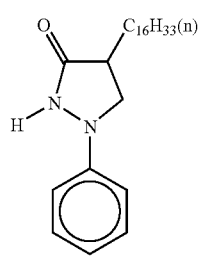
(Cpd-13) Surfactant
A mixture (7/3 in the molar ratio) of
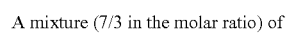
and
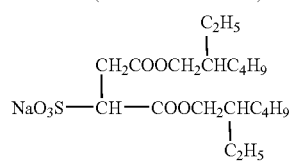
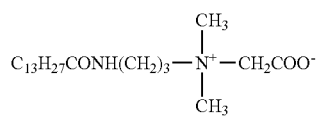

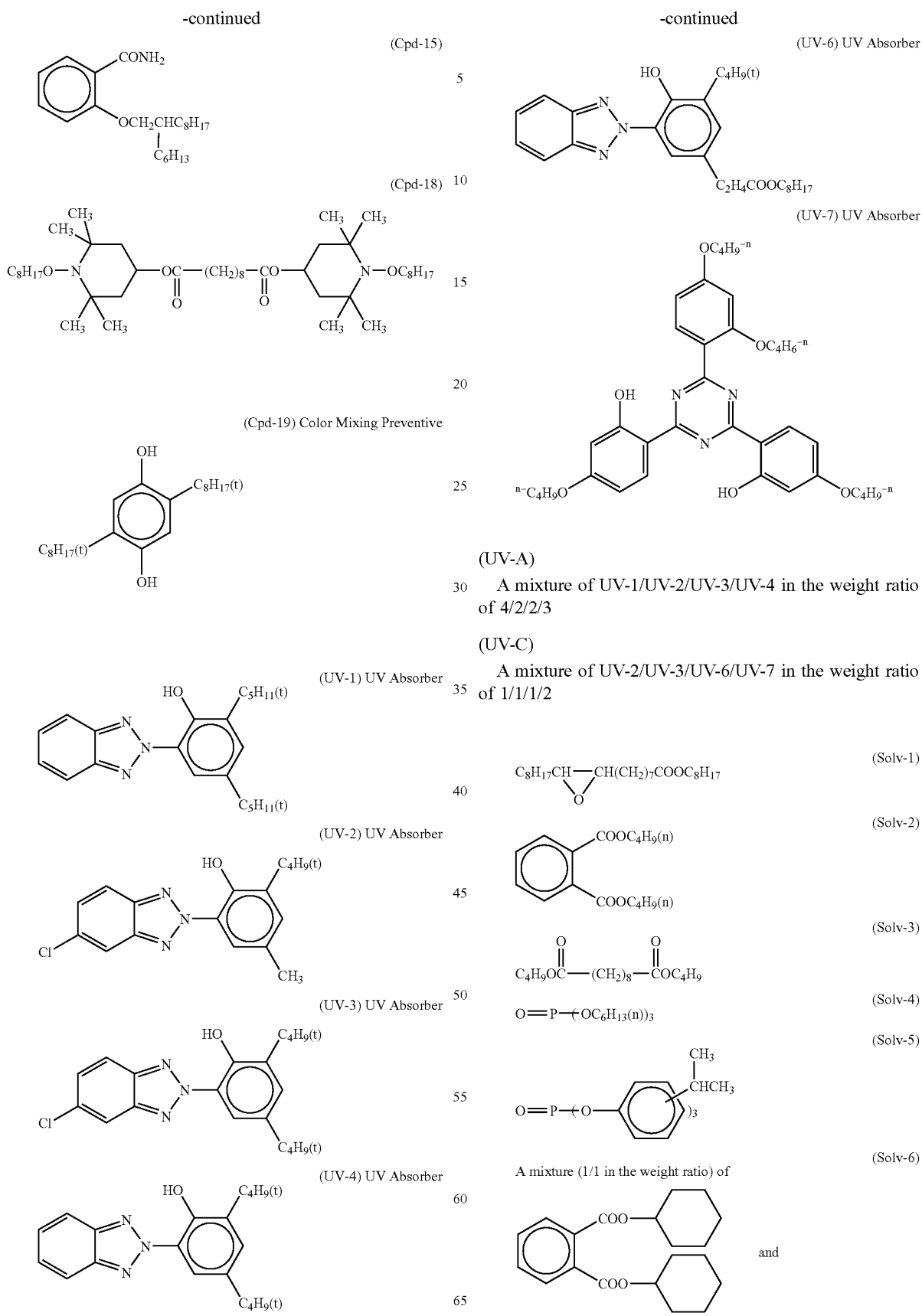

-continued

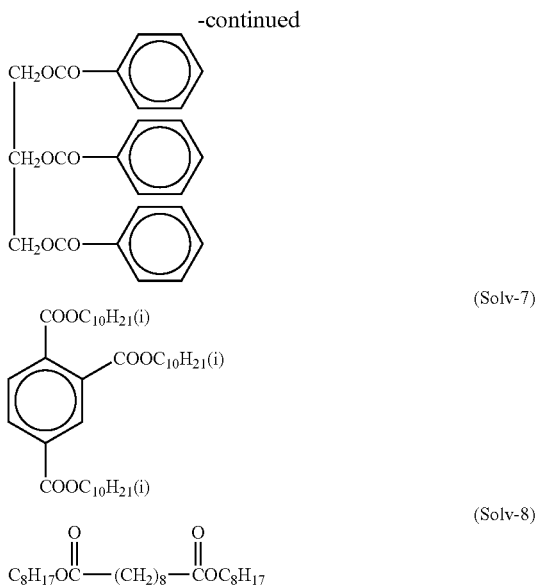

(Solv-7)

(Solv-8)

Coated Sample Nos. 301 to 304 were preparedby using emulsions shown in Table 6 in the blue-sensitive layer of the photographic material having the above layer constitution.

Exposure

Gradation exposure by three color separation was performed with laser beams of three colors of B, G and R using the following apparatus. At that time, laser output was modulated so that each sample could obtain appropriate improvement.

Exposure Apparatus

Three types of laser beams were used as light sources, that is, the wavelength of YAG solid state laser (oscillation wavelength: 946 nm) using a semiconductor laser GaAlAs (oscillation wavelength: 808.5 nm) as an excitation light source converted with SHG crystal of $LiNbO_3$ having reversal domain structure to 473 nm, the wavelength of $YVO_4$ solid state laser (oscillation wavelength: 1,064 nm) using a semiconductor laser GaAlAs (oscillation wavelength: 808.5 nm) as an excitation light source converted with SHG crystal of $LiNbO_3$ having reversal domain structureto 532 nm, and AlGaInP (oscillation wavelength: 680 nm, manufactured by Matsushita Densan Co., Ltd., Type No. LN9R20). Each of three laser beams was made to be able to successively scanning expose a color photographic paper transferring vertically to scanning direction by a polygonal mirror the intensity of which was modulated by AOM. For restraining the fluctuation of light amount due to the changes of temperature, the temperature of semiconductor laser was maintained constant using Peltier element. At this time, scanning exposure was performed at 600 dpi, and every beam diameter of B, G and R measured with a beam diameter meter (1180GP manufactured by Beam Scan Co., U.S.A.) was 65 μm (circular beams showing the difference in diameters in the main scanning direction/sub scanning direction of within 1%).

(Development Process, Dry to Dry: 180 Seconds)

The thus-exposed samples were processed by CP45X processing (manufactured by Fuji Photo Film Co., Ltd.).

The reflection density of each processed color sample was measured using a TCD type densitometer (manufactured by Fuji Photo Film Co., Ltd.). Sensitivity was expressed as the logarithm of the exposure amount required to give color density of fog density +1.0. Sensitivity of the blue-sensitive layer of each sample is shown in Table 7. In Table 7, sensitivity of each sample is shown in a relative value taking the value of Sample No. 301 as 0.00. A positive value shows that sensitivity is high.

Test of Pressure Marks

Pressuremarks (i.e., pressure resistance) testwas performed as follows. A needle having a diameter of 0.1 mm was put on each of the above samples and 10 g of load was applied to the needle and the needle was moved at a rate of 600 mm/min. (pressure processing). The difference in density between the part where pressure processing was performed and the part where pressure processing was not performed (pressure marks) of the sample which had been development-processed without undergoing exposure was measured with a micro-densitometer having an aperture diameter of 10 pim. The results obtained are shown in Table 7.

TABLE 7

| Sample No. | Grains | Blue Light Exposure | | | Remarks |
| | | Fog | Sensitivity | Pressure Marks | |
|---|---|---|---|---|---|
| 301 | A | 0.04 | 0.00 | 0.185 | Comparison |
| 302 | A | 0.04 | 0.02 | 0 160 | Comparison |
| 303 | A | 0.03 | 0.08 | 0.090 | Invention |
| 304 | A | 0.03 | 0.05 | 0.105 | Invention |

As can be seen from the results in Table 7, the emulsions according to the present invention are high sensitivity, pressure marks are suppressed and stability is improved.

EXAMPLE 11

A tabular silver iodobromide emulsion was prepared according to the method of preparing Emulsion D in Example 5 of JP-A-8-29904 and this was designated Emulsion Q.

Multilayer color photographic materials were prepared according to the method of preparation of Sample No. 101 in Example 5 of JP-A-8-29904. Sample Nos. 401 and 402 were prepared by replacing Emulsion D in the fifth layer of Sample No. 101 in Example 5 of JP-A-8-29904 with Emulsion Q. and further replacing ExS-1, 2 and 3 with Sensitizing Dye Sen-10 ($5.0 \times 10^{-4}$ mol/Ag mol) or Sensitizing Dye S-31 ($5.0 \times 10^{-4}$ mol/Ag mol).

For examining the sensitivity of the thus-obtained samples, each sample was exposed for $1/100$ sec. through an optical wedge and a red filter with Fuji FW type sensitometer (a product of Fuji Photo Film Co., Ltd.), color development processing was performed using the same processing step and processing solutions as in Example 1 of JP-A-8-29904 and cyan density was measured. Sensitivity was a reciprocal of exposure amount required to give density of fog density +0.2 and expressed as a relative value.

As a result, Sample No. 402 according to the present invention showed high sensitivity of 113 as compared with sensitivity 100 (control) of comparative Sample No. 401. Sample No. 402 also showed less residual colors after processing.

EXAMPLE 12

In Emulsion 1 in Example 1 of JP-A-7-92601, the spectral sensitizing dyes were replaced with Sensitizing Dye Sen-10 ($8\times10^{-4}$ mol/Ag mol) or Sensitizing Dye S-31 ($8\times10^{-4}$ mol/Ag mol) to prepare tetradecahedral silver iodobromide emulsions, the thus-obtained emulsions were designated Emulsion R and Emulsion S. Further, in Emulsion 1 in Example 1 of JP-A-7-92601, the silver potential during the second double jet was changed from +65 mV to +115 mV, further, the spectral sensitizing dyes were replaced with Sensitizing Dye Sen-12 ($8\times10^{-4}$ mol/Ag mol) or Sensitizing Dye S-76 ($8\times10^{-4}$ mol/Ag mol) to prepare cubic silver iodobromide emulsions, the thus-obtained emulsions were designated Emulsion T and Emulsion U.

Multilayer color photographic materials were prepared according to the method of preparation of Sample No. 401 in Example 4 of JP-A-7-92601. Emulsion 1 in the ninth layer of Sample No. 401 in Example 4 of JP-A-7-92601 was replaced with Emulsion R or Emulsion S, the thus-obtained samples were designated Sample Nos. 411 and 412. Similarly, Emulsion 1 in the ninth layer of Sample No. 401 in Example 4 of JP-A-7-92601 was replaced with Emulsion T or Emulsion U, and these samples were designated Sample Nos. 413 and 414.

The sensitivity of the thus-obtained samples was evaluated. In the same manner as in Example 4 of JP-A-7-92601, samples were subjected to exposure for 1/50 sec. and color reversal development processing, and magenta density was measured. Sensitivity was a reciprocal of exposure amount required to give density of minimum density +0.2 which was obtained with sufficient exposure and expressed as a relative value taking the sensitivity of Comparative Sample No. 411 as 100. As a result, Sample No. 412 according to the present invention showed high sensitivity of 129. Sample No. 412 also showed less residual colors after processing. Further, Sample No. 414 according to the present invention showed such high sensitivity of 133 taking the sensitivity of Comparative Sample No. 413 as 100. Sample No. 414 also showed less residual colors after processing.

EXAMPLE 13

Octahedral silver bromide internal latent image type direct positive emulsion and hexagonal tabular silver bromide internal latent image type direct positive emulsion were prepared in the same manner as in the preparation of Emulsions 1 and 5 in Example 1 of JP-A-5-313297 and these emulsions were named Emulsion V and Emulsion W.

Color diffusion transfer photographic films were prepared in the same manner as in the preparation of Sample No. 101 in Example 1 of JP-A-5-313297. In the sixteenth layer of Sample No. 101 in Example 1 of JP-A-5-313297, Emulsion-2 was replaced with Emulsion V and Sensitizing Dye (3) was replaced with Sensitizing Dye Sen-12 ($9\times10^{-4}$ mol/Ag mol) or Sensitizing Dye S-76 ($9\times10^{-4}$ mol/Ag mol), the thus-obtained samples were designated Sample Nos. 421 and 422. Also, in the eleventh layer of Sample No. 101 in Example 1 of JP-A-5-313297, Emulsion-2 was replaced with Emulsion W and Sensitizing Dye (2) was replaced with Sensitizing Dye Sen-10($9\times10^{-4}$ mol/Ag mol) or Sensitizing Dye S-31 ($9\times10^{-4}$ mol/Ag mol), the thus-obtained samples were designated Sample Nos. 423 and 424

For examining the sensitivity of the thus-obtained samples, processing was carried out using the same exposure, processing step and processing solutions as in Example 1 of JP-A-5-313297 and transfer density was measured using a color densitometer. Sensitivity was a reciprocal of exposure amount required to give density of 1.0 and expressed as a relative value. The sensitivity of Sample No. 422 according to the present invention was as high as 123 taking the sensitivity of Comparative Sample No. 421 as 100. Sample No. 422 also showed less residual colors after processing. Also, the sensitivity of Sample No. 424 according to the present invention was as high as 115 taking the sensitivity of Comparative Sample No. 423 as 100. Sample No. 424 also showed less residual colors after processing

EXAMPLE 14

In the preparation of Emulsion F in Example 2 of JP-A-4-142536, red-sensitive sensitizing dye (S-1) was not added before sulfur sensitization, in addition to sulfur sensitization using triethylthiourea, chloroauric acid was used in combination and optimally gold-sulfur sensitized, and after gold-sulfur sensitization, Sensitizing Dye Sen-10 ($2\times10^{-4}$ mol/Ag mol) or Sensitizing Dye S-31 ($2\times10^{-4}$ mol/Ag mol) was added, the thus-obtained silver chlorobromide emulsions were designated Emulsions X and Y.

Multilayer color photographic papers were prepared in the same manner as in the preparation of Sample No. 20 in Example 1 of JP-A-6-347944. The emulsion in the fifth layer of Sample No. 20 in Example 1 of JP-A-6-347944 was replaced with Emulsion X or Y, these samples were designated Sample Nos. 431 and 432.

For examining the sensitivity of the thus-obtained samples, samples were exposed for 1/10 sec. through an optical wedge and a red filter with Fuji FW type sensitometer (a product of Fuji Photo Film Co., Ltd.), color development processing was carried out using the same processing step and processing solutions as in Example 1 of JP-A-6-347944. As a result, Sample No. 432 according to the present invention showed such high sensitivity of 136 taking the sensitivity of Comparative Sample No. 431 as 100. Sample No. 432 also showed less residual colors after processing.

EXAMPLE 15

Tabular silver chloride emulsions were prepared in the same manner as in the preparation of Emulsion A in Example 1 of JP-A-8-122954. In chemical sensitization (B) in Example 1 of the same patent, Sensitizing Dye-1 and Dye-2 were replaced with Sensitizing Dye Sen-10 ($2\times10^{-4}$ mol/Ag mol) or Sensitizing Dye S-31 ($2\times10^{-4}$ mol/Ag mol), the thus-obtained emulsions were designated Emulsion ZA and Emulsion ZB.

Coated samples were prepared by replacing the emulsion in Example 1 of JP-A-8-122954 with Emulsion ZA or Emulsion ZB and an emulsion layer and a surface protective layer were coated in combination on both sides of the support by a simultaneous extrusion method similar to in Example 1, these samples were designated Sample Nos. 441 and 442. The coated silver amount per one side was 1.75 g/m$^2$.

For examining the sensitivity of the thus-obtained samples, samples were exposed for 0.05 sec. from both sides through an X-ray ortho-screen HGM produced by Fuji Photo Film Co., Ltd. and processed with the same automatic processor and processing solutions as in Example 1 of JP-A-8-122954. Sensitivity was a reciprocal of exposure amount required to give a density of fog +0.1 and expressed as a relative value taking the sensitivity of Comparative Sample No. 441 as 100. As a result, Sample No. 442 according to the present invention showed such high sensitivity of 120, and also showed less residual colors after processing.

When exposure was performed using HR-4 or HGH in place of X-ray ortho-screen HGM, the same effects could be obtained.

EXAMPLE 16

Tabular silver chloride emulsion was prepared in the same manner as in the preparation of Emulsion D in Example 2 of JP-A-8-227117 except that Sensitizing Dye-2 and Dye-3 were not added. This emulsion was designated Emulsion ZC.

Coated samples were prepared in the same manner as in the preparation of Coated Sample No. F in Example 3 of JP-A-8-227117. Emulsion F in Coated Sample No. F in Example 3 of JP-A-8-227117 was replaced with Emulsion ZC, and Sensitizing Dye-1 in Coated Sample No. F in Example 3 was replaced with Sensitizing Dye Sen-12 ($5\times10^{-4}$ mol/Ag mol) or Sensitizing Dye S-76 ($5\times10^{-4}$ mol/Ag mol), the thus-obtained samples were designated Sample Nos. 451 and 452.

For examining the sensitivity of the thus-obtained samples, samples were exposed for $1/100$ second through an optical wedge and a blue filter using Fuji FW type sensitometer (a product of Fuji Photo Film Co., Ltd.), subjected to Fuji Photo Film CN16 processing and photographic characteristics were compared.

Sensitivity was a reciprocal of exposure amount required to give a density of fog +0.2 and expressed as a relative value taking the sensitivity of Comparative Sample No. 451 as 100. Sample No. 452 according to the present invention showed such high sensitivity of 124, and also showed less residual colors after processing.

EXAMPLE 17

Octahedral silver chloride emulsion was prepared in the same manner as in the preparation of Emulsion F in Example 3 of JP-A-8-227117, this was designated Emulsion ZD.

Coated samples were prepared in the same manner as in the preparation of Coated Sample No. F in Example 3 of JP-A-8-227117. Emulsion F and Sensitizing Dye-1 in Coated Sample No. F in Example 3 of JP-A-8-227117 were replaced with Emulsion ZD and Sensitizing Dye Sen-12 ($5\times10^{-4}$ mol/Ag mol) or Sensitizing Dye S-76 ($5\times10^{-4}$ mol/Ag mol), the thus-obtained samples were designated Sample Nos. 461 and 462.

For examining the sensitivity of the thus-obtained samples, samples were subjected to exposure for $1/100$ sec. through an optical wedge and a red filter using Fuji FW type sensitometer (a product of Fuji Photo Film Co., Ltd.), subjected to Fuji Photo Film CN16 processing and photographic characteristics were compared. Sensitivity was a reciprocal of exposure amount required to give a density of fog +0.2 and expressed as a relative value taking the sensitivity of Sample No. 461 as 100. Sample No. 462 according to the present invention showed such high sensitivity of 129, and also showed less residual colors after processing.

EXAMPLE 18

Tabular grain emulsions were prepared in the same manner as in the preparation of Emulsion CC disclosed in European Patent 0699950, and in chemical sensitization Sensitizing Dye Sen-12 was added in an amount of $5\times10^{-4}$ mol/Ag mol and chemical sensitization was performed, then Sen-12 was added in an amount of $3\times10^{-4}$ mol/Ag mol, thereafter, further, Sen-12 was added in an amount of $3\times10^{-4}$ mol/Ag mol, this emulsion was designated Emulsion ZE, or S-76 was added in an amount of $5\times10^{-4}$ mol/Ag mol and chemical sensitization was performed, then S-76 was added in an amount of $3\times10^{-4}$ mol/Ag mol, thereafter, further, S-76 was added in an amount of $3\times10^{-4}$ mol/Ag mol, this emulsion was designated Emulsion ZF.

Coated samples were prepared in the same manner as in the preparation of the coated samples in the example of European Patent 0699950, and a sample in which Emulsion ZE was used was designated Sample No. 471, and ZF was used was designated Sample No. 472. The thus-prepared samples were subjected to exposure and development in the same manner as in European Patent 0699950 and photographic characteristics were compared. Sensitivity was a reciprocal of exposure amount required to give a density of fog +0.2 and expressed as a relative value taking the sensitivity of Sample No. 471 as 100. Sample No. 472 according to the present invention showed such high sensitivity of 136, and also showed less residual colors after processing.

EXAMPLE 19

Preparation of Sample No. 501

Sample No. 101 in Example 8 was prepared and designated Sample No. 501.

Preparation of Sample Nos. 500, 502 to 516

Sample Nos. 502 to 516 were prepared by replacing sensitizing dye Sen-2 or Sen-7 used in the emulsion of Sample No. 501 with equimolar amount of the dye shown in Table 8 and Table 9, and Sample No. 500 (blank sample) was prepared by excluding both dyes. Each piece of the samples thus obtained was subjected to 20 CMS white light exposure for $1/100$ sec. through a gray wedge, then processed by the same processing step and same processing solutions as in Example 8, and sensitometry was performed.

The yellow stain density and the magenta stain density of blank Sample No.500 were subtracted from the yellow stain density and magenta stain density of each piece of the samples after processing and residual color was evaluated. The stain density was measured using a densitometer Status A, a product of X-RITE Co.

Sensitometry and the results of evaluation of residual color are shown in Tables 8 and 9 below. BL relative sensitivity and RL relative sensitivity were compared on the basis of relative exposure amount giving minimum density +1.0.

TABLE 8

| Sample No. | Sensitizing Dye in Emulsions L to P and Replacement of Sen-7 | Relative Sensitivity of Blue-Sensitive Layer | Yellow Stain Density |
|---|---|---|---|
| 500 (blank) | None | — | 0 (criterion) |
| 501 (Comparison) | Sen-7 | 100 (criterion) | 0.073 |
| 502 (Comparison) | Comparative Dye Sen-12 | 92 | 0.055 |
| 503 (Comparison) | Comparative Dye Sen-13 | 109 | 0.088 |
| 504 (Invention) | S-139 | 113 | 0.022 |

TABLE 8-continued

| Sample No. | Sensitizing Dye in Emulsions L to P and Replacement of Sen-7 | Relative Sensitivity of Blue-Sensitive Layer | Yellow Stain Density |
|---|---|---|---|
| 505 (Invention) | S-145 | 126 | 0.032 |
| 506 (Invention) | S-148 | 124 | 0.035 |
| 507 (Invention) | S-154 | 122 | 0.017 |
| 508 (Invention) | S-156 | 134 | 0.044 |
| 509 (Invention) | S-157 | 130 | 0.033 |
| 510 (Invention) | S-158 | 125 | 0.036 |

TABLE 9

| Sample No. | Sensitizing Dye in Emulsions C to E and Replacement of Sen-2 | Relative Sensitivity of Red-Sensitive Layer | Magenta Stain Density |
|---|---|---|---|
| 500 (blank) | None | — | 0 (criterion) |
| 501 (Comparison) | Sen-2 | 100 (criterion) | 0.085 |
| 511 (Comparison) | Comparative Dye Sen-10 | 92 | 0.067 |
| 512 (Comparison) | Comparative Dye Sen-11 | 83 | 0.044 |
| 513 (Invention) | S-150 | 118 | 0.025 |
| 514 (Invention) | S-151 | 128 | 0.038 |
| 515 (Invention) | S-152 | 125 | 0.026 |
| 516 (Invention) | S-155 | 130 | 0.032 |

As is apparent from the results in Tables 8 and 9, photographic materials exhibiting less residual color and high sensitivity by using the compounds and emulsions according to the present invention, above all, excellent effect can be obtained when the methine dye represented by formula (VII) or (VIII) is used. Thus, high sensitivity is compatible with less residual color for the first time by using the constitution of the present invention.

EFFECT OF THE INVENTION

High sensitivity and excellent residual color effect can be obtained by the constitution of the present invention.

While the invention has been described in detail and with reference to specific examples thereof, it will be apparent to one skilled in the art that various changes and modifications can be made therein without departing from the spirit and scope thereof.

What is claimed is:

1. A silver halide photographic material which comprises a silver halide emulsion containing silver halide grains that are sensitized with at least one sensitizing methine dye represented by the following formula (I):

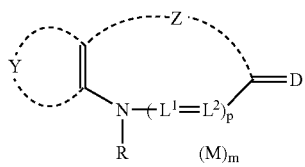

(I)

wherein Y represents a furan ring, and Y may further be condensed with other 5- or 6-membered carbocyclic ring or heterocyclic ring, or may have a substituent; the bond between two carbon atoms in which Y is condensed may be a single bond or a double bond; Z represents an oxazole ring, a thiazole ring, an imidazole ring, a 2-pyridine ring or a 4-pyridine ring, and Z may further be condensed with other 5- or 6-membered carbocyclic ring or heterocyclic ring; R represents a substituted or unsubstituted alkyl group, aryl group, or heterocyclic group; D represents a group necessary to form a sensitizing methine dye; $L^1$ and $L^2$ each represents a methine group; p represents 0 or 1; M represents a counter ion; and m represents a number of 0 or higher necessary to neutralize the charge in the molecule.

2. The silver halide photographic material as claimed in claim 1, wherein the methine dye represented by formula (I) is represented by the following formula (XX):

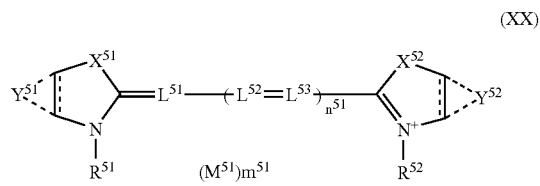

(XX)

wherein $Y^{51}$ represents a furan ring which may be condensed with other 5- or 6-membered carbocyclic or heterocyclic ring or may have a substituent, and two carbon atoms to which $Y^{51}$ is condensed may be bonded by a single bond or a double bond; $X^{51}$ represents an oxygen atom, a sulfur atom, or a nitrogen atom and $X^{52}$ each represents an oxygen atom, a sulfur atom, a selenium atom, a tellurium atom or a nitrogen atom; $Y^{52}$ represents an atomic group necessary to form a benzene ring or a 5- or 6-membered unsaturated heterocyclic ring, which may further be condensed with other 5- or 6-membered carbocyclic or heterocyclic ring or may have a substituent, and two carbon atoms to which $Y^{52}$ is condensed may be bonded by a single bond or a double bond; $R^{51}$ and $R^{52}$ each represents a substituted or unsubstituted alkyl group, a substituted or unsubstituted aryl group, or a substituted or unsubstituted heterocyclic group; $L^{51}$, $L^{52}$ and $L^{53}$ each represents a methine group; $n^{51}$ represents 0, 1, 2, 3 or 4; $M^{51}$ represents a counter ion; and $m^{51}$ represents a number of 0 or higher necessary to neutralize the charge in the molecule.

3. A silver halide photographic material which comprises a silver halide emulsion containing silver halide grains that are sensitized with at least one sensitizing methine dye represented by the following formula (I):

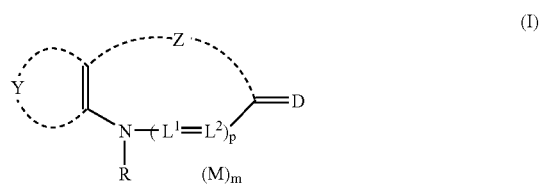

(I)

wherein Y represents an atomic group necessary to form a 5- or 6-membered unsaturated heterocyclic ring, and Y may further be condensed with other 5- or 6-membered carbocyclic ring or heterocyclic ring, or may have a substituent; the bond between two carbon atoms in which Y is condensed may be a single bond or a double bond; Z represents an atomic group necessary to form a 5- or 6-membered nitrogen-containing heterocyclic ring, and Z may further be condensed with other 5- or 6-membered carbocyclic ring or heterocyclic ring; R represents a substituted or unsubstituted alkyl group, aryl group, or heterocyclic group; D represents a group necessary to form a sensitizing methine dye; $L^1$ and $L^2$ each represents a methine group; p represents 0 or 1; M represents a counter ion; and m represents a number of 0 or higher necessary to neutralize the charge in the molecule; wherein the condensed ring containing Y and Z in the sensitizing methine dye represented by formula (I) is selected from the following Y-1 to Y-26, provided that Y-1 to Y-3 and Y-6 to Y-26 may further be condensed with other 5- or 6-membered carbocylic or heterocyclic ring, or may have a substituent:

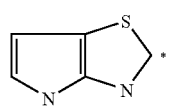
Y-1

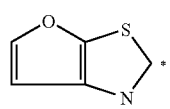
Y-2

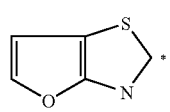
Y-3

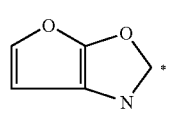
Y-6

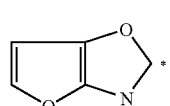
Y-7

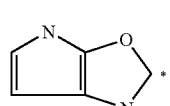
Y-8

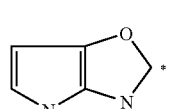
Y-9

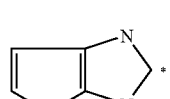
Y-10

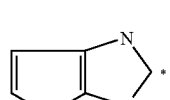
Y-11

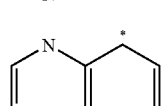
Y-12

-continued

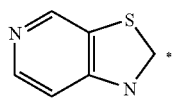
Y-13

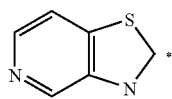
Y-14

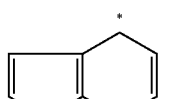
Y-15

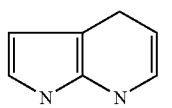
Y-16

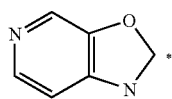
Y-17

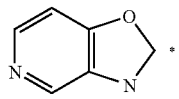
Y-18

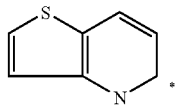
Y-19

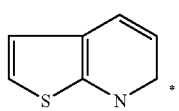
Y-20

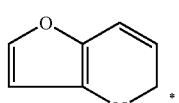
Y-21

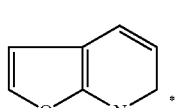
Y-22

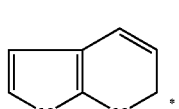
Y-23

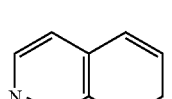
Y-24

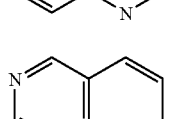
Y-25

Y-26

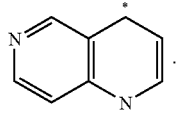

in each structural formula, * represents a position to link to a methine chain.

4. A silver halide photographic material which comprises at least one methine dye represented by the following formula (XXXI) or (XXXII):

(XXXI)

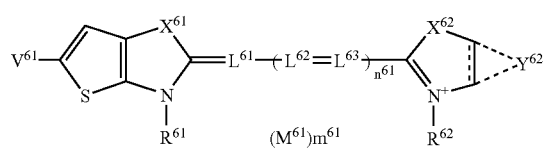

(XXXII)

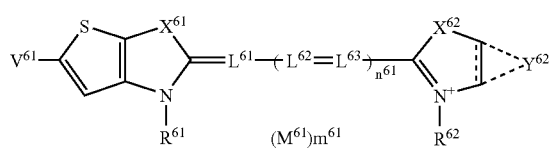

wherein $L^{61}$, $L^{62}$ and $L^{63}$ each represents a methine group; V61 represents a halogen atom; $X^{61}$ represents an oxygen atom, a sulfur atom, or a nitrogen atom; $X^{62}$ represents an oxygen atom, a sulfur atom, a selenium atom, a nitrogen atom, or a carbon atom; $Y^{62}$ represents an atomic group necessary to form a benzene ring or a 5- or 6-membered unsaturated heterocyclic ring, which may be condensed with other 5- or 6-membered carbocyclic or heterocyclic ring or may have a substituent, and two carbon atoms to which $Y^{62}$ is condensed may be bonded by a single bond or a double bond; $R^{61}$ and $R^{62}$ each represents a substituted or unsubstituted alkyl group, a substituted or unsubstituted aryl group, or a substituted or unsubstituted heterocyclic group; $n^{61}$ represents 0 or 1; $M^{61}$ represents a counter ion; and $m^{61}$ represents a number of 0 or higher necessary to neutralize the charge in the molecule.

5. The silver halide photographic material as claimed in claim 4, wherein the methine dye represented by formula (XXXI) or (XXXII) is represented by the following formula (XXXIa) or (XXXIIa):

(XXXIa)

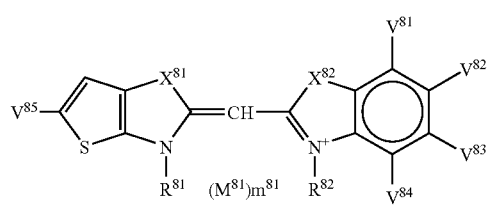

(XXXIIa)

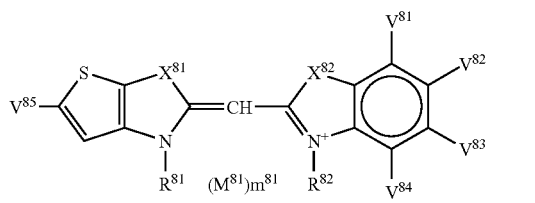

wherein $V^{85}$ represents a halogen atom; $X^{81}$ and $X^{82}$ each represents an oxygen atom or a sulfur atom; $R^{81}$ and $R^{82}$ each represents an alkyl group substituted with an acid radical; $V^{81}$, $V^{82}$, $V^{83}$ and $V^{84}$ each represents a hydrogen atom or a substituent; $M^{81}$ represents a counter ion; and $m^{81}$ represents a number of 0 or higher necessary to neutralize the charge in the molecule.

6. The silver halide photographic material as claimed in claim 5, wherein in the methine dye represented by formula (XXXIa) or (XXXIIa), at least either $R^{81}$ or $R^{82}$ represents an alkyl group substituted with a carboxyl group or an alkanesulfonylcarbamoyl group, and the other represents an alkyl group substituted with a sulfo group.

7. The silver halide photographic material as claimed in claim 4, wherein the methine dye represented by formula (XXXI) or (XXXII) is represented by the following formula (XXXIb) or (XXXIIb):

(XXXIb)

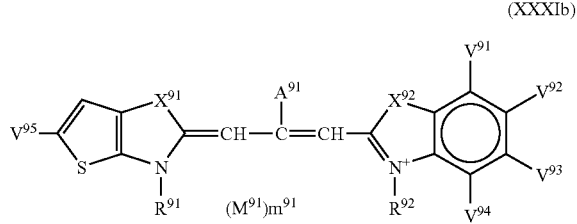

(XXXIIb)

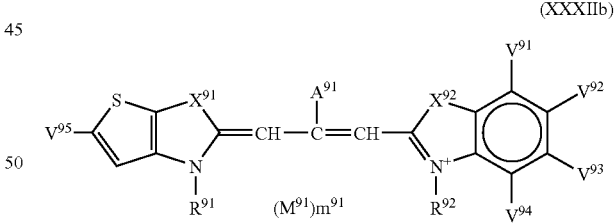

wherein $V^{95}$ represents a halogen atom; $X^{91}$ and $X^{92}$ each represents an oxygen atom or a sulfur atom; $R^{91}$ and $R^{92}$ each represents a substituted or unsubstituted alkyl group, a substituted or unsubstituted aryl group, or a substituted or unsubstituted heterocyclic group; $A^{91}$ represents a methyl group, an ethyl group or a propyl group; $V^{91}$, $V^{92}$, $V^{93}$ and $V^{94}$ each represents a hydrogen atom or a substituent; $M^{91}$ represents a counter ion; and $m^{91}$ represents a number of 0 or higher necessary to neutralize the charge in the molecule.

8. A silver halide photographic material which comprises at least one sensitizing methine dye represented by the following formula (I):

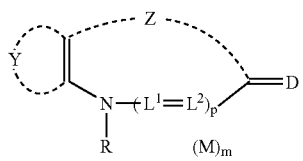 (I)

wherein Y represents a pyrrole ring, and Y may further be condensed with other 5- or 6-membered carbocyclic ring or heterocyclic ring, or may have a substituent; the bond between two carbon atoms in which Y is condensed may be a single bond or a double bond; Z represents an oxazole ring, a thiazole ring, an imidazole ring, a 2-pyridine ring or a 4-pyridine ring, and Z may further be condensed with other 5- or 6-membered carbocyclic ring or heterocyclic ring; R represents a substituted or unsubstituted alkyl group, aryl group, or heterocyclic group; D represents a group necessary to form a sensitizing methine dye; $L^1$ and $L^2$ each represents a methine group; p represents 0 or 1; M represents a counter ion; and m represents a number of 0 or higher necessary to neutralize the charge in the molecule.

9. The silver halide photographic material as claimed in claim 8, wherein Z represents an oxazole ring, a thiazole ring, an imidazole ring, a 2-pyridine ring or a 4-pyridine ring.

10. The silver halide photographic material as claimed in claim 8, wherein the methine dye represented by formula (I) is represented by the following formula (XX):

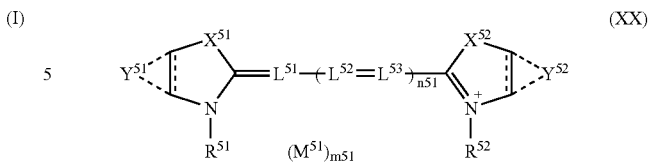 (XX)

wherein $Y^{51}$ represents a pyrrole ring which may be condensed with other 5- or 6-membered carbocyclic or heterocyclic ring or may have a substituent, and two carbon atoms to which $Y^{51}$ is condensed may be bonded by a single bond or a double bond; $X^{51}$ and $X^{52}$ each represents an oxygen atom, a sulfur atom, or a nitrogen atom; $Y^{52}$ represents an atomic group necessary to form a benzene ring or a 5- or 6-membered unsaturated heterocyclic ring, which may further be condensed with other 5- or 6-membered carbocyclic or heterocyclic ring or may have a substituent, and two carbon atoms to which $Y^{52}$ is condensed may be bonded by a single bond or a double bond; $R^{51}$ and $R^{52}$ each represents a substituted or unsubstituted alkyl group, a substituted or unsubstituted aryl group, or a substituted or unsubstituted heterocyclic group; $L^{51}$ $L^{52}$ and $L^{53}$ each represents a methine group; $n^{51}$ represents 0, 1, 2, 3 or 4; $M^{51}$ represents a counter ion; and $m^{51}$ represents a number of 0 or higher necessary to neutralize the charge in the molecule.

\* \* \* \* \*